US012085778B2

United States Patent
Tanaka

(10) Patent No.: US 12,085,778 B2
(45) Date of Patent: Sep. 10, 2024

(54) LENS DRIVING APPARATUS AND CAMERA MODULE

(71) Applicant: ALPS ALPINE CO., LTD., Tokyo (JP)

(72) Inventor: Toshiyuki Tanaka, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 649 days.

(21) Appl. No.: 17/341,726

(22) Filed: Jun. 8, 2021

(65) Prior Publication Data

US 2021/0294070 A1 Sep. 23, 2021

Related U.S. Application Data

(63) Continuation of application No. PCT/JP2019/048502, filed on Dec. 11, 2019.

(30) Foreign Application Priority Data

Dec. 14, 2018 (JP) .................................. 2018-234430

(51) Int. Cl.
*G02B 7/09* (2021.01)
*G02B 27/64* (2006.01)
(Continued)

(52) U.S. Cl.
CPC .............. *G02B 7/09* (2013.01); *G02B 27/646* (2013.01); *G03B 5/00* (2013.01); *G03B 13/36* (2013.01);
(Continued)

(58) Field of Classification Search
CPC .......... G02B 7/09; G02B 27/646; G02B 7/02; G02B 7/04; G03B 5/00; G03B 13/36;
(Continued)

(56) References Cited

U.S. PATENT DOCUMENTS

| 10,107,987 B2 | 10/2018 | Osaka et al. |
| 10,401,589 B2 | 9/2019 | Murakami |
| 2019/0041661 A1 | 2/2019 | Murakami |

FOREIGN PATENT DOCUMENTS

| CN | 106687847 | 5/2017 |
| CN | 108603993 | 9/2018 |

(Continued)

OTHER PUBLICATIONS

International Search Report for PCT/JP2019/048502 mailed on Mar. 10, 2020.
(Continued)

*Primary Examiner* — Joseph P Martinez
*Assistant Examiner* — Ray Alexander Dean
(74) *Attorney, Agent, or Firm* — IPUSA, PLLC

(57) ABSTRACT

A lens driving apparatus includes a housing; a lens holding member positioned in the housing for holding a lens body, a coil, a detection magnet, and a balance magnet; first and second magnetic field generating members facing each other across the coil and the lens holding member; the detection magnet for detecting a position of the lens holding member; a magnetic detection member facing the detection magnet; the balance magnet facing the detection magnet across an optical axis of the lens body; and first and second leaf springs conducted to the ends of the coil, movably supporting the lens holding member in the optical axis direction. The detection magnet is disposed closer to the first magnetic field generating member than to the second magnetic field generating member, and the balance magnet is disposed closer to the second magnetic field generating member than to the first magnetic field generating member.

11 Claims, 37 Drawing Sheets

(51) Int. Cl.
  *G03B 5/00*      (2021.01)
  *G03B 13/36*     (2021.01)
  *H02K 11/215*    (2016.01)
  *H02K 41/035*    (2006.01)

(52) U.S. Cl.
  CPC ....... *H02K 11/215* (2016.01); *H02K 41/0356* (2013.01); *G03B 2205/0007* (2013.01)

(58) Field of Classification Search
  CPC .... G03B 2205/0007; G03B 2205/0069; G03B 30/00; H02K 11/215; H02K 41/0356; H02K 7/14; H02K 11/33; H02K 33/18; H04N 23/00; H04N 23/54; H04N 23/55
  See application file for complete search history.

(56) References Cited

FOREIGN PATENT DOCUMENTS

| | | | |
|---|---|---|---|
| JP | 2016-017977 | 2/2016 | |
| JP | 2016-020939 | 2/2016 | |
| WO | 2017/138041 | 8/2017 | |
| WO | WO-2017138041 A1 * | 8/2017 | ........... G02B 27/646 |

OTHER PUBLICATIONS

First Office Action dated Aug. 19, 2022 issued with respect to the corresponding Chinese Patent Application No. 201980082180.3.

* cited by examiner

LENS DRIVING APPARATUS AND CAMERA MODULE

CROSS-REFERENCE TO RELATED APPLICATION

The present application is a continuation application of International Application No. PCT/JP2019/048502 filed on Dec. 11, 2019, which is based on and claims priority to Japanese Patent Application No. 2018-234430 filed on Dec. 14, 2018. The contents of these applications are incorporated herein by reference in their entirety.

BACKGROUND OF THE INVENTION

1. Field of the Invention

The present disclosure relates to, for example, a lens driving apparatus to be mounted to a portable device with a camera and the like and a camera module including the lens driving apparatus.

2. Description of the Related Art

Conventionally, a lens driving apparatus including a yoke, a lens holding member, a coil disposed around the outer periphery of the lens holding member, and a pair of flat magnets mounted to the yoke so as to face the coil, is known (see Patent Document 1). In this apparatus, the lens holding member is movably held in the optical axis direction by a conductive leaf spring. Further, the lens holding member includes a detection magnet for detecting the position of the lens holding member. The position of the lens holding member is derived from the output of a Hall element attached to a fixed side member so as to face the detection magnet. The derived position of the lens holding member is utilized for feedback control of the driving current.

[Patent Document 1] Japanese Laid-open Patent Publication No. 2016-017977

SUMMARY OF THE INVENTION

According to one aspect of the present invention, there is provided a lens driving apparatus including a housing including an outer peripheral wall portion and an upper plate portion, the outer peripheral wall portion including a first side plate portion and a second side plate portion facing each other; a lens holding member positioned in the housing and configured to hold a lens body; a coil held in the lens holding member; a first magnetic field generating member and a second magnetic field generating member facing each other across the coil and the lens holding member; a detection magnet held in the lens holding member and configured to detect a position of the lens holding member; a magnetic detection member disposed so as to face the detection magnet; a balance magnet held in the lens holding member at a position so as to face the detection magnet across an optical axis of the lens body; and a first leaf spring and a second leaf spring respectively conducted to one end portion and another end portion of a wire configuring the coil, and configured to movably support the lens holding member so as to be movable in a direction of the optical axis, wherein the detection magnet is disposed at a position closer to the first magnetic field generating member than to the second magnetic field generating member, and the balance magnet is disposed at a position closer to the second magnetic field generating member than to the first magnetic field generating member.

DETAILED DESCRIPTION OF THE PREFERRED EMBODIMENTS

In the above-described lens driving apparatus of the conventional technology, the detection magnet is positioned at the farthest point from each flat magnet of the pair of flat magnets, i.e., at an intermediate point between the two flat magnets, in order to avoid magnetic interference with each flat magnet of the pair of flat magnets. Therefore, the above-described lens driving apparatus limits the degree of freedom in the placement of the detection magnet, and consequently limits the degree of freedom in design of the lens driving apparatus.

Therefore, it is desirable to provide a lens driving apparatus that can increase the degree of design freedom.

Figure 1:
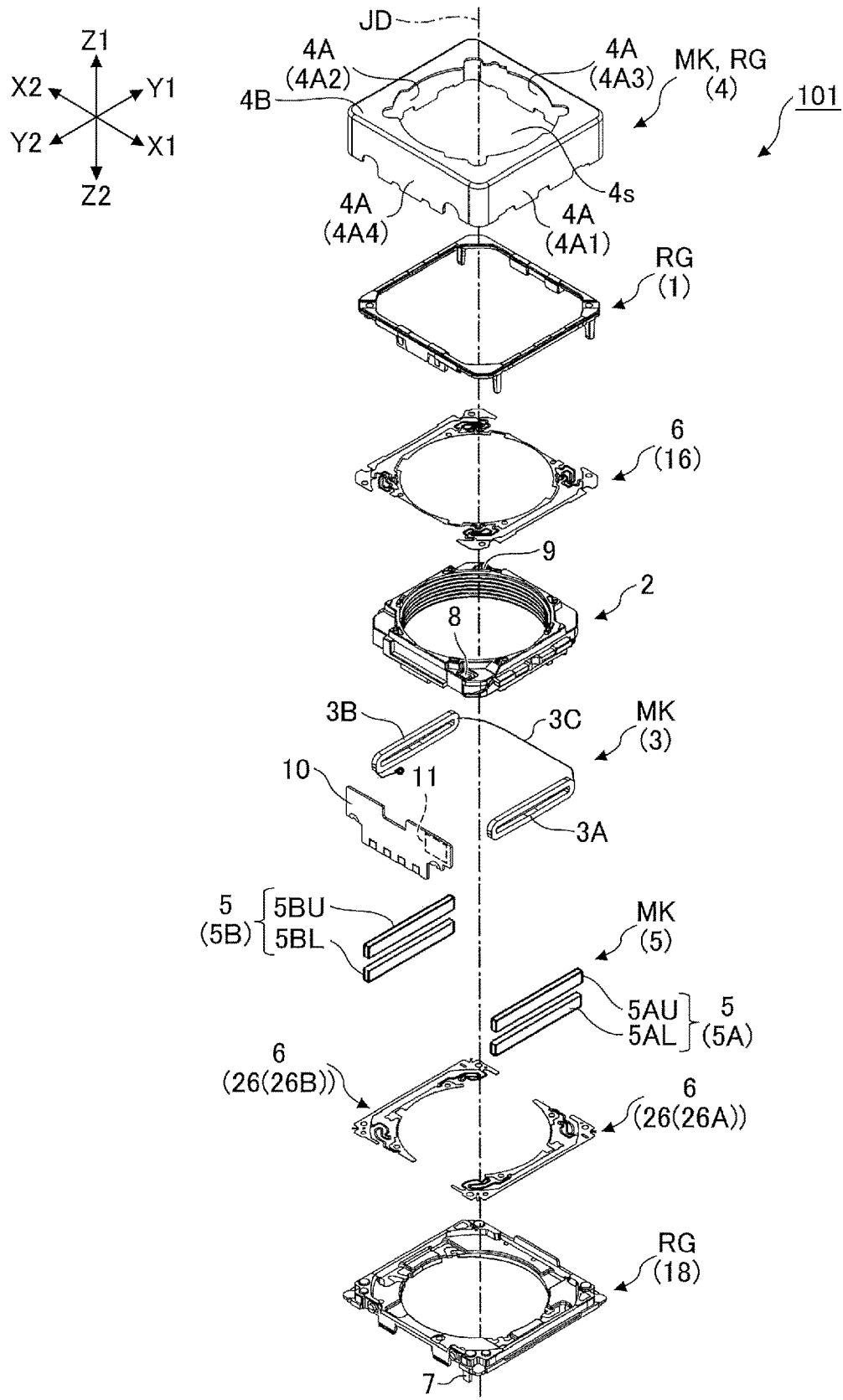
FIG. 1 is an exploded perspective view of a lens driving apparatus.
Figure 2A:
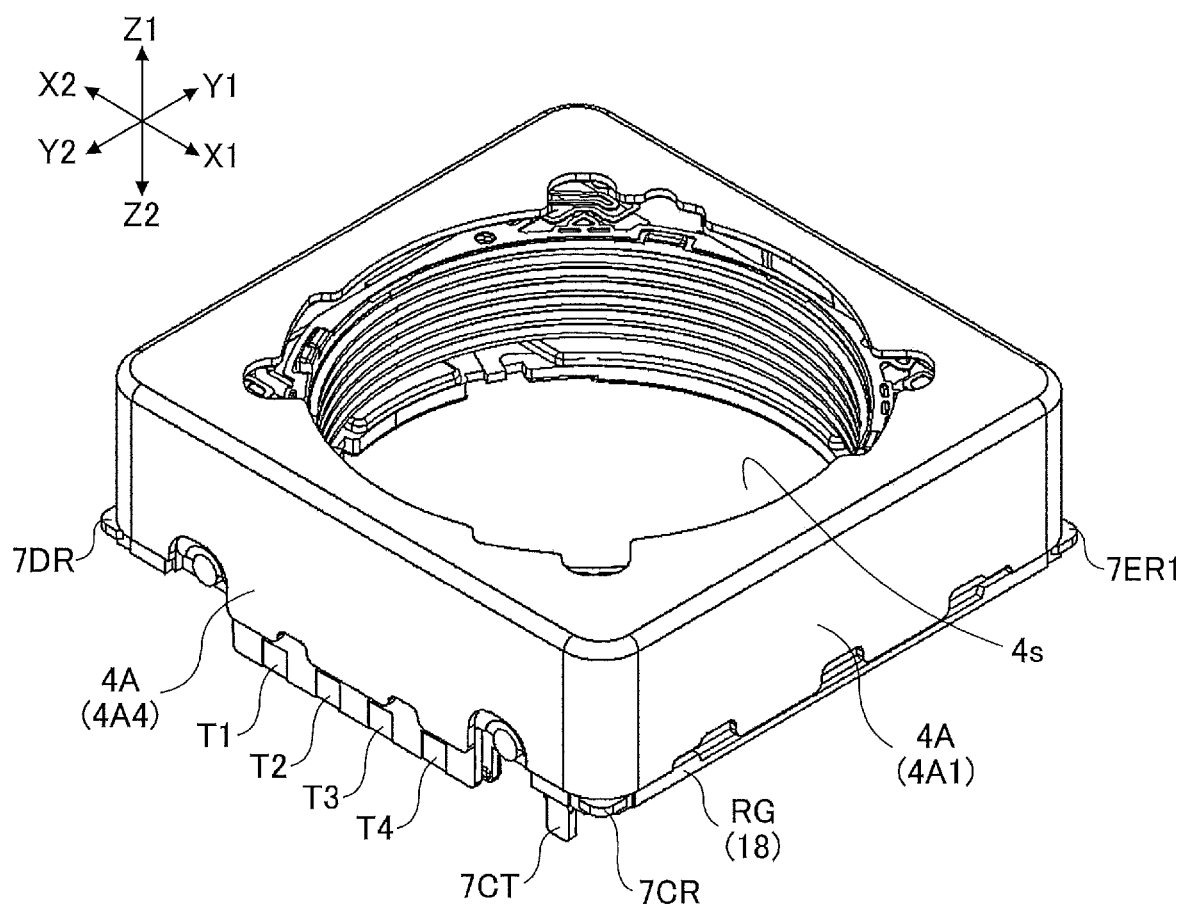
FIG. 2A is an upper perspective view of the lens driving apparatus.
Figure 2B:
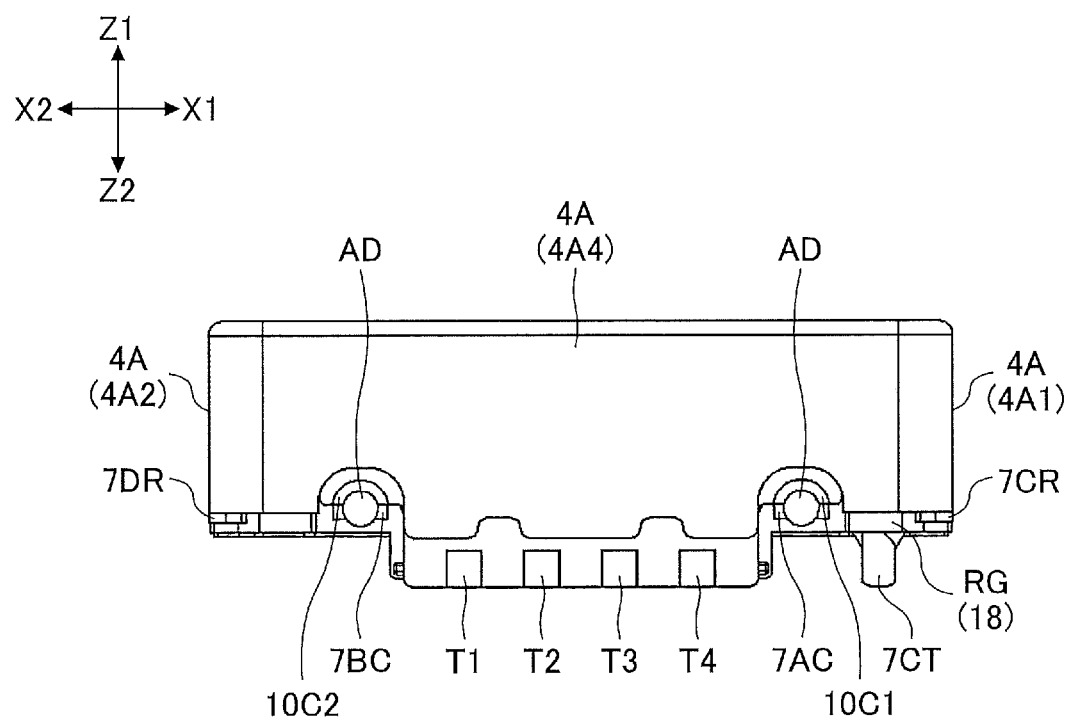
FIG. 2B is a front view of the lens driving apparatus.
Figure 3A:
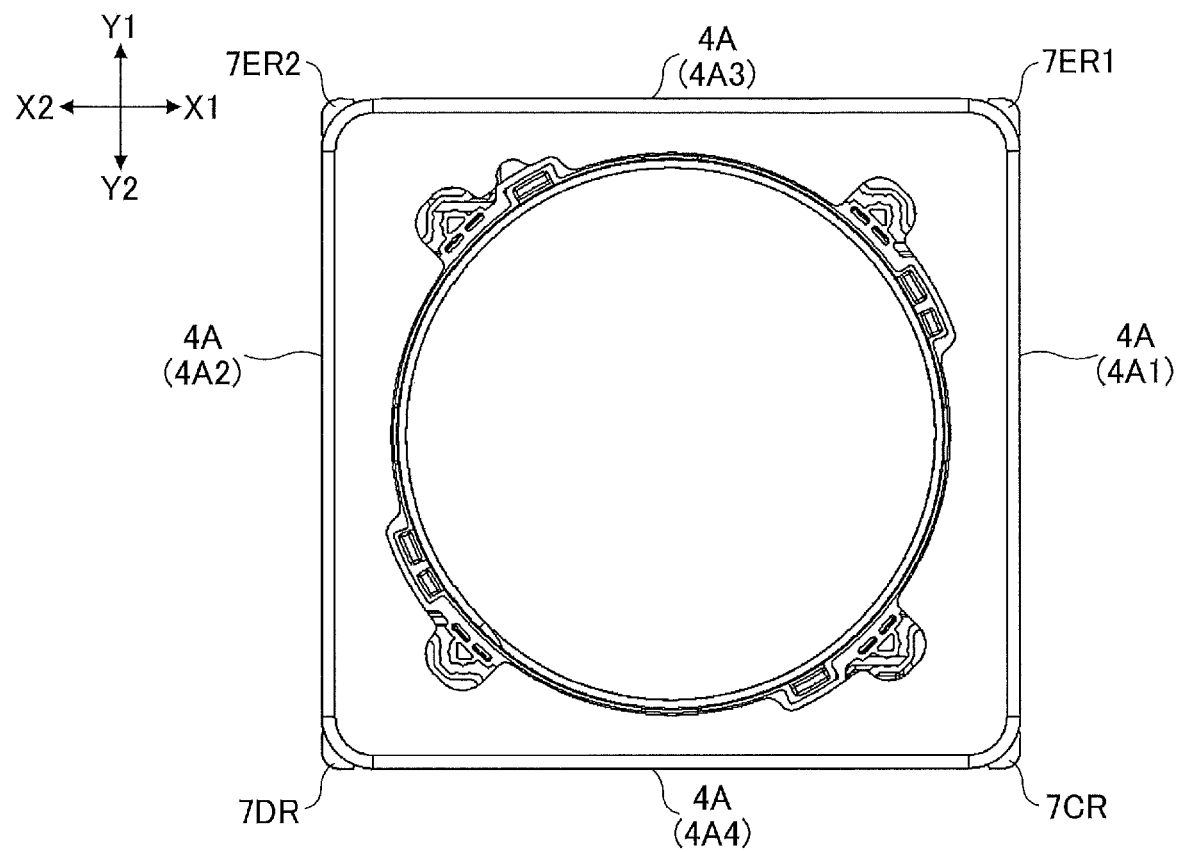
FIG. 3A is a top view of the lens driving apparatus.
Figure 3B:
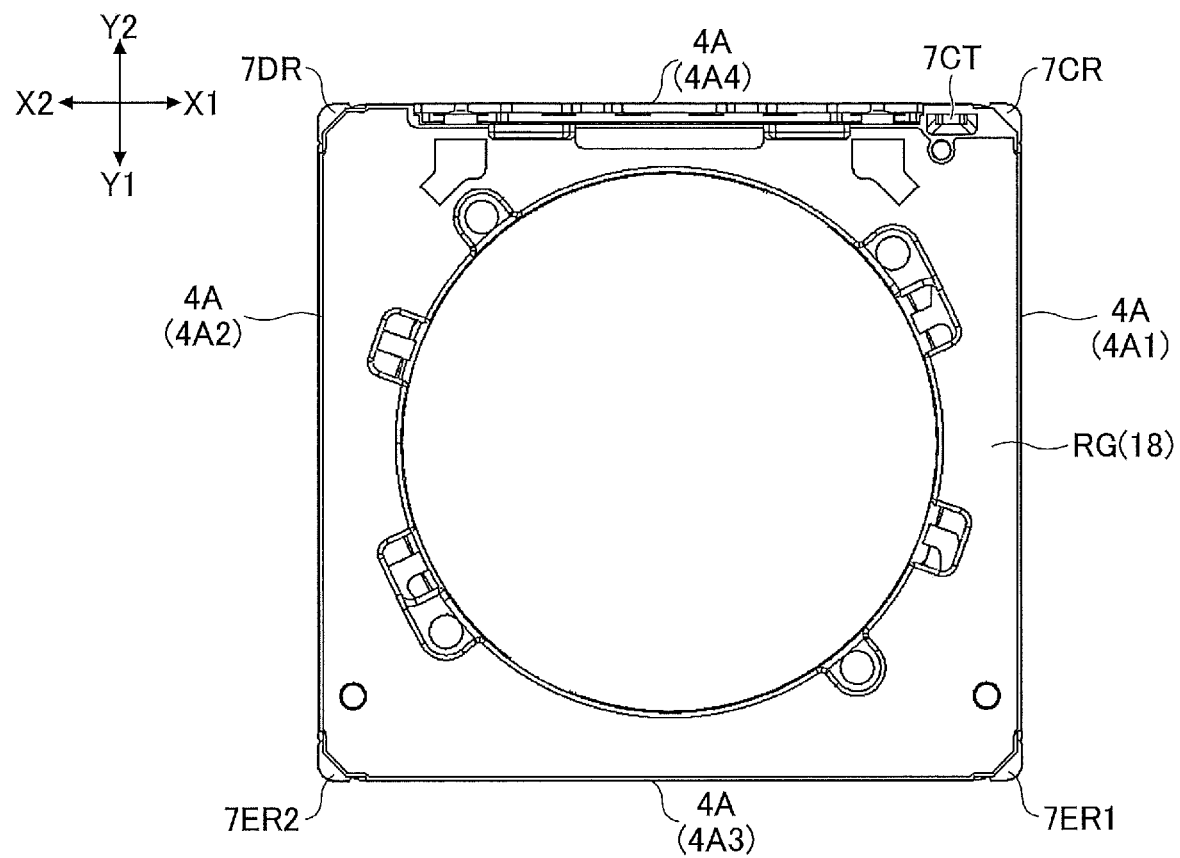
FIG. 3B is a bottom view of the lens driving apparatus.
Figure 4A:
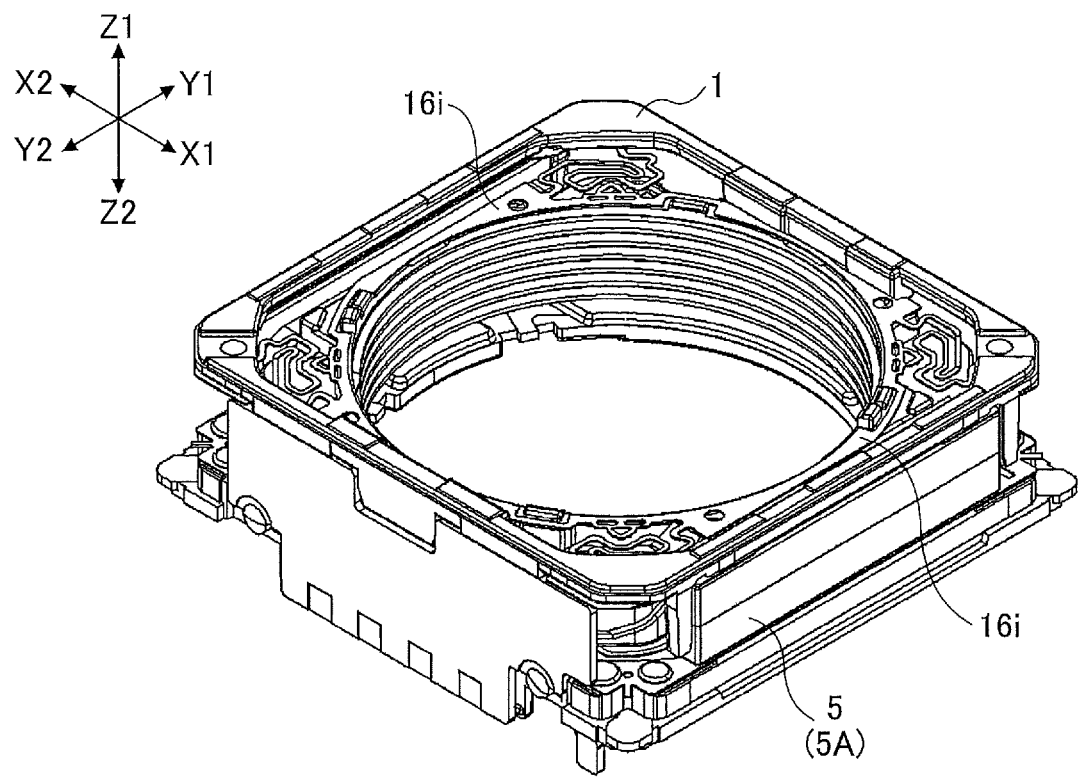
FIG. 4A is an upper perspective view of the lens driving apparatus with a yoke omitted.
Figure 4B:
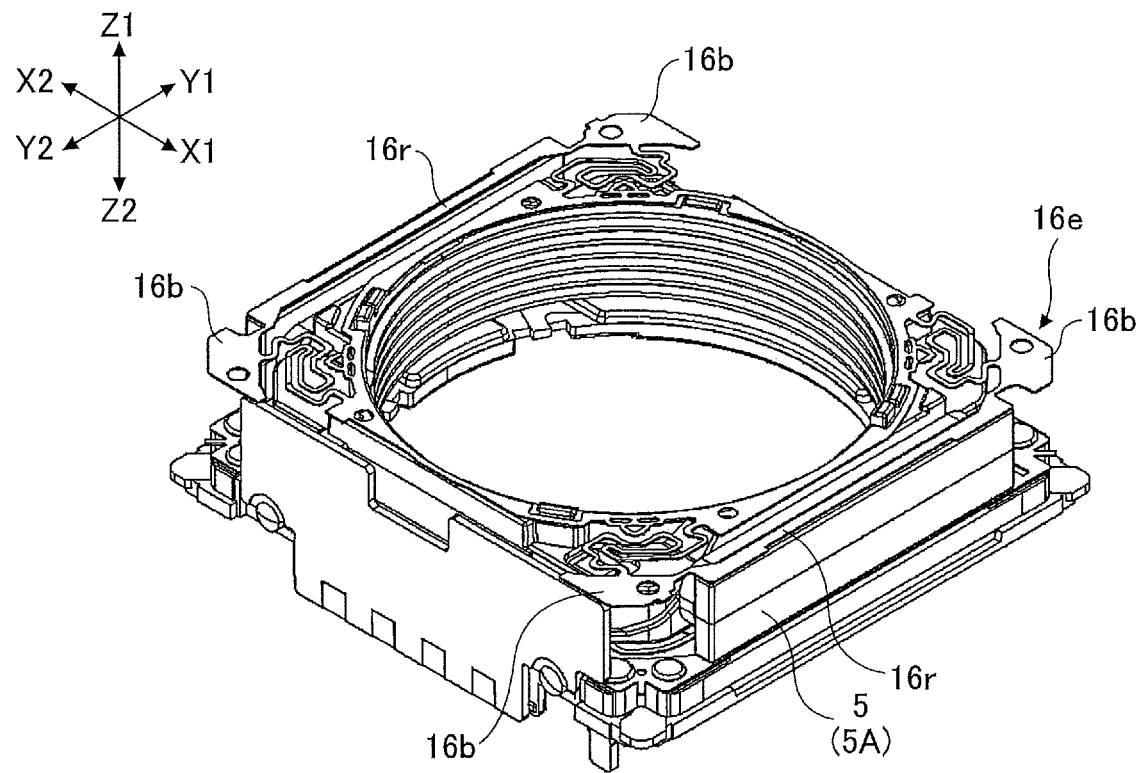
FIG. 4B is an upper perspective view of the lens driving apparatus with a spacer member and the yoke omitted.

Hereinafter, a lens driving apparatus 101 according to an embodiment of the present invention will be described with reference to the drawings. FIG. 1 is an exploded perspective view of a lens driving apparatus 101. FIG. 2A is an upper perspective view of the lens driving apparatus 101, and FIG. 2B is a front view of the lens driving apparatus 101 viewed from the Y2 side. FIG. 3A is a top view of the lens driving apparatus 101 and FIG. 3B is a bottom view of the lens driving apparatus 101. FIG. 4A is an upper perspective view of the lens driving apparatus 101 with a yoke 4 removed, and FIG. 4B is an upper perspective view of the lens driving apparatus 101 with a spacer member 1 and the yoke 4 removed. Both FIGS. 4A and 4B correspond to FIG. 2A.

As illustrated in FIG. 1, the lens driving apparatus 101 includes a lens holding member 2 capable of holding the lens body (not illustrated), a driving mechanism MK that moves the lens holding member 2 along an optical axis direction (Z-axis direction) with respect to the lens body, a leaf spring 6 for supporting the lens holding member 2 so as to be movable in an optical axis direction, a fixing side member RG to which the leaf spring 6 is fixed, and a metal member 7 for providing an electrical connection. The lens body is, for example, a cylindrical lens barrel with at least one lens, the central axis of which being configured to extend along the optical axis. The optical axis direction includes the direction of an optical axis JD relative to the lens body and the direction parallel to the optical axis JD.

As illustrated in FIG. 1, the driving mechanism MK includes a coil 3 having two oval-shaped winding portions 13 (see FIG. 5B) held on two opposite sides of the four sides of the lens holding member 2 having a substantially rectangular shape in a top view, the yoke 4 also serving as an outer case shaped as a rectangular box, a magnetic field generating member 5 disposed so as to face the coil 3 in a radial direction (a direction perpendicular to the optical axis direction), a detection magnet 8 and a balance magnet 9 attached to the lens holding member 2, and a magnetic detection member 11 attached to a flexible printed circuit board 10.

The detection magnet 8 is a bipolar magnet attached to the lens holding member 2 for detecting the position of the lens holding member 2. The balance magnet 9 is a bipolar magnet attached to the lens holding member 2 to compensate for the effect of the weight of the detection magnet 8 on the lens holding member 2, and has the same weight as the detection magnet 8. In the present embodiment, the detection magnet 8 is disposed such that the magnetizing direction thereof is opposite to the magnetizing direction of the balance magnet 9 in a vertical direction. Both the detection magnet 8 and the balance magnet 9 are fixed to the lens holding member 2 by an adhesive.

The magnetic detection member 11 includes a Hall element for detecting a magnetic field generated by the detection magnet 8 and a driver IC equipped with a current control circuit for controlling a current flowing through the coil 3. In the present embodiment, the magnetic detection member 11 is configured by electronic components in which at least a Hall element and a chip configuring the driver IC are housed in one package.

The yoke 4 is a part of the driving mechanism MK. In the present embodiment, the yoke 4 is manufactured by performing a punching process and a raising process on a sheet material formed of a soft magnetic material such as iron. However, the yoke 4 may be replaced by a cover formed of a non-magnetic material such as austenitic stainless steel and the like.

Specifically, the yoke 4 has a box-like outer shape that defines a housing portion 4s as illustrated in FIG. 1. The yoke 4 has a rectangular cylindrical outer peripheral wall portion 4A and a flat annular upper plate portion 4B disposed so as to be connected to the upper end (Z1 side end) of the outer peripheral wall portion 4A. An opening is formed in the upper plate portion 4B.

The outer peripheral wall portion 4A includes a first side plate portion 4A1, a second side plate portion 4A2, a third side plate portion 4A3, and a fourth side plate portion 4A4. The first side plate portion 4A1 and the second side plate portion 4A2 face each other, and the third side plate portion 4A3 and the fourth side plate portion 4A4 face each other. In the present embodiment, the first side plate portion 4A1 and the second side plate portion 4A2 are perpendicular to the third side plate portion 4A3 and the fourth side plate portion 4A4.

The detection magnet 8 is disposed at an upper side (Z1 side) of one corner of the lens holding member 2 having a substantially rectangular outer shape as viewed from the top. Specifically, the detection magnet 8 is fitted into a recess portion formed on the upper side of the corner portion between the side portion facing the first side plate portion 4A1 and the side portion facing the fourth side plate portion 4A4 among the four side portions of the lens holding member 2, the recess portion being formed at a position closer to the fourth side plate portion 4A4 than to the first side plate portion 4A1.

The balance magnet 9 is disposed on another upper side of a corner of the lens holding member 2. Specifically, the balance magnet 9 is fitted into a recess portion formed on the upper side of a corner portion between the side portion facing the second side plate portion 4A2 and the side portion facing the third side plate portion 4A3 of the four side portions of the lens holding member 2, the recess portion being formed at a position closer to the third side plate portion 4A3 than to the second side plate portion 4A2.

The yoke 4 so configured accommodates the coil 3 and the magnetic field generating member 5 within the housing portion 4s and is coupled to a base member 18 as illustrated in FIG. 2A to form a housing together with the base member 18. The base member 18 opposes the upper plate portion 4B of the yoke 4 that is a cover member in the optical axis direction.

The magnetic field generating member 5 forms part of the driving mechanism MK. In the present embodiment, the magnetic field generating member 5 includes a first magnetic field generating member 5A disposed facing the first side plate portion 4A1 and a second magnetic field generating member 5B disposed facing the second side plate portion 4A2.

The first magnetic field generating member 5A is configured by a combination of two bipolar magnets. However, the first magnetic field generating member 5A may be configured by one bipolar magnet or may be configured by one four-pole magnet. The same applies to the second magnetic field generating member 5B.

Specifically, the first magnetic field generating member 5A includes a first upper magnet 5AU and a first lower magnet 5AL, as illustrated in FIG. 1. The second magnetic field generating member 5B includes a second upper magnet 5BU and a second lower magnet 5BL.

The first upper magnet 5AU, the first lower magnet 5AL, the second upper magnet 5BU, and the second lower magnet 5BL are substantially rectangular in shape. The magnetic field generating member 5 is positioned outside the coil 3 (the winding portion 13) and is disposed along two sides of the outer peripheral wall portion 4A of the yoke 4. The magnetic field generating member 5 is fixed to the inner surface of the outer peripheral wall portion 4A by an adhesive.

The leaf spring 6 includes an upper leaf spring 16 disposed between the lens holding member 2 and the yoke 4 (the spacer member 1) and a lower leaf spring 26 disposed between the lens holding member 2 and the base member 18. The lower leaf spring 26 includes a lower leaf spring 26A and a lower leaf spring 26B.

A fixing side member RG includes the spacer member 1, the yoke 4, and the base member 18 into which the metal member 7 is embedded.

The spacer member 1 is disposed so as to prevent collision between the lens holding member 2 and the yoke 4 when the lens holding member 2 moves in the Z1 direction.

The lens driving apparatus 101 is substantially shaped as a rectangular parallelepiped and is attached onto a substrate (not illustrated) on which an imaging element (not illustrated) is mounted. The substrate, the lens driving apparatus 101, the lens body mounted to the lens holding member 2, and the imaging device mounted to the substrate facing the lens body, configure a camera module. The coil 3 is connected to the magnetic detection member 11 via the lower leaf spring 26, the metal member 7, and the flexible printed circuit board 10. When current flows from the current control circuit (driver IC) provided in the magnetic detection member 11 to the coil 3, the driving mechanism MK generates an electromagnetic force along the optical axis direction.

The lens driving apparatus 101 uses this electromagnetic force to move the lens holding member 2 along the optical axis direction on the Z1 side (the subject side) of the imaging element to implement an auto-focus adjustment function. Specifically, the lens driving apparatus 101 moves the lens holding member 2 in the direction away from the imaging element to enable macro-photographing, and moves the lens holding member 2 in a direction to be closer to the imaging element to enable infinite photographing.

Figure 5A:
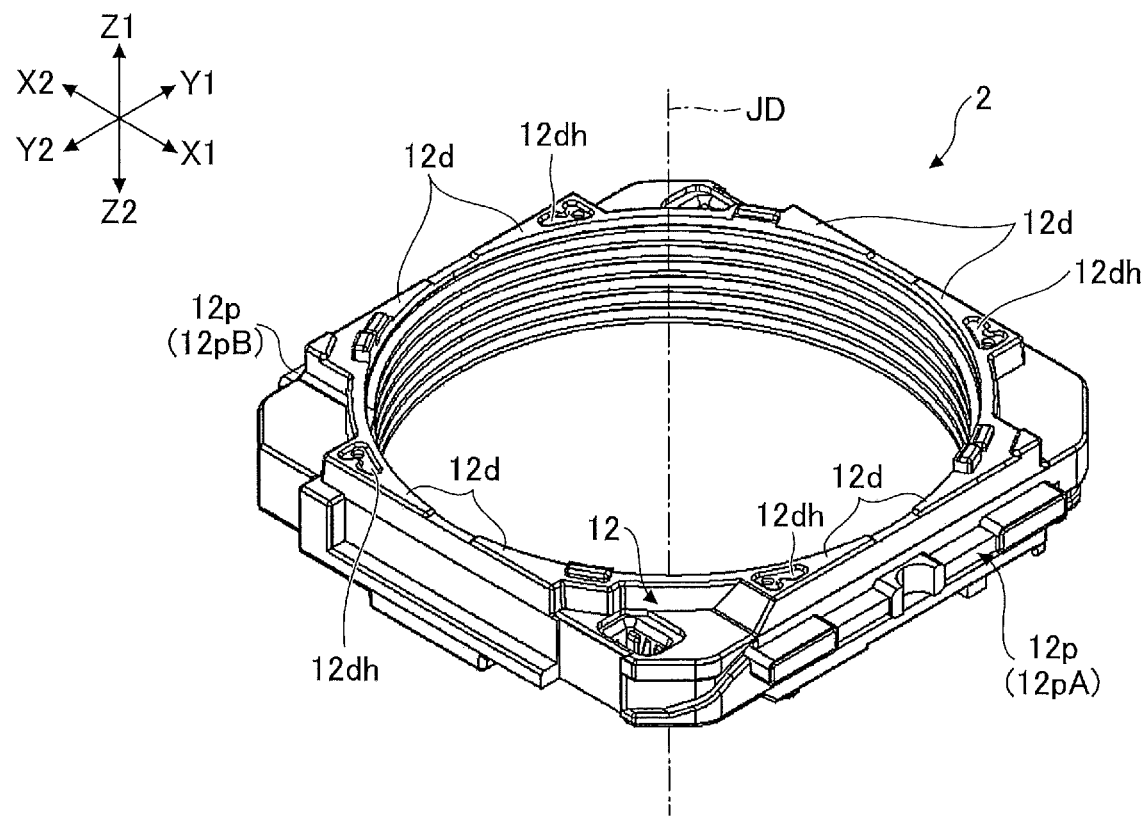
FIG. 5A is an upper perspective view of a lens holding member.
Figure 5B:
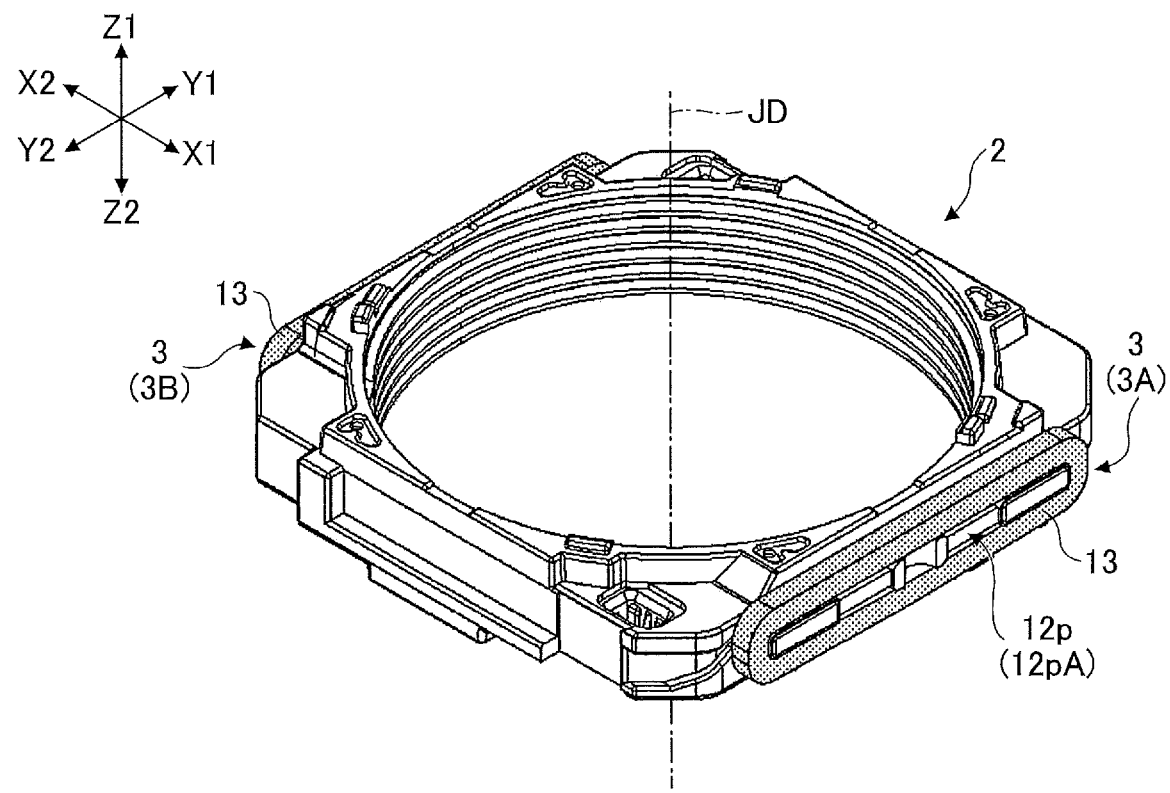
FIG. 5B is an upper perspective view of the lens holding member with a coil wound thereto.
Figure 6A:
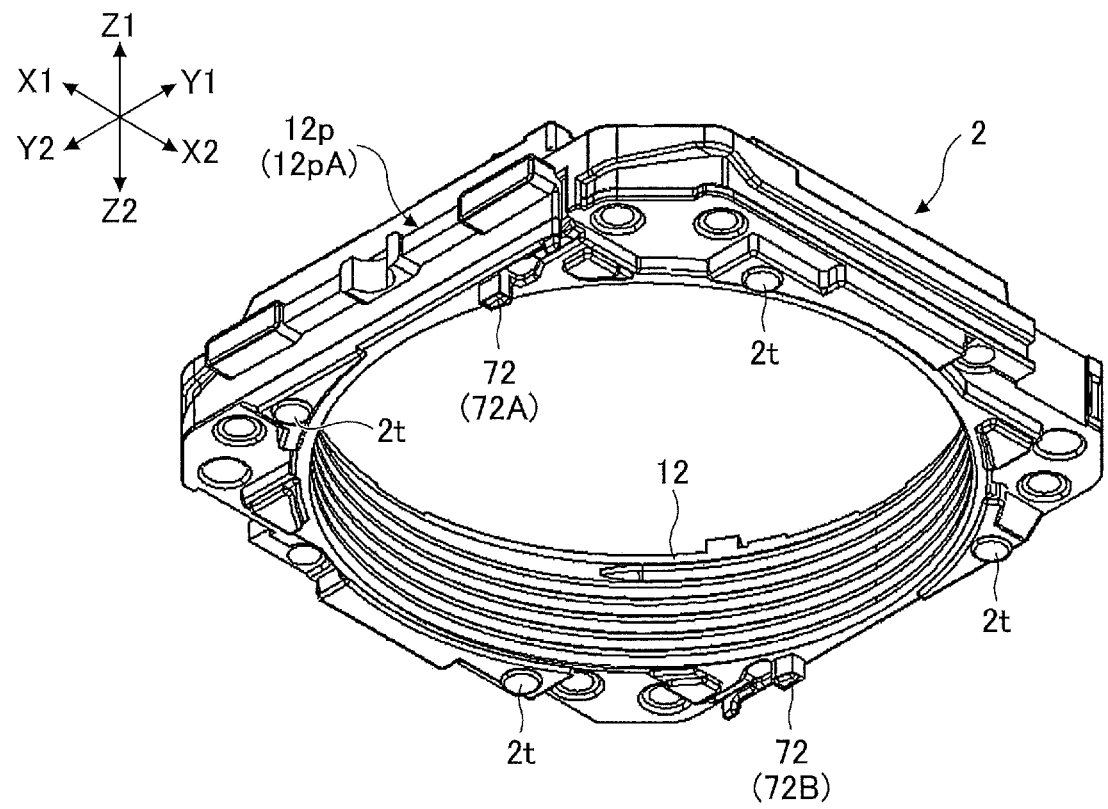
FIG. 6A is a lower perspective view of the lens holding member.
Figure 6B:
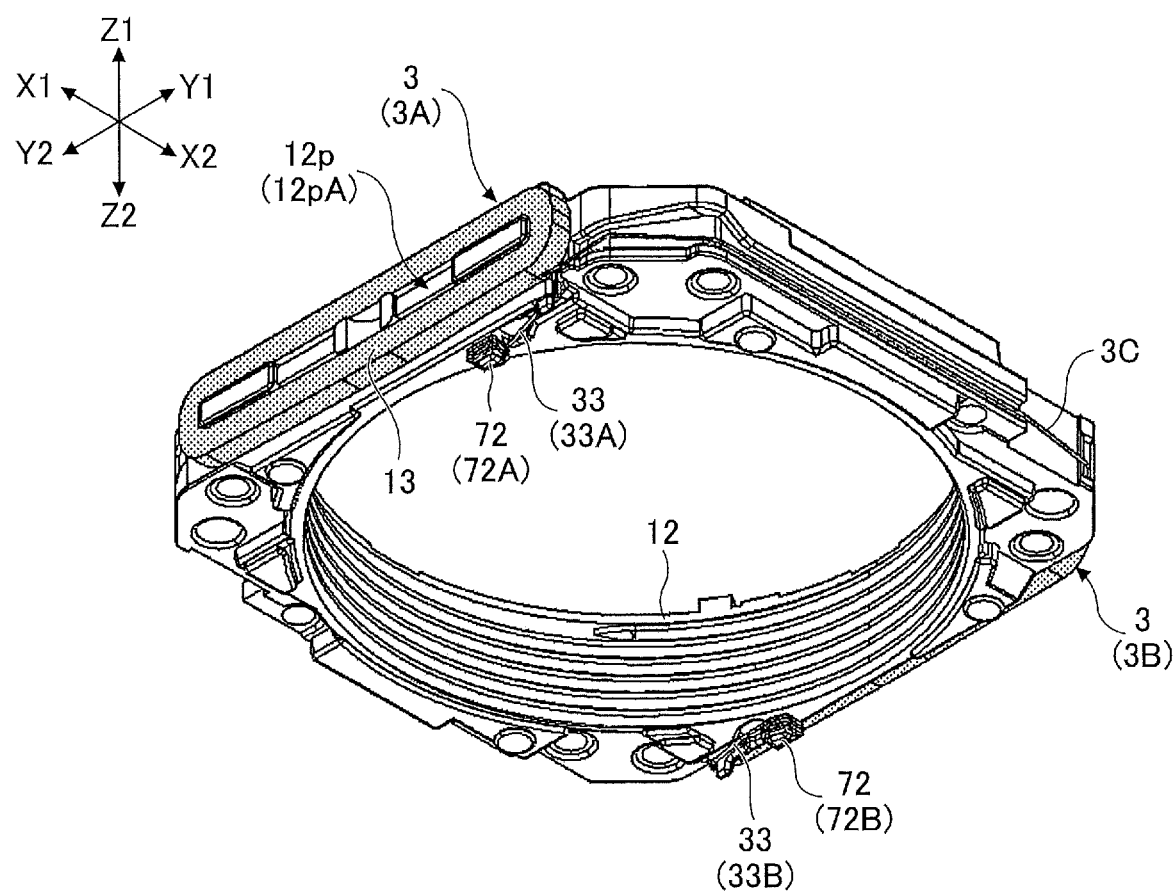
FIG. 6B is a lower perspective view of the lens holding member with the coil wound thereto.
Figure 7A:
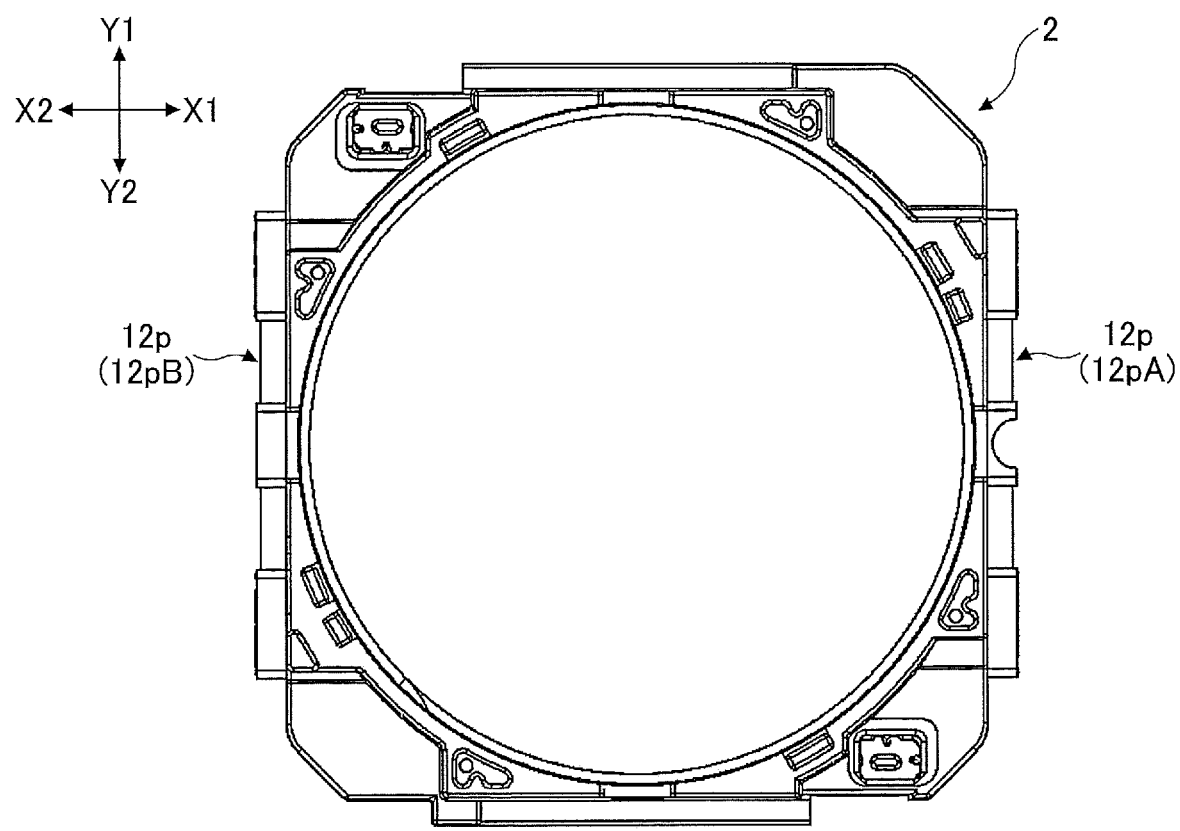
FIG. 7A is a top view of the lens holding member.
Figure 7B:
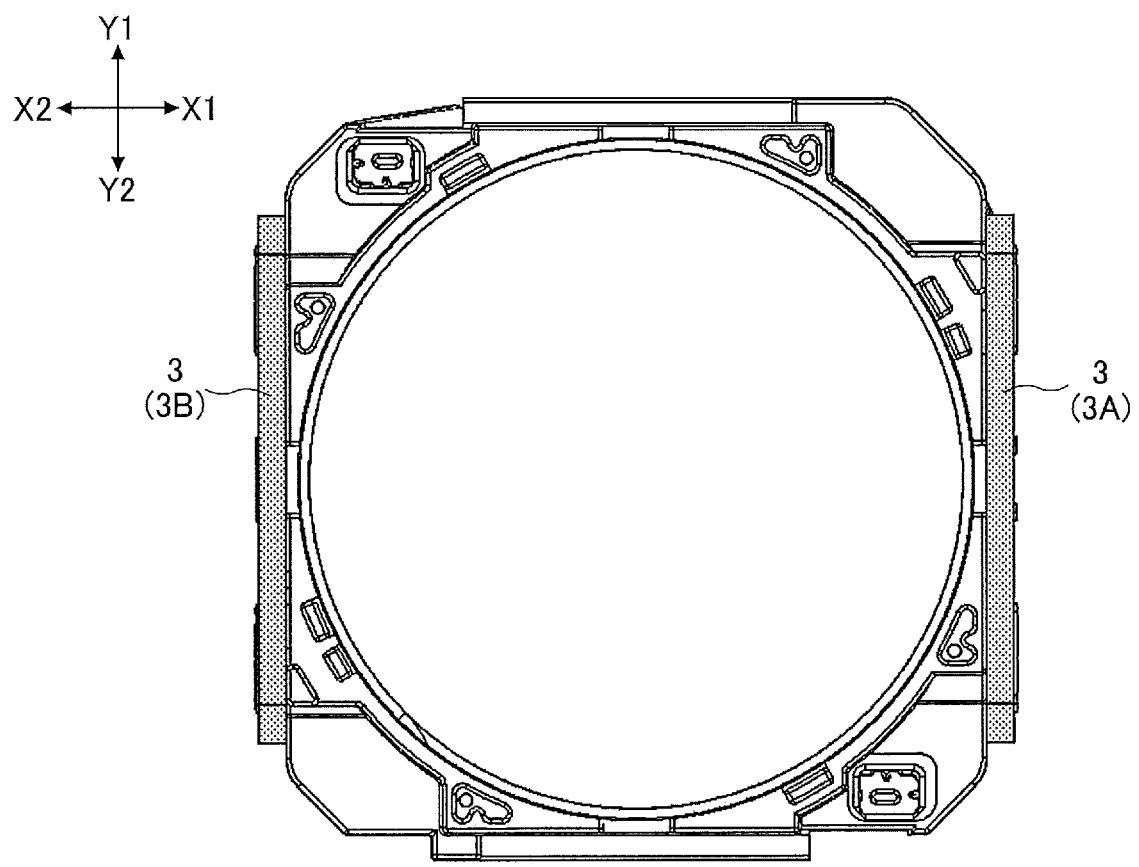
FIG. 7B is a top view of the lens holding member with the coil wound thereto.
Figure 8A:
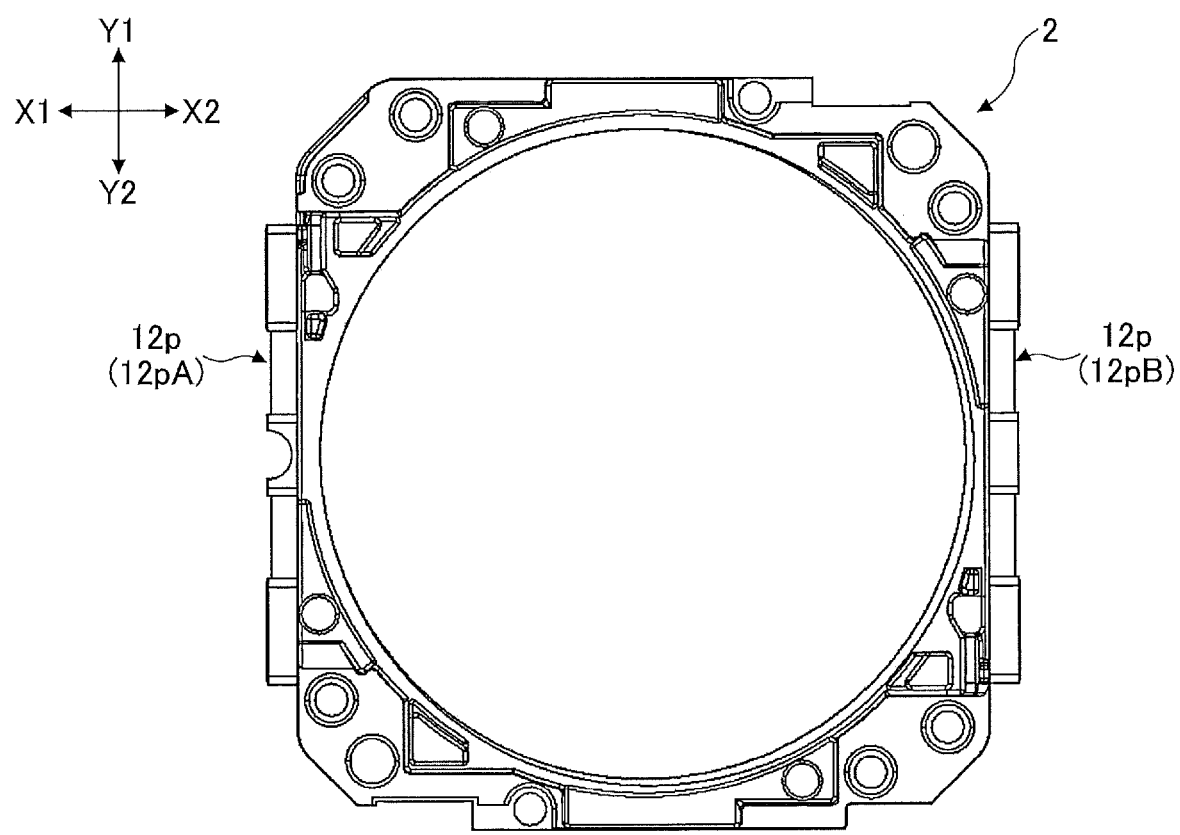
FIG. 8A is a bottom view of the lens holding member.
Figure 8B:
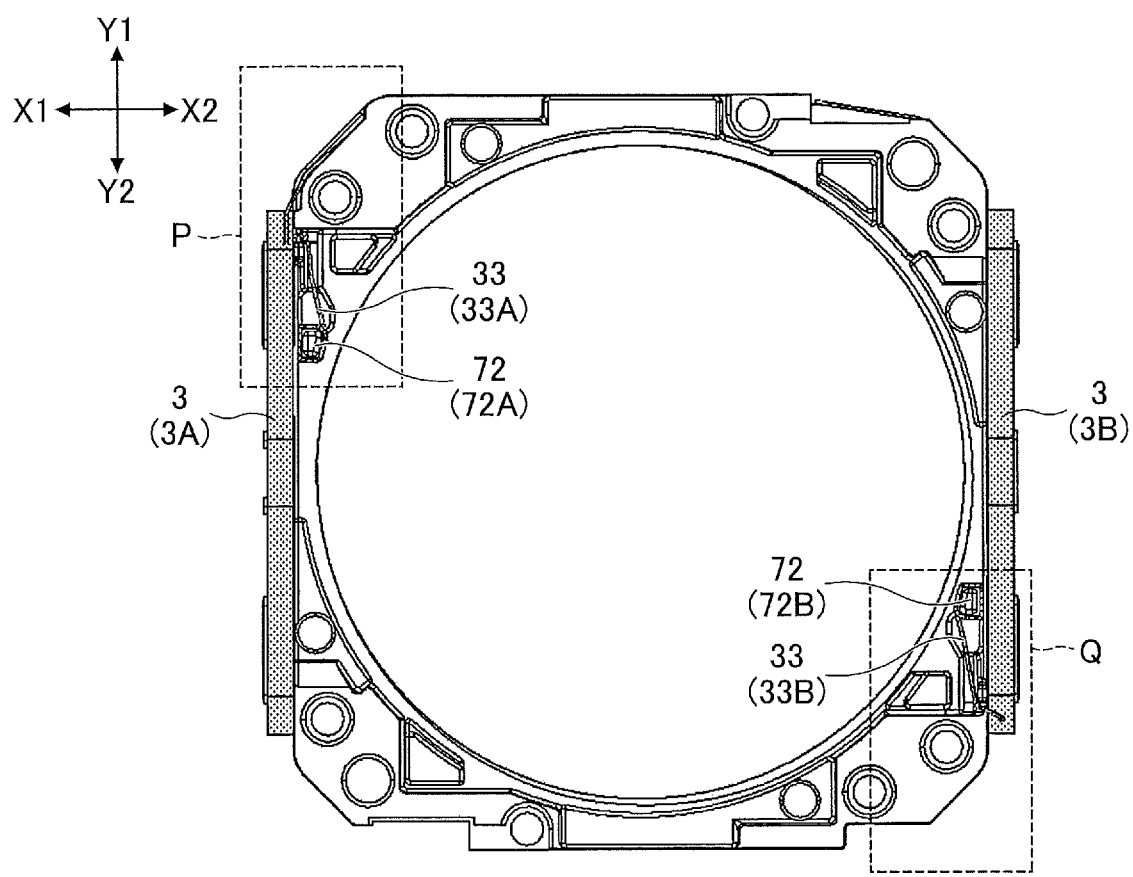
FIG. 8B is a bottom view of the lens holding member with the coil wound thereto.
Figure 9A:
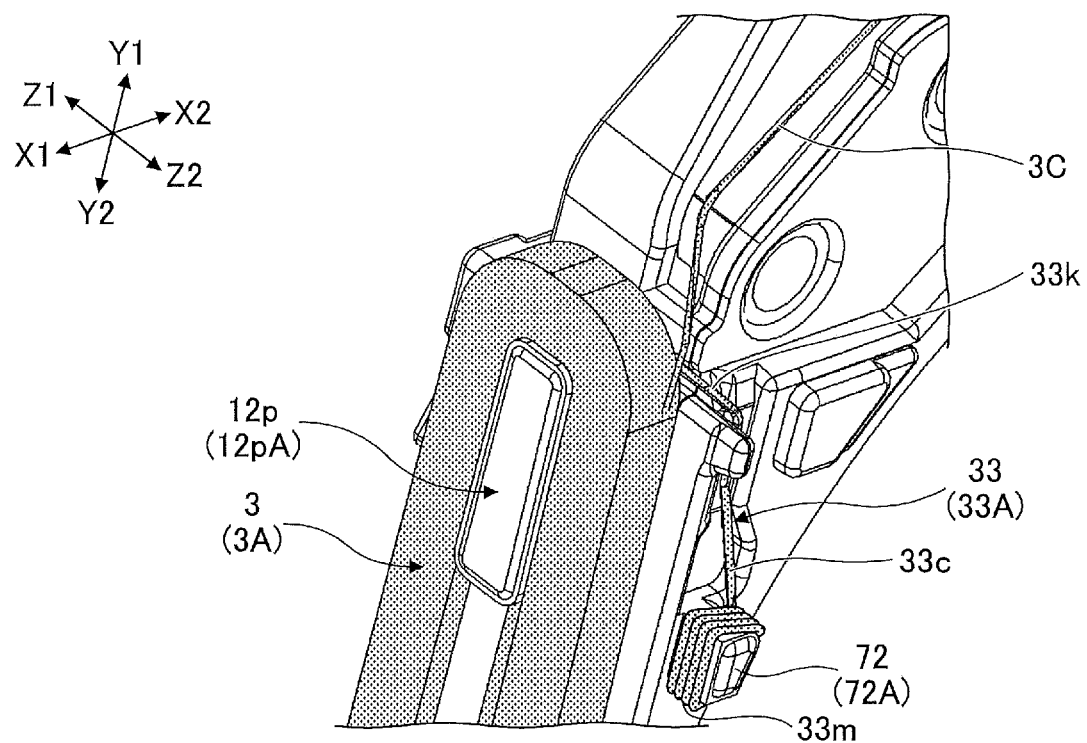
FIG. 9A is an enlarged perspective view of a portion of the lens holding member.
Figure 9B:
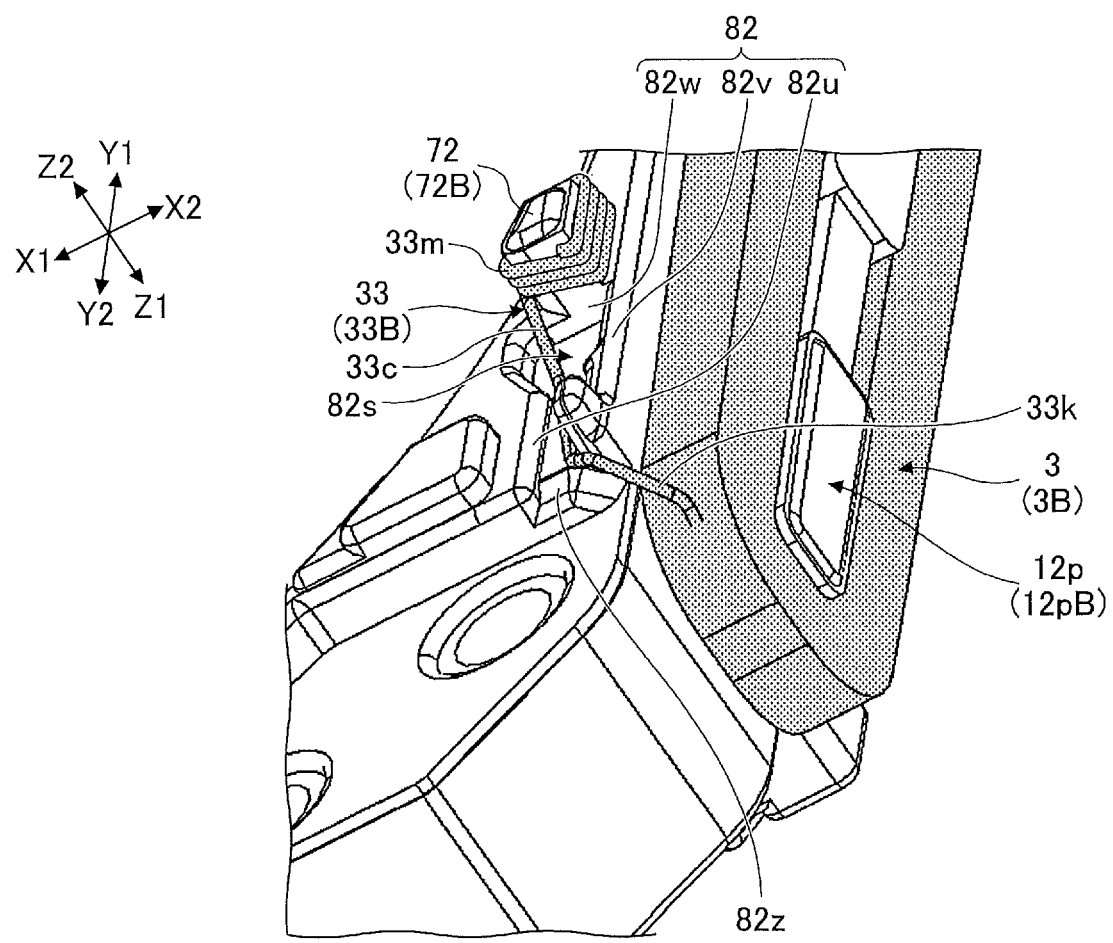
FIG. 9B is an enlarged perspective view of another portion of the lens holding member.
Figure 10A:
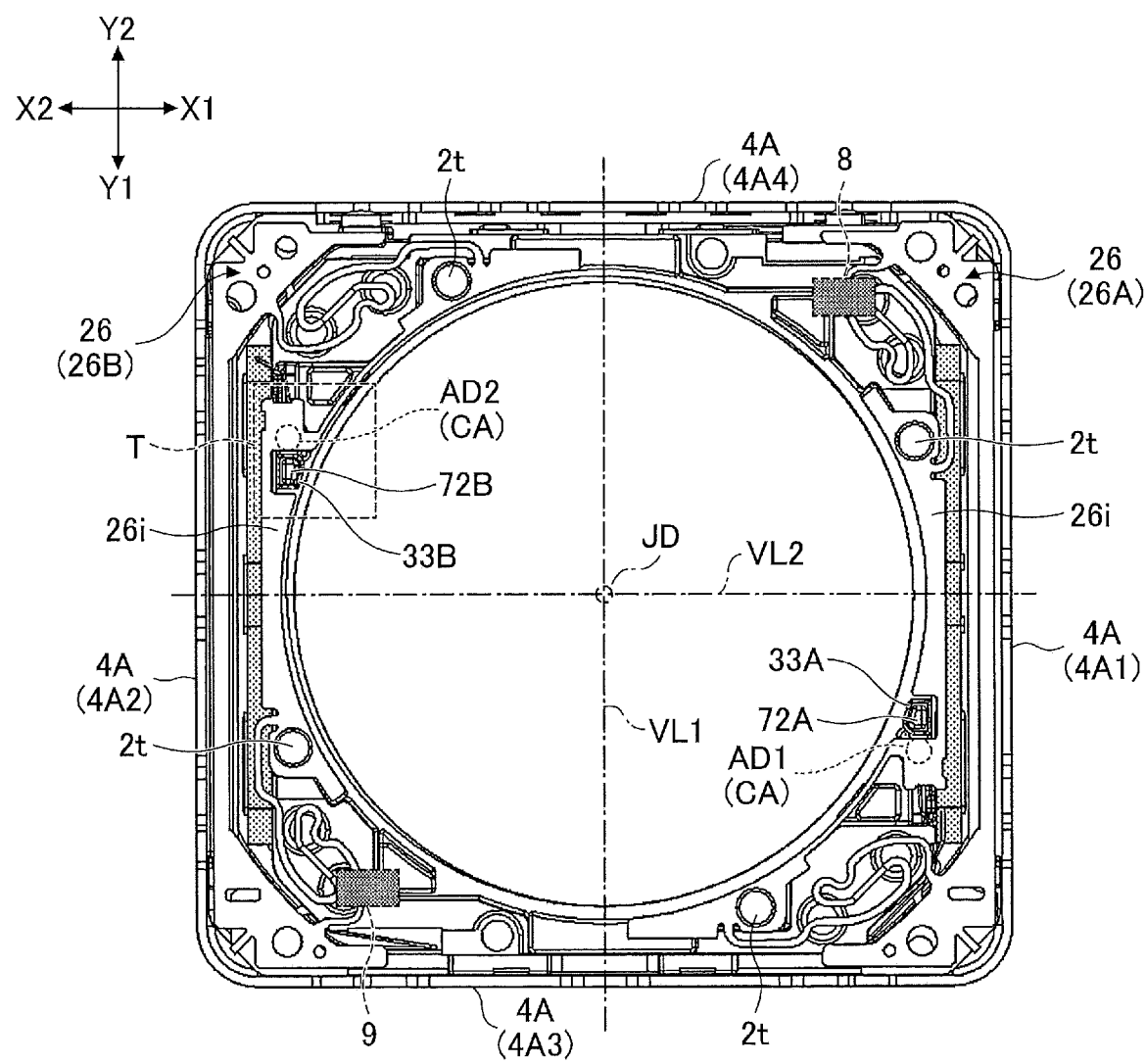
FIG. 10A is a bottom view of the lens driving apparatus in which a metal member and a base member are omitted.
Figure 10B:
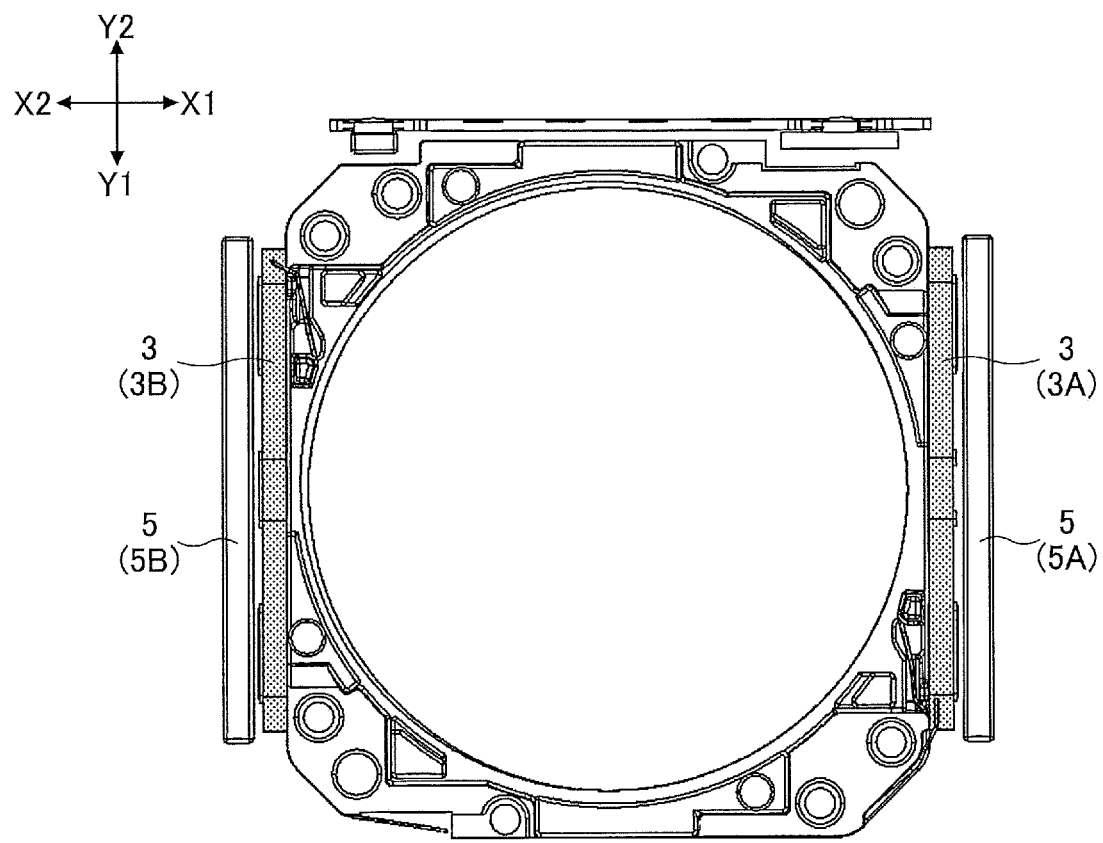
FIG. 10B is a bottom view of the lens driving apparatus in which the metal member, the base member, the spacer member, the yoke, an upper leaf spring, and a lower leaf spring are omitted.

Next, the lens holding member 2 and the driving mechanism MK will be described. FIG. 5A is an upper perspective view of the lens holding member 2, and FIG. 5B illustrates a state where the coil 3 is wound on the lens holding member 2 of FIG. 5A. FIG. 6A is a lower perspective view of the lens holding member 2, and FIG. 6B illustrates a state where the coil 3 is wound on the lens holding member 2 of FIG. 6A. FIG. 7A is a top view of the lens holding member 2, and FIG. 7B illustrates the state where the coil 3 is wound on the lens holding member 2 of FIG. 7A. FIG. 8A is a bottom view of the lens holding member 2, and FIG. 8B illustrates the state where the coil 3 is wound on the lens holding member 2 illustrated in FIG. 8A. FIG. 9A is an enlarged perspective view of a portion P illustrated in FIG. 8B, and FIG. 9B is an enlarged perspective view of a portion Q illustrated in FIG. 8B. FIG. 10A is a bottom view of the lens driving apparatus 101 in which the metal member 7 and the base member 18 are not illustrated, and FIG. 10B is a bottom view of the lens driving apparatus 101 in which the spacer member 1, the yoke 4, the upper leaf spring 16, and the lower leaf spring 26 are not illustrated.

In the present embodiment, the lens holding member 2 is manufactured by performing injection molding on a synthetic resin such as a liquid crystal polymer (LCP). Specifically, the lens holding member 2 includes a cylindrical portion 12 having a through-hole formed therethrough extending along the optical axis, as illustrated in FIG. 5A.

The cylindrical portion 12 is provided with thread grooves on the cylindrical inner circumferential surface for mounting the lens body. The cylindrical portion 12 is provided with a pedestal portion 12d having four depressions 12dh on the end surface on the subject side. On the pedestal portion 12d, an inner portion 16i of the upper leaf spring 16 is mounted as illustrated in FIG. 4A.

The outer peripheral surface of the cylindrical portion 12 is provided with winding projections 12p that hold the coil 3 as illustrated in FIG. 5A. In the present embodiment, the winding projections 12p have a substantially rectangular shape projecting radially outwardly from the outer peripheral surface of the cylindrical portion 12 so that the coil 3 can be wound around an axis perpendicular to the optical axis direction. Specifically, the winding projections 12p are disposed on two outer surfaces, which are facing each other, of the lens holding member 2.

As illustrated in FIG. 5B, the coil 3 is formed by winding an electrically conductive wire around the winding projections 12p. Specifically, as illustrated in FIG. 6B, the coil 3 includes a first coil 3A disposed so as to face a first side plate portion 4A1, a second coil 3B disposed so as to face a second side plate portion 4A2, and a coupling portion 3C which links the first coil 3A and the second coil 3B to each other. The winding projections 12p include a first winding projection 12pA on which the first coil 3A is wound and a second winding projection 12pB on which the second coil 3B is wound. In the present embodiment, the coil 3 is fixed to the winding projections 12p without using an adhesive, but the coil 3 may be fixed to the winding projections 12p by using an adhesive. The winding direction of the coil 3 is optional and is determined in accordance with the arrangement (magnetization direction) of the magnetic field generating member 5.

The first coil 3A includes a winding portion 13 as a coil body portion formed by being wound in an annular manner around the first winding projection 12pA, and the second coil 3B includes the winding portion 13 as a coil body portion formed by being wound in an annular manner around the second winding projection 12pB. The illustration in FIG. 5B omits, for clarity, a detailed winding state of the electrically conductive wire having the surface thereof coated with an insulating member, with respect to the winding portion 13. The same applies to other figures illustrating the winding portion 13.

As illustrated in FIG. 6A, the lens holding member 2 includes two holding portions 72 that are angular, projecting protrusions that protrude downward (in the 22 direction) from the end surface of the imaging element (on the 22 side) and four round, projecting protruding portions 2t.

As illustrated in FIG. 6B, the holding portion 72 includes a first holding portion 72A corresponding to the winding start side of the coil 3 and a second holding portion 72B corresponding to the winding end side of the coil 3. Both ends of the coil 3 are wound and held at the holding portions 72.

As illustrated in FIGS. 6A and 10A, the protruding portion 2t includes two protruding portions 2t corresponding to the lower leaf spring 26A and two protruding portions 2t corresponding to the lower leaf spring 26B. To the protruding portion 2t, an inner portion 26i, as a movable side supporting portion of the lower leaf spring 26A and the lower leaf spring 26B, is mounted and fixed. The fixing of the inner portion 26i of each of the lower leaf spring 26A and the lower leaf spring 26B, with the lens holding member 2, is accomplished by performing thermal caulking on the protruding portion 2t which is inserted through a through hole formed in the inner portion 26i. In the figures relating to the present embodiment, the protruding portion 2t is illustrated with the tip thereof deformed after being subjected to thermal caulking.

Next, the driving mechanism MK of the lens driving apparatus 101 will be described. As illustrated in FIGS. 10A and 10B, the driving mechanism MK includes the coil 3, the yoke 4, and the two magnetic field generating members 5 disposed facing the two side plate portions (the first side plate portion 4A1 and the second side plate portion 4A2) configuring the outer peripheral wall portion 4A of the yoke 4. Specifically, the magnetic field generating member 5 includes the first magnetic field generating member 5A disposed facing the first side plate portion 4A1 and the second magnetic field generating member 5B disposed facing the second side plate portion 4A2. The driving mechanism MK generates a driving force (thrust) by a current flowing through the coil 3 and a magnetic field generated by the magnetic field generating member 5, and moves the lens holding member 2 up and down along the optical axis direction.

As illustrated in FIG. 8B, an extending portion 33 of the coil 3 includes a first extending portion 33A that is linked to the first coil 3A at the winding start side of the coil 3 and a second extending portion 33B that is linked to the second coil 3B at the winding end side of the coil 3.

Specifically, as illustrated in FIG. 9A, the first extending portion 33A includes a winding portion 33m wound around the first holding portion 72A, a first opposing portion 33c extending opposite to a bottom surface (a surface on the Z2 side) of the lens holding member 2, and a second opposing portion 33k extending opposite to an edge between a bottom surface and a front surface (a surface on the X1 side) of the lens holding member 2. As illustrated in FIG. 9B, the second extending portion 33B includes the winding portion 33m wound around the second holding portion 72B, the first opposing portion 33c extending opposite to a bottom surface (a surface on the Z2 side) of the lens holding member 2, and the second opposing portion 33k extending opposite to an edge between a bottom surface and a back surface (a surface on the X2 side) of the lens holding member 2.

In the present embodiment, the first extending portion 33A is wound around the first holding portion 72A of the lens holding member 2 before the wire of the coil 3 is wound around the outer periphery of the first winding projection 12pA. In the example illustrated in FIG. 9A, a portion of the wire of the coil 3 is wound in four turns around the first holding portion 72A. Accordingly, the winding portion 33m is formed in the first holding portion 72A, and a portion of the first extending portion 33A is held in the first holding portion 72A. However, the first extending portion 33A may be wound around the first holding portion 72A after the wire of the coil 3 is wound around the outer periphery of the first winding projection 12pA.

Next, the wire is wound around the outer periphery of the first winding projection 12pA. At that time, as illustrated in FIG. 9A, the wire extending from the winding portion 33m extends so as to face the bottom surface of the lens holding member 2 and further extends so as to face the edge between the bottom surface and the front surface of the lens holding member 2. At this time, a portion facing the bottom surface of the lens holding member 2 configures the first opposing portion 33c of the first extending portion 33A, and a portion facing the edge of the lens holding member 2 configures the second opposing portion 33k of the first extending portion 33A.

The second opposing portion 33k of the first extending portion 33A is configured to contact the edge of the lens holding member 2 as illustrated in FIG. 9A when extending so as to face the edge of the lens holding member 2. Therefore, when a strong impact is applied to the lens driving apparatus 101 by dropping or the like, the first extending portion 33A of the coil 3 is pressed against the edge of the lens holding member 2. In the present embodiment, the edges of the lens holding member 2 are configured to be curved. Therefore, the first extending portion 33A is difficult to be cut at the edge of the lens holding member 2. The same applies to the edge of the lens holding member 2 in contact with the second extending portion 33B.

Thereafter, the coupling portion 3C is formed by a wire drawn from the winding portion 13 of the first coil 3A. Next, the wire is similarly wound around the outer periphery of the second winding projection 12pB. When the winding of the wire to the outer periphery of the first winding projection 12pA and the winding of the wire to the outer periphery of the second winding projection 12pB are completed, the second extending portion 33B, which is linked to the edge on the winding end side of the winding portion 13 of the second coil 3B, is drawn from the back surface side to the bottom surface side of the lens holding member 2 as illustrated in FIG. 9B.

Specifically, the second opposing portion 33k extends so as to face an edge between the bottom surface and the back surface of the lens holding member 2, and the first opposing portion 33c extends so as to face the bottom surface of the lens holding member 2, and the winding portion 33m is wound around the second holding portion 72B of the lens holding member 2. In the example illustrated in FIG. 9B, the second extending portion 33B is wound in four turns around the second holding portion 72B.

Figure 11A:
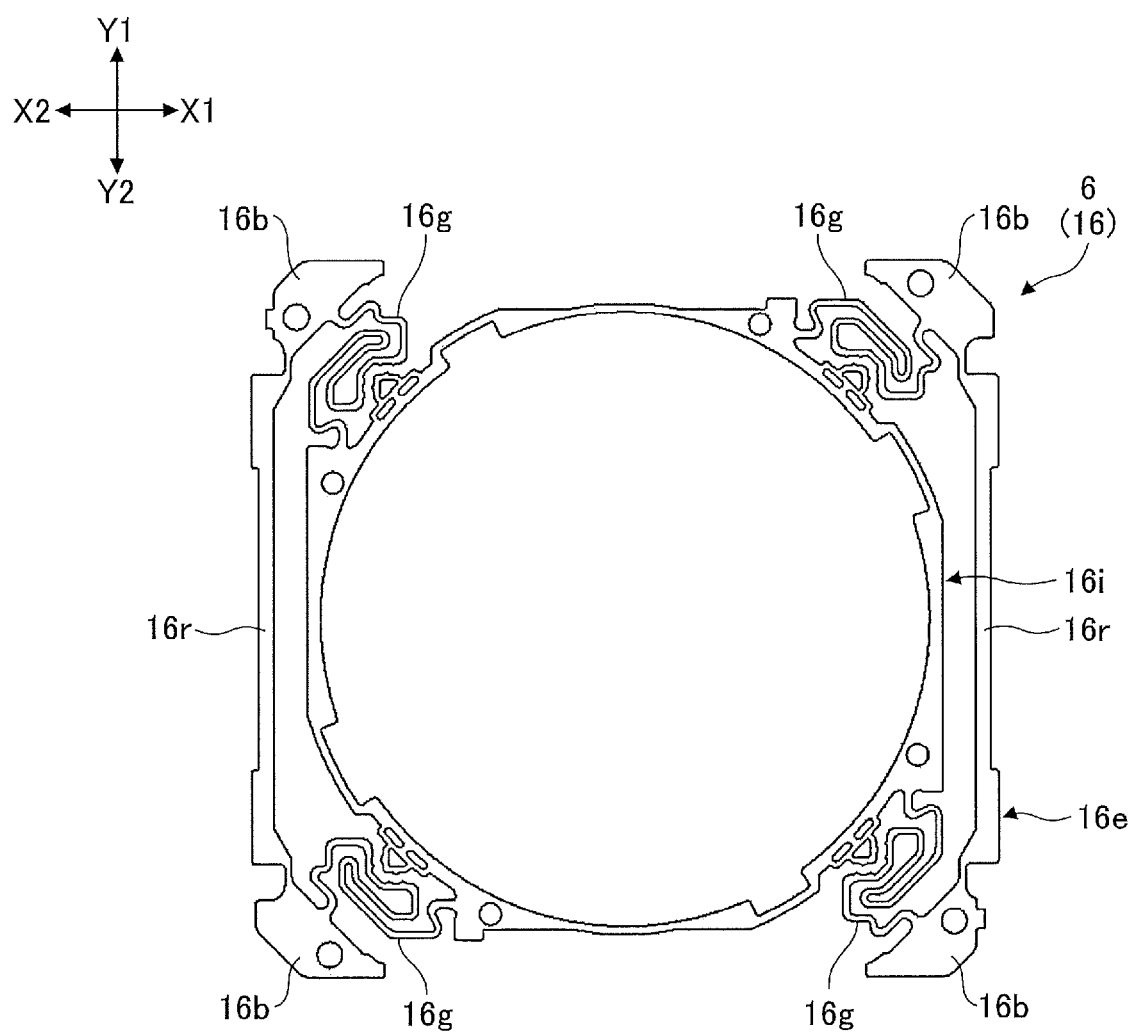
FIG. 11A is a top view of the upper leaf spring.
Figure 11B:
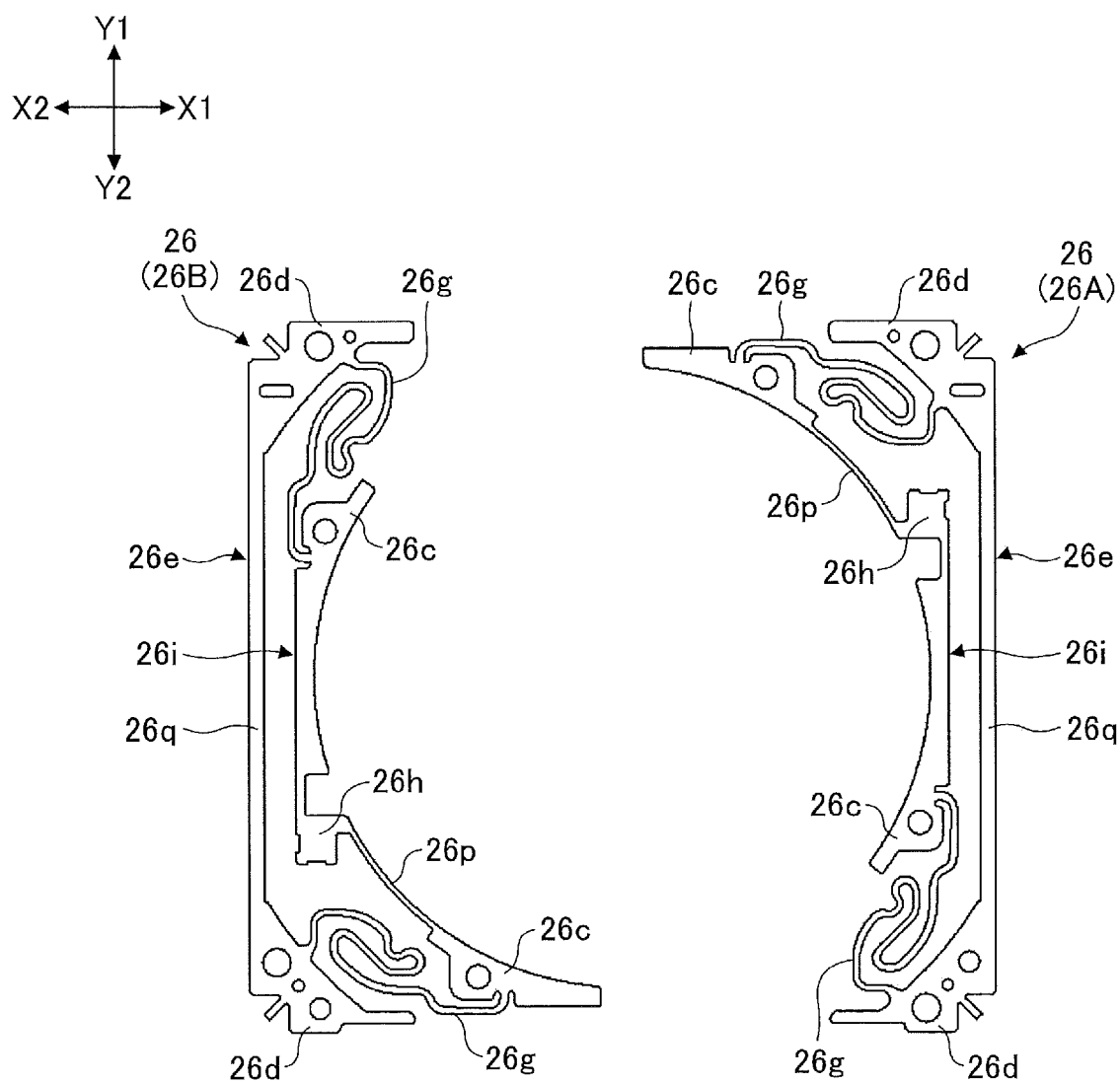
FIG. 11B is a top view of the lower leaf spring.
Figure 12A:
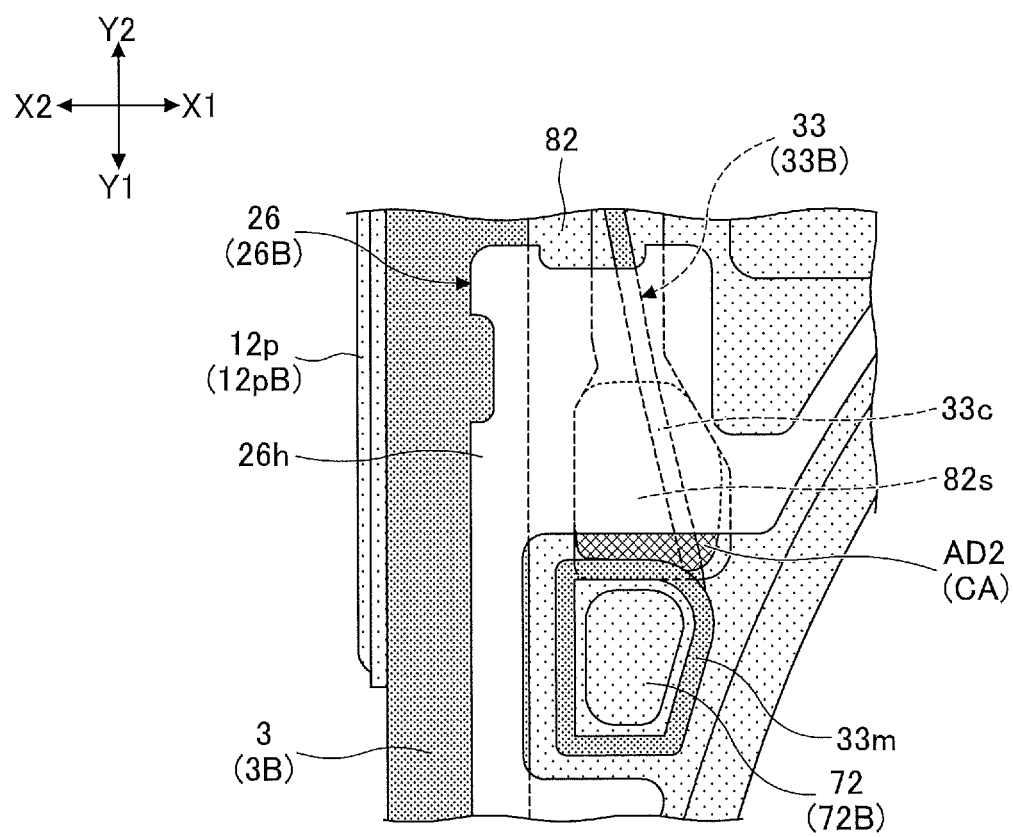
FIG. 12A is a bottom view of a portion of the lens holding member having the coil and the lower leaf spring attached thereto.
Figure 12B:
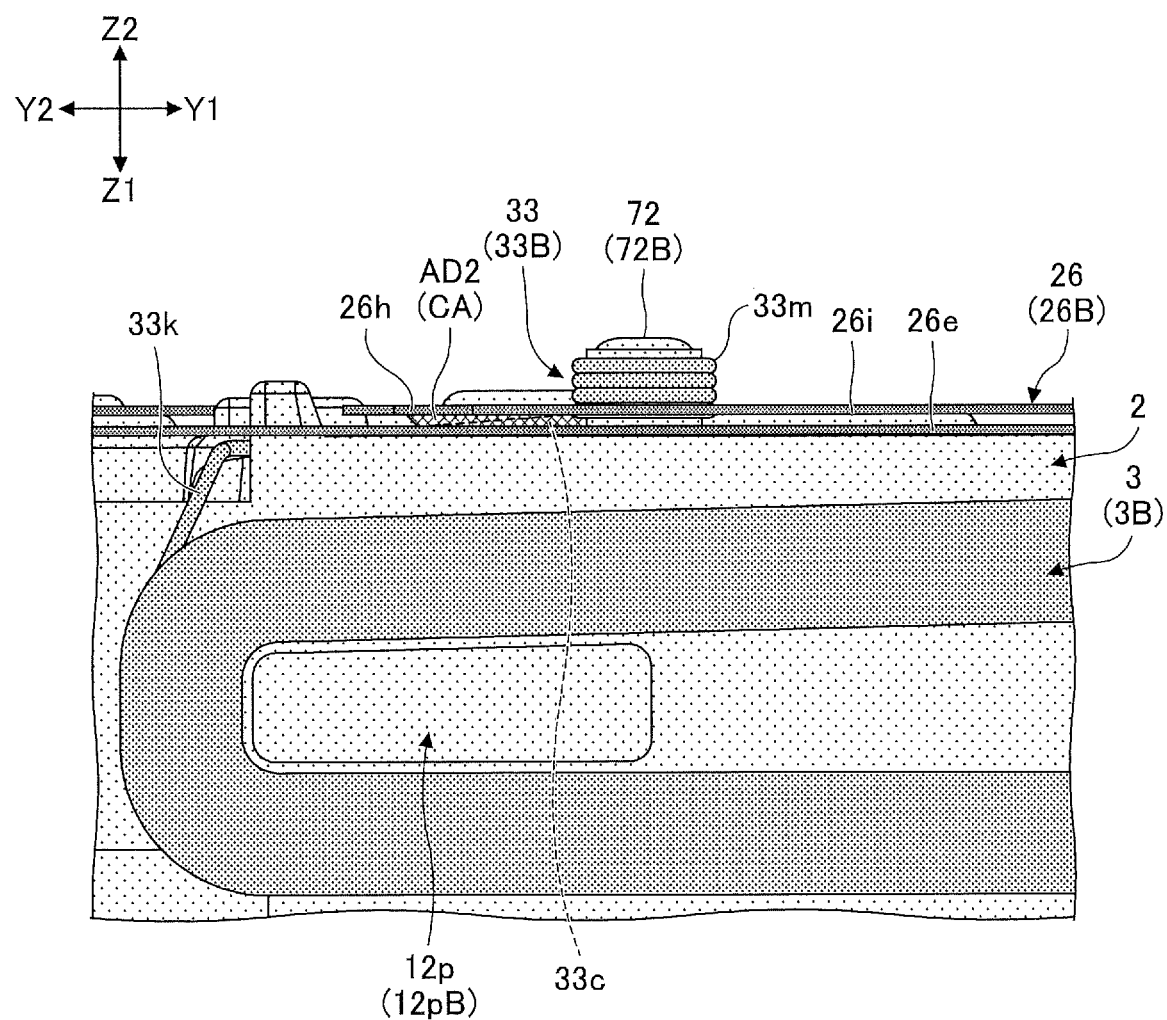
FIG. 12B is a side view of a portion of the lens holding member having the coil and the lower leaf spring attached thereto.
Figure 13:
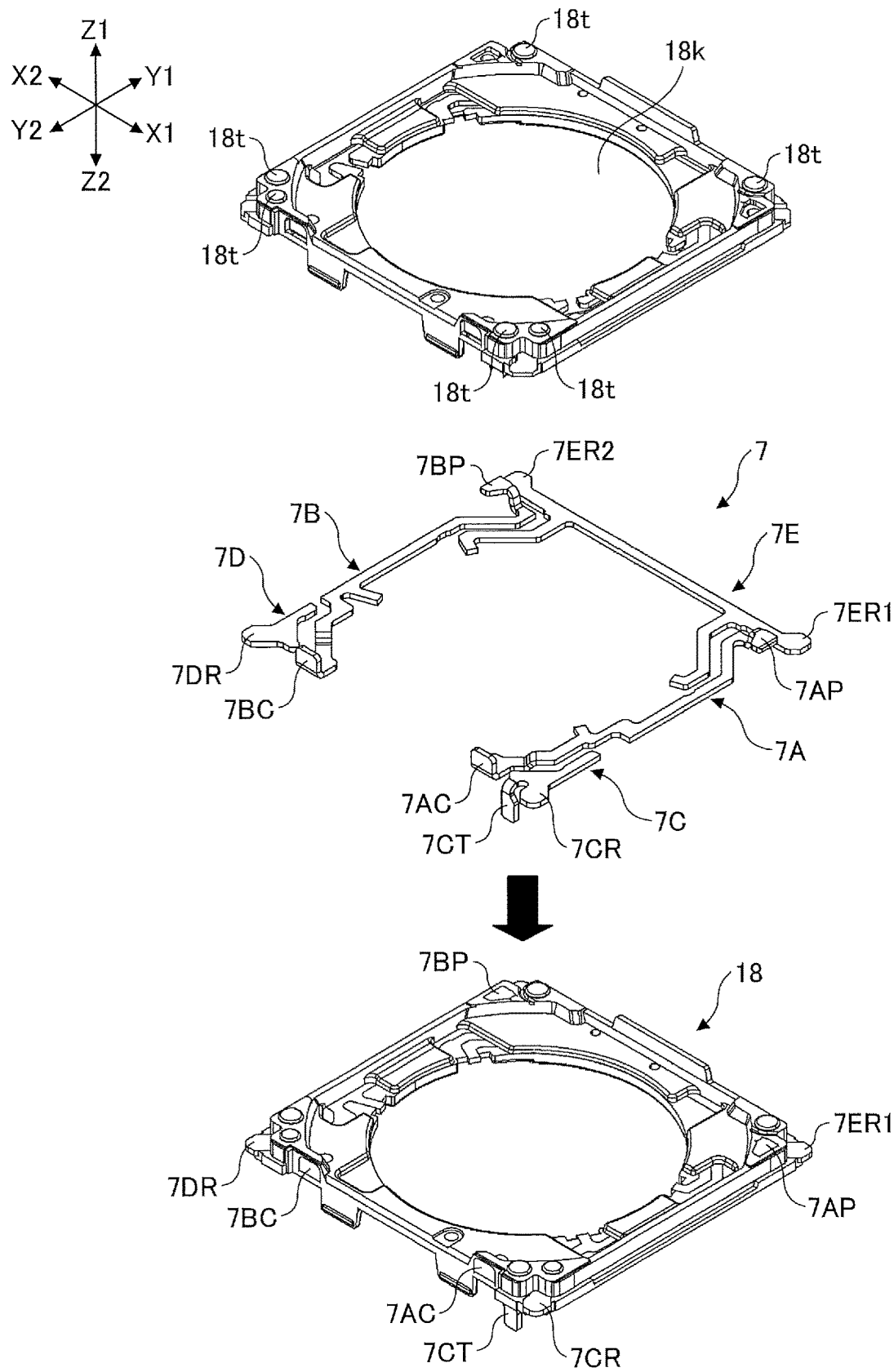
FIG. 13 is an exploded perspective view and a completed perspective view of the base member of the lens driving apparatus.

Next, the leaf spring 6 and the fixing side member RG will be described in detail. FIG. 11A is a top view of the upper leaf spring 16 and FIG. 11B is a top view of the lower leaf spring 26. FIGS. 12A and 12B are diagrams illustrating an example of a connection structure between the lower leaf spring 26B and the coil 3. Specifically, FIG. 12A is an enlarged view of a portion T illustrated in FIG. 10A, and FIG. 12B is an enlarged view of the lower leaf spring 26B, the coil 3, and the lens holding member 2 when the portion T illustrated in FIG. 10A is viewed from the X2 side. Note that in FIGS. 12A and 12B, a conductive adhesive CA as a second bonding material AD2 is illustrated by cross-hatching for clarity. FIG. 13 is a diagram for explaining the base member 18 as the fixing side member RG. Specifically, FIG. 13 is an exploded perspective view and a completed perspective view of the base member 18 in which the metal member 7 is embedded.

In the present embodiment, the leaf spring 6 is manufactured by a metal plate made mainly of copper alloy. The leaf spring 6 includes an upper leaf spring 16 disposed between the lens holding member 2 and the yoke 4 (the spacer member 1), and the lower leaf spring 26 disposed between the lens holding member 2 and the base member 18. In a state where the lens holding member 2 and the leaf spring 6 (the upper leaf spring 16, the lower leaf spring 26A, and the lower leaf spring 26B) are respectively engaged, the leaf spring 6 supports the lens holding member 2 so that the lens holding member 2 can be moved in the optical axis direction (Z-axis direction). The lower leaf spring 26A and the lower leaf spring 26B also function as a power supply member for supplying current to the coil 3. Therefore, the lower leaf spring 26A is electrically connected to one end of the coil 3 and the lower leaf spring 26B is electrically connected to the other end of the coil 3. The spacer member 1 is disposed between the upper leaf spring 16 and the yoke 4.

As illustrated in FIG. 11A, the upper leaf spring 16 has a substantially rectangular shape in a top view, and includes the inner portion 16i as a movable side support portion fixed to the lens holding member 2, an outer portion 16e as a fixed side support portion fixed to the spacer member 1 as the fixing side member RG, and four elastic arm portions 16g positioned between the inner portion 16i and the outer portion 16e. Specifically, the inner portion 16i is provided so as to face the pedestal portion 12d of the lens holding member 2. The outer portion 16e includes four corner portions 16b and two bar portions 16r, each linking two of the corner portions 16b that are adjacent to each other. As illustrated in FIGS. 4A and 4B, the bar portion 16r is clamped between the spacer member 1 and the magnetic field generating member 5 and is fixed with an adhesive.

The corner portion 16b is fixed to the corner portion of the spacer member 1 with an adhesive. The spacer member 1, the yoke 4, and the magnetic field generating member 5 function as the fixing side member RG.

Specifically, when the upper leaf spring 16 is incorporated into the lens driving apparatus 101, as illustrated in FIG. 4A, the inner portion 16i is mounted on the pedestal portion 12d (see FIG. 5A) of the lens holding member 2. Then, the inner portion 16i and the pedestal portion 12d are fixed with an adhesive so that the inner portion 16i is fixed to the lens holding member 2. As illustrated in FIG. 4B, the outer portion 16e contacts the upper surface (the surface on the Z1 side) of the magnetic field generating member 5 and is clamped and fixed between the spacer member 1 (see FIG. 4A) and the magnetic field generating member 5.

The upper leaf spring 16 is formed to be substantially bilaterally symmetrical (has twofold rotational symmetry with respect to the optical axis JD), as illustrated in FIG. 11A. The inner portion 16i is fixed to the lens holding member 2 and the outer portion 16e is fixed to the yoke 4 via the spacer member 1. Therefore, the upper leaf spring 16 can support the lens holding member 2 in a balanced manner.

The lower leaf spring 26A and the lower leaf spring 26B are configured such that the inner shapes thereof are substantially semi-circular, as illustrated in FIG. 11B. Further, the lower leaf spring 26A and the lower leaf spring 26B each includes the inner portion 26i as a movable side support portion fixed to the lens holding member 2, an outer portion 26e as a fixing side support portion fixed to the base member 18 as the fixing side member RG, and an elastic arm portion 26g positioned between the inner portion 26i and the outer portion 26e.

As illustrated in FIG. 11B, the inner portion 26i of each of the lower leaf spring 26A and the lower leaf spring 26B includes two inner joining portions 26c engaged with the lens holding member 2, a first coupling portion 26p linking the two inner joining portions 26c to each other, and a connection plate portion 26h facing the extending portion 33 of the coil 3.

When the lower leaf spring 26A and the lower leaf spring 26B are incorporated into the lens driving apparatus 101, each of the four protruding portions 2t of the lens holding member 2 illustrated in FIG. 6A is inserted into and fitted into a circular through-hole provided in the inner joining portion 26c of each of the lower leaf spring 26A and the lower leaf spring 26B illustrated in FIG. 11B. Accordingly, the inner portion 26i of each of the lower leaf spring 26A and lower leaf spring 26B is positioned and fixed in the lens holding member 2. The lower leaf spring 26A and the lower leaf spring 26B are fixed to the lens holding member 2 by, for example, performing thermal caulking or cold caulking on the protruding portion 2t of the lens holding member 2.

The relationship between the lower leaf spring 26B and the lens holding member 2 and the coil 3 will be mainly described below. However, the description of the lower leaf spring 26B applies similarly to the lower leaf spring 26A.

The connection plate portion 26h of the inner portion 26i of the lower leaf spring 26B faces a protruding bank portion 82 of the lens holding member 2 when the lens driving apparatus 101 is assembled, as illustrated in FIGS. 12A and 12B. That is, as illustrated in FIG. 12A, the surface of the connection plate portion 26h on the subject side (Z1 side) faces a housing portion 82s formed by the protruding bank portion 82. As illustrated in FIG. 12B, the first opposing portion 33c of the second extending portion 33B of the coil 3 extends between the surface on the subject side of the inner portion 26i (the connection plate portion 26h) of the lower leaf spring 26B and the surface on the image element side (the Z2 side) of the lens holding member 2.

As illustrated in FIG. 9B, the protruding bank portion 82 includes an inner wall portion 82u positioned at the center of the lens holding member 2, an outer wall portion 82v positioned at the outside facing the inner wall portion 82u, and a side wall portion 82w positioned near the second holding portion 72B between the inner wall portion 82u and the outer wall portion 82v. On the side of the protruding bank portion 82 far from the second holding portion 72B, an opening portion 82z with a cut-out wall is formed, as illustrated in FIG. 9B. The space surrounded by three wall portions (the inner wall portion 82u, the outer wall portion 82v, and the side wall portion 82w) forms the housing portion 82s. The housing portion 82s is configured to accommodate the conductive adhesive CA connecting the second extending portion 33B of the coil 3 and the lower leaf spring 26B. In the present embodiment, the protruding bank portion 82 is formed in a position adjacent to the second holding portion 72B, and, therefore, the side wall of the second holding portion 72B is appropriately used as the side wall portion 82w of the protruding bank portion 82. Accordingly, the housing portion 82s is provided at a position adjacent to the second holding portion 72B.

When the lower leaf spring 26B is assembled to the lens holding member 2, as illustrated in FIG. 12B, the second holding portion 72B protrudes more downward (in the Z2 direction) than the inner portion 26i so that the leading end of the second holding portion 72B is positioned on the imaging device side (on the 22 side) of the inner portion 26i of the lower leaf spring 26B. A portion of the winding portion 33m is wound around the second holding portion 72B so as to be positioned on the imaging element side (Z2 side) of the inner portion 26i.

The lower leaf spring 26B and the second extending portion 33B of the coil 3 are electrically and physically connected to each other by the conductive adhesive CA in which conductive fillers, such as silver particles, are dispersed in a synthetic resin. Specifically, prior to incorporating the lower leaf spring 26B into the lens holding member 2, the housing portion 82s surrounded by the protruding bank portion 82 of the lens holding member 2 is filled with the conductive adhesive CA, and subsequently, the lower leaf spring 26B is mounted to the lens holding member 2. Then, the protruding portion 2t of the lens holding member 2 is subjected to thermal caulking and the conductive adhesive CA is thermally cured. The process from the filling of the conductive adhesive CA into the housing portion 82s to the thermal curing of the conductive adhesive CA, is performed in a state where the lens holding member 2 is upside-down so that the second holding portion 72B protrudes vertically upward. Thus, the conductive adhesive CA can be properly retained at the desired location (position within the housing portion 82s), even if the conductive adhesive CA is fluid. A portion of the first opposing portion 33c is disposed inside the housing portion 82s, and is thus embedded in the conductive adhesive CA. Note that the conductive adhesive CA is not limited to a thermal curing type, but may be an ultraviolet curing type.

The outer portion 26e of the lower leaf spring 26B includes two outer joining portions 26d which are engaged with the base member 18 and a second coupling portion 26q linking the two outer joining portions 26d to each other, as illustrated in FIG. 11B. In a through hole provided in the outer joining portion 26d of the lower leaf spring 26B, a protruding portion 18t (see FIG. 13) provided on the upper surface of the base member 18, is fit. Thus, the outer portion 26e of the lower leaf spring 26B is positioned and fixed to the base member 18.

The lower leaf spring 26A and the lower leaf spring 26B are formed to be substantially bilaterally symmetrical (has twofold rotational symmetry with respect to the optical axis JD), as illustrated in FIG. 11B. The lower leaf spring 26B is connected to the lens holding member 2 by the two inner joining portions 26c, and is connected to the base member 18 by the two outer joining portions 26d. The same applies to the lower leaf spring 26A. With this configuration, the lower leaf spring 26A and the lower leaf spring 26B can support the lens holding member 2 in a balanced manner in a state where the lens holding member 2 can be moved in an optical axis direction.

Next, details of the fixing side member RG will be described. The fixing side member RG includes the spacer member 1 for fixing the upper leaf spring 16 in place, the yoke 4, the magnetic field generating member 5, and the base member 18 for fixing the lower leaf spring 26A and the lower leaf spring 26B, respectively.

The base member 18 is manufactured by performing injection molding using a synthetic resin such as liquid crystal polymer and the like. As illustrated in FIG. 13, in the present embodiment, the base member 18 is a member having a substantially rectangular plate-like outer shape and has a circular opening 18k formed in the center thereof. Further, on the surface (the upper surface) of the subject side (the Z1 side) of the base member 18, there are six of the protruding portions 18t protruding upward. The protruding portion 18t is inserted through and fitted into a through hole provided in the outer joining portion 26d of each of the lower leaf spring 26A and lower leaf spring 26B. At this time, the protruding portion 18t is subjected to thermal caulking and fixed to the outer joining portion 26d. In the drawings relating to the present embodiment, the protruding portion 18t is illustrated in a state where the leading end thereof is deformed after being subjected to thermal caulking. The protruding portion 18t may be subjected to cold caulking and fixed to the outer joining portion 26d.

As illustrated in FIG. 13, in the base member 18, the metal member 7 formed with a metal plate including a material such as copper, iron, or an alloy having copper or iron as main components, is insert-molded and embedded.

The metal member 7 includes a first metal member 7A, a second metal member 7B, a third metal member 7C, a fourth metal member 7D, and a fifth metal member 7E. The first metal member 7A includes a connection portion 7AC exposed from an outer peripheral surface (surface on the Y2 side) of the base member 18, and the second metal member 7B includes a connection portion 7BC exposed from an outer peripheral surface (surface on the Y2 side) of the base member 18. The surface of the connection portion 7AC and the surface of the connection portion 7BC are positioned on the same plane.

The connection portion 7AC formed by being bent in an L-shape, is connected to a first conductive portion 10C1 via a conductive bonding material in a state of facing the first conductive portion 10C1, which is one of two conductive portions 10C (see FIG. 15A) formed in the flexible printed circuit board 10 on which the magnetic detection member 11 is mounted. The conductive bonding material may be, for example, a solder or a conductive adhesive or the like. In the present embodiment, a conductive adhesive is used.

Similarly, the connection portion 7BC formed by being bent in an L-shape, is connected to a second conductive portion 10C2 via a conductive bonding material in a state of facing the second conductive portion 10C2, which is the other one of the two conductive portions 10C.

The third metal member 7C has a protruding portion 7CT that protrudes in a Z2 direction from the corner of the base member 18. The third metal member 7C, the fourth metal member 7D, and the fifth metal member 7E have an end portion 7CR, an end portion 7DR, and end portions 7ER1, 7ER2, respectively, protruding outward in a direction perpendicular to the optical axis direction from the corner of the base member 18. Each of the end portions 7CR, 7DR, 7ER1, and 7ER2 is configured to contact the lower end of the four corners of the yoke 4, as illustrated in FIGS. 2A and 2B. With this configuration, the third metal member 7C, the fourth metal member 7D, and the fifth metal member 7E are electrically connected to one another via the yoke 4 and are grounded through the protruding portion 7CT of the third metal member 7C.

The base member 18 is fixed to the yoke 4 by welding the end portions 7CR, 7DR, 7ER1, and 7ER2 to the respective four corners of the yoke 4, in a state where the inner surface of the outer peripheral wall portion 4A of the yoke 4 and the outer peripheral surface of the base member 18 are positioned upon being combined with each other. The yoke 4 and the base member 18 may be at least partially fixed to each other with an adhesive.

Figure 14A:
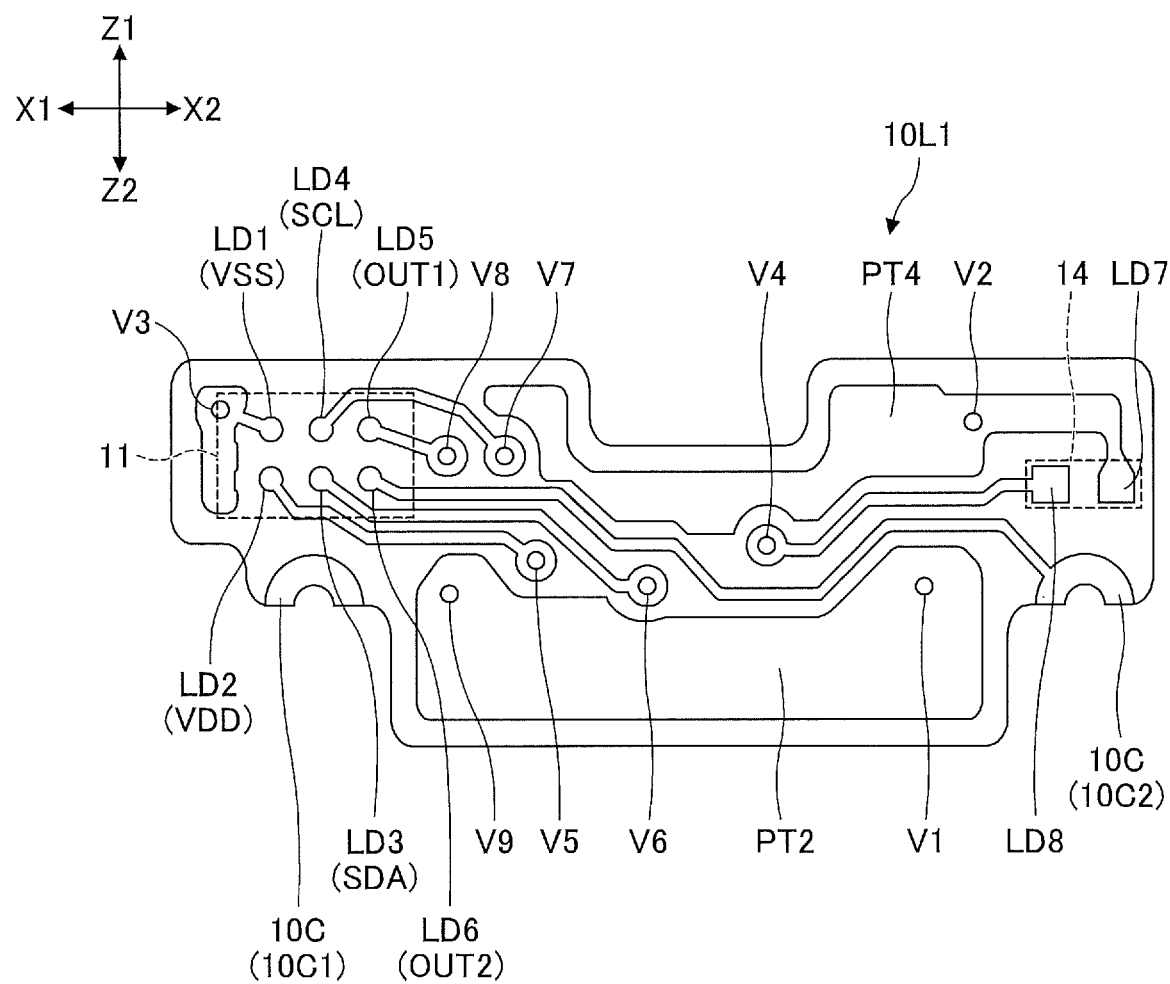
FIG. 14A is a diagram illustrating an inner pattern layer disposed on an inner side of a flexible printed circuit board.
Figure 14B:
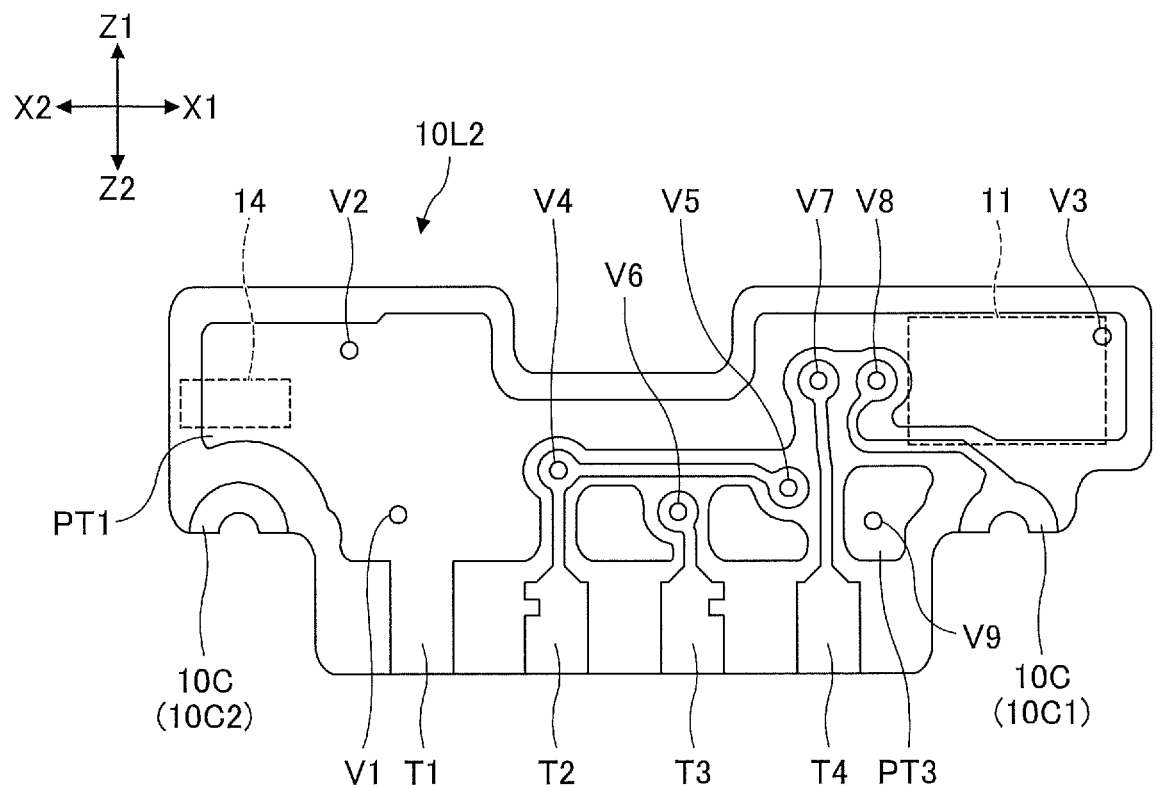
FIG. 14B is a diagram illustrating an outer pattern layer disposed on an outer side of the flexible printed circuit board.

Next, referring to FIGS. 14A and 14B, the details of the flexible printed circuit board 10 will be described. FIGS. 14A and 14B illustrate a pattern layer formed on a flexible printed circuit board 10. Specifically, FIG. 14A illustrates an inner pattern layer 10L1 disposed on the Y1 side of the flexible printed circuit board 10, and FIG. 14B illustrates an outer pattern layer 10L2 disposed on the Y2 side of the flexible printed circuit board 10.

The flexible printed circuit board 10 is a double-sided printed circuit board on which a conductive wiring pattern is formed on both sides. The flexible printed circuit board 10 has the inner pattern layer 10L1 disposed on the inner side (on the Y1 side) and the outer pattern layer 10L2 disposed on an outer side (on the Y2 side).

The inner pattern layer 10L1 includes a first land portion LD1, a second land portion LD2, a third land portion LD3, a fourth land portion LD4, a fifth land portion LD5, and a sixth land portion LD6, which are connected to six respective connection portions (not illustrated) of the magnetic detection member 11, and a seventh land portion LD7 and an eighth land portion LD8 connected to two respective electrodes (not illustrated) of a capacitor 14. In the present embodiment, the six connection portions of the magnetic detection member 11 and the first to sixth land portions LD1 to LD6 are connected by soldering. Similarly, two electrodes at the capacitor 14 and the seventh land portion LD7 and the eighth land portion LD8 are connected by soldering. The capacitor 14 is a bypass capacitor connected between a power supply voltage and a ground voltage.

The first land portion LD1 is a land portion connected to a terminal for grounding. The second land portion LD2 is a land portion connected to the terminal for the power supply voltage. The third land portion LD3 is a land portion connected to a terminal for data signals. The fourth land portion LD4 is a land portion connected to a terminal for clock signals. The fifth and sixth land portions LD5 and LD6 are land portions used for the output of current controlled by a driver IC (current control circuit) in the magnetic detection member 11.

As illustrated in FIG. 2B, the outer pattern layer 10L2 is configured such that the first conductive portion 10C1 and the second conductive portion 10C2, as well as a first terminal portion T1, a second terminal portion T2, a third terminal portion T3, and a fourth terminal portion T4, are exposed when the lens driving apparatus 101 is assembled.

The first terminal portion T1 is a terminal for grounding. As illustrated in FIG. 14B, the first terminal portion T1 is linked to a first pattern portion PT1, and is also linked to a second pattern portion PT2 (see FIG. 14A) of the inner pattern layer 10L1 via a via hole V1. The first pattern portion PT1 is also linked to a fourth pattern portion PT4 of the inner pattern layer 10L1 via a via hole V2. At the end portion of the fourth pattern portion PT4, the seventh land portion LD7 is formed. Further, the first pattern portion PT1 is linked to the first land portion LD1 of the inner pattern layer 10L1 via a via hole V3. The second pattern portion PT2 is linked to a third pattern portion PT3 of the outer pattern layer 10L2 via a via hole V9.

The second terminal portion T2 is a terminal connected to the power supply voltage and is linked to the eighth land portion LD8 of the inner pattern layer 1011 via a via hole V4. Further, the second terminal portion T2 is linked to the second land portion LD2 of the inner pattern layer 10L1 via a via hole V5.

The third terminal portion T3 is a terminal for data signals and is linked to the third land portion LD3 of the inner pattern layer 10L1 via a via hole V6.

The fourth terminal portion T4 is a terminal for clock signals and is linked to the fourth land portion LD4 of the inner pattern layer 10L1 via a via hole V7.

The fifth land portion LD5 of the inner pattern layer 10L1 is linked to the first conductive portion 10C1 via a via hole V8 and the wiring pattern of the outer pattern layer 10L2. The sixth land portion LD6 of the inner pattern layer 10L1 is linked to the second conductive portion 10C2 via the wiring pattern of the inner pattern layer 10L1. The first conductive portion 10C1 of the inner pattern layer 10L1 and the first conductive portion 10C1 of the outer pattern layer 10L2 are conducted to each other. The same applies to the second conductive portion 10C2.

With this configuration, the driver IC of the magnetic detection member 11 can receive a command regarding the target position of the lens holding member 2 in the optical axis direction, for example, from an external control device and the like through the third terminal portion T3. The driver IC can identify the present position of the lens holding member 2 based on the magnitude of the magnetic field detected by the Hall element and increase or decrease the magnitude of the current flowing through the coil 3 so that the difference between the present position of the lens holding member 2 and the target position becomes zero. That is, the driver IC can provide feedback control of the position of the lens holding member 2 in the optical axis direction.

Figure 15A:
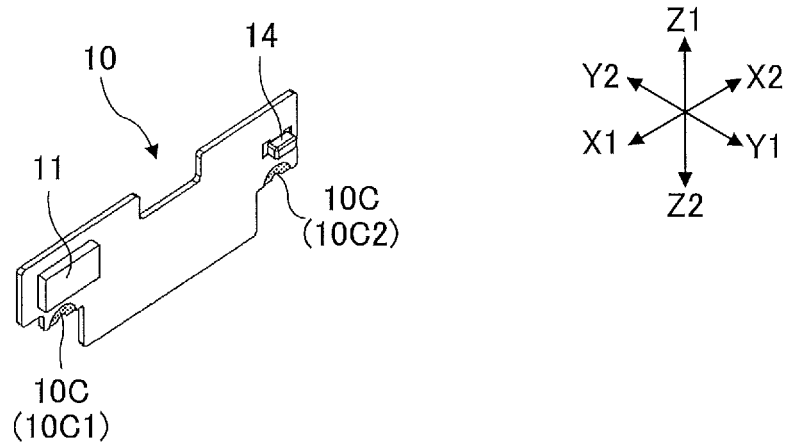
FIG. 15A is a perspective view of the flexible printed circuit board.
Figure 15B:
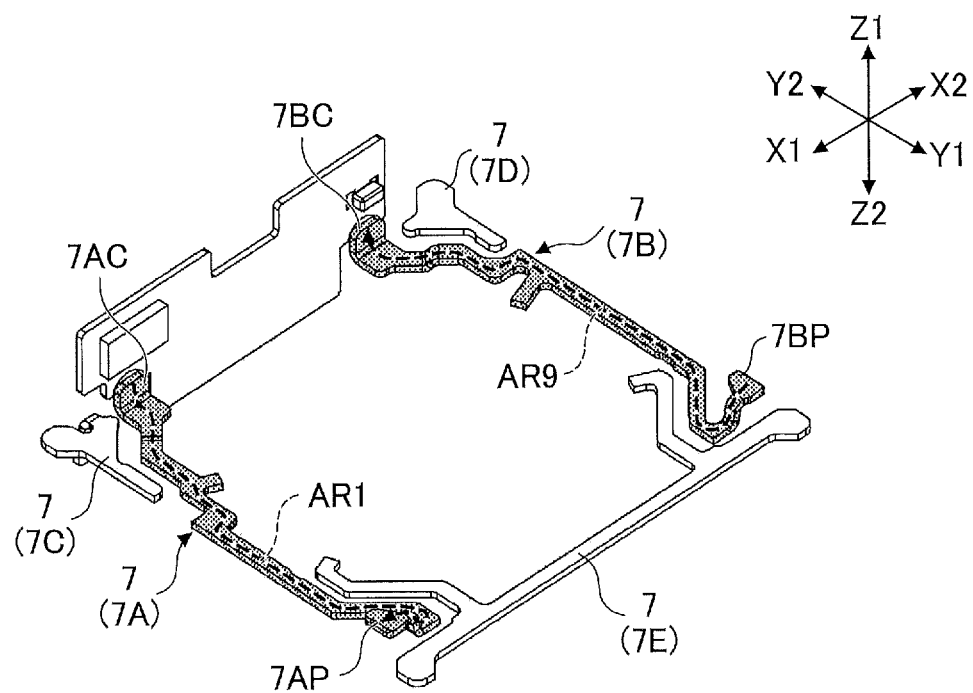
FIG. 15B is a perspective view of the metal member and the flexible printed circuit board.
Figure 15C:
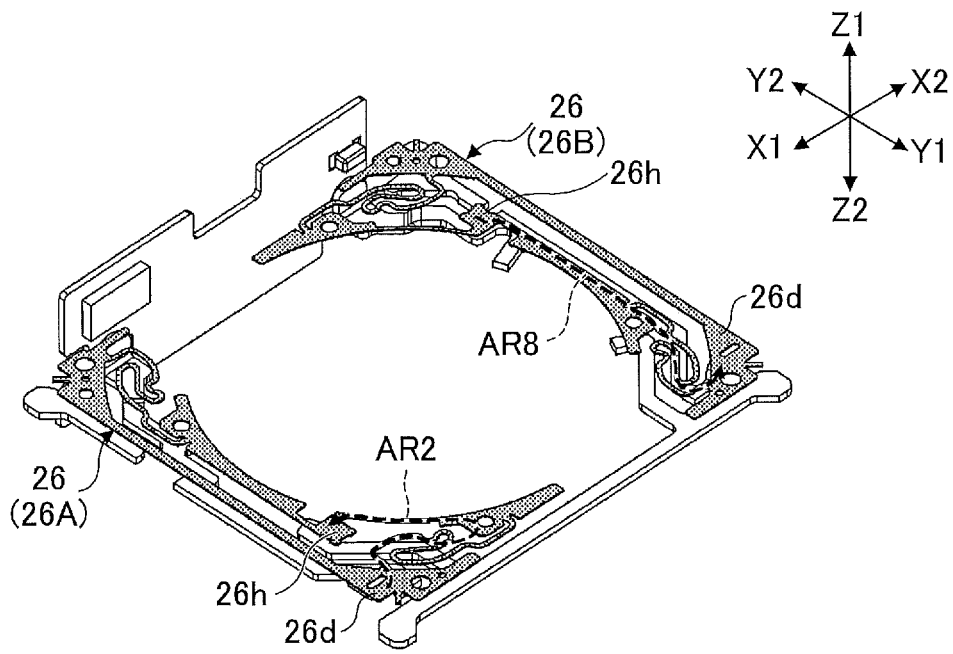
FIG. 15C is a perspective view of the metal member, the flexible printed circuit board, and the lower leaf spring.
Figure 15D:
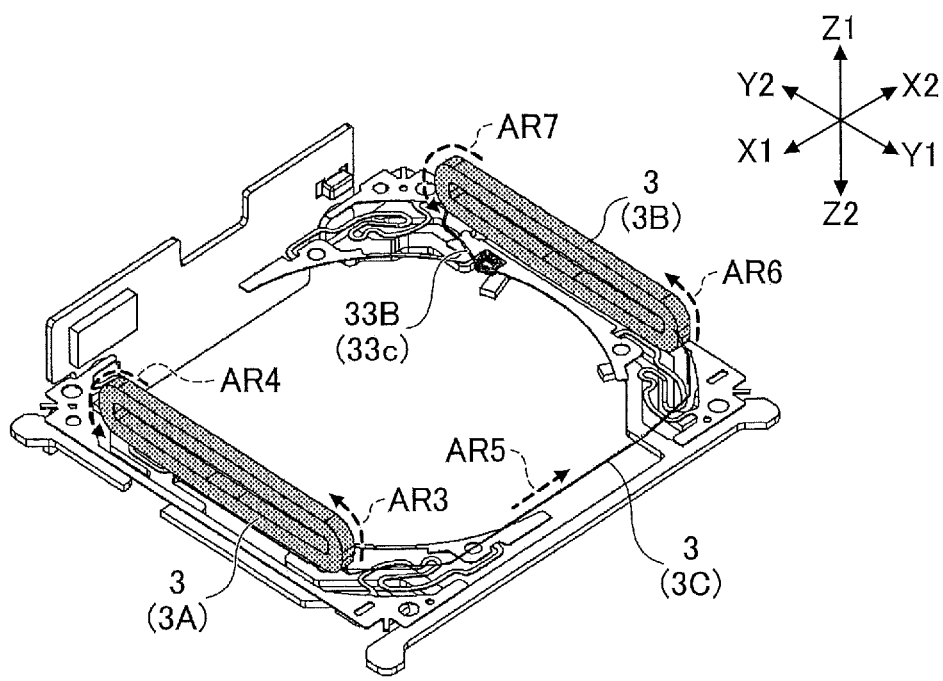
FIG. 15D is a perspective view of the coil, the metal member, the flexible printed circuit board, and the lower leaf spring.

Next, referring to FIGS. 15A to 15D, the electrical and physical connection relationships of the coil 3, the metal member 7, the flexible printed circuit board 10, and the lower leaf spring 26 are described. FIGS. 15A to 15D illustrate the electrical and physical relationships of the coil 3, the metal member 7, the flexible printed circuit board 10, and the lower leaf spring 26. Specifically, FIG. 15A is a perspective view of the flexible printed circuit board 10; FIG. 15B is a perspective view of the metal member 7 and the flexible printed circuit board 10; FIG. 15C is a perspective view of the metal member 7, the flexible printed circuit board 10, and the lower leaf spring 26; and FIG. 15D is a perspective view of the coil 3, the metal member 7, the flexible printed circuit board 10, and the lower leaf spring 26. FIGS. 15A to 15D illustrate the members in which current flows, by dot hatching.

The two conductive portions 10C in the flexible printed circuit board 10 are connected to the metal member 7. Specifically, as illustrated in FIGS. 2B and 15B, the first conductive portion 10C1 is connected to the connection portion 7AC of the first metal member 7A by a conductive bonding material AD, and the second conductive portion 10C2 is connected to the connection portion 7BC of the second metal member 7B by the conductive bonding material AD.

The first metal member 7A has a contact portion 7AP exposed on the top surface of the base member 18, as illustrated in FIG. 13. Similarly, the second metal member 7B has a contact portion 7BP exposed on the top surface of the base member 18. The contact portion 7AP is connected to the outer joining portion 26d of the lower leaf spring 26A by welding or by a conductive adhesive. Similarly, the contact portion 7BP is connected to the outer joining portion 26d of the lower leaf spring 26B by a welding or by a conductive adhesive.

The connection plate portion 26h of the lower leaf spring 26A is connected to the first opposing portion 33c (not visible in FIG. 15D) of the first extending portion 33A linked to the first coil 3A by a conductive adhesive. Similarly, the connection plate portion 26h of the lower leaf spring 26B is connected, by a conductive adhesive, to the first opposing portion 33c of the second extending portion 33B linked to the second coil 3B.

By the above-described connection relationships, the current output from the first conductive portion 10C1 flows from the connection portion 7AC to the contact portion 7AP of the first metal member 7A, for example, as indicated by an arrow AR1 of FIG. 15B. The current flows from the outer joining portion 26d to the connection plate portion 26h of the lower leaf spring 26A, as indicated by an arrow AR2 of FIG. 15C, and from the first opposing portion 33c (not visible in FIG. 15D) of the first extending portion 33A to the first opposing portion 33c of the second extending portion 33B via the first coil 3A, the coupling portion 3C, and the second coil 3B, as indicated by the arrows AR3 to AR7 of FIG. 15D. Thereafter, current flows from the connection plate portion 26h to the outer joining portion 26d of the lower leaf spring 26B as indicated by an arrow AR8 of FIG. 15C, and from the contact portion 7BP of the second metal member 7B to the second conductive portion 10C2 via the connection portion 7BC as indicated by an arrow AR9 of FIG. 15B. When a current flows from the second conductive portion 10C2 toward the first conductive portion 10C1, the current flows in a reverse direction along a similar path.

The driver IC of the magnetic detection member 11 can control the position of the lens holding member 2 in the optical axis direction by changing the direction and the magnitude of the current flowing between the first conductive portion 10C1 and the second conductive portion 10C2. In the present embodiment, the Hall element of the magnetic detection member 11 detects the magnetic field generated by the detection magnet 8. The driver IC identifies the present position of the lens holding member 2 in the optical axis direction based on the magnitude of the magnetic field detected by the Hall element. The driver IC changes the direction and the magnitude of the current flowing between the first conductive portion 10C1 and the second conductive portion 10C2 so that the difference between the present position of the lens holding member 2 and the target position in the optical axis direction becomes zero. In this manner, the driver IC can provide feedback control of the position of the lens holding member 2 in the optical axis direction.

Figure 16A:
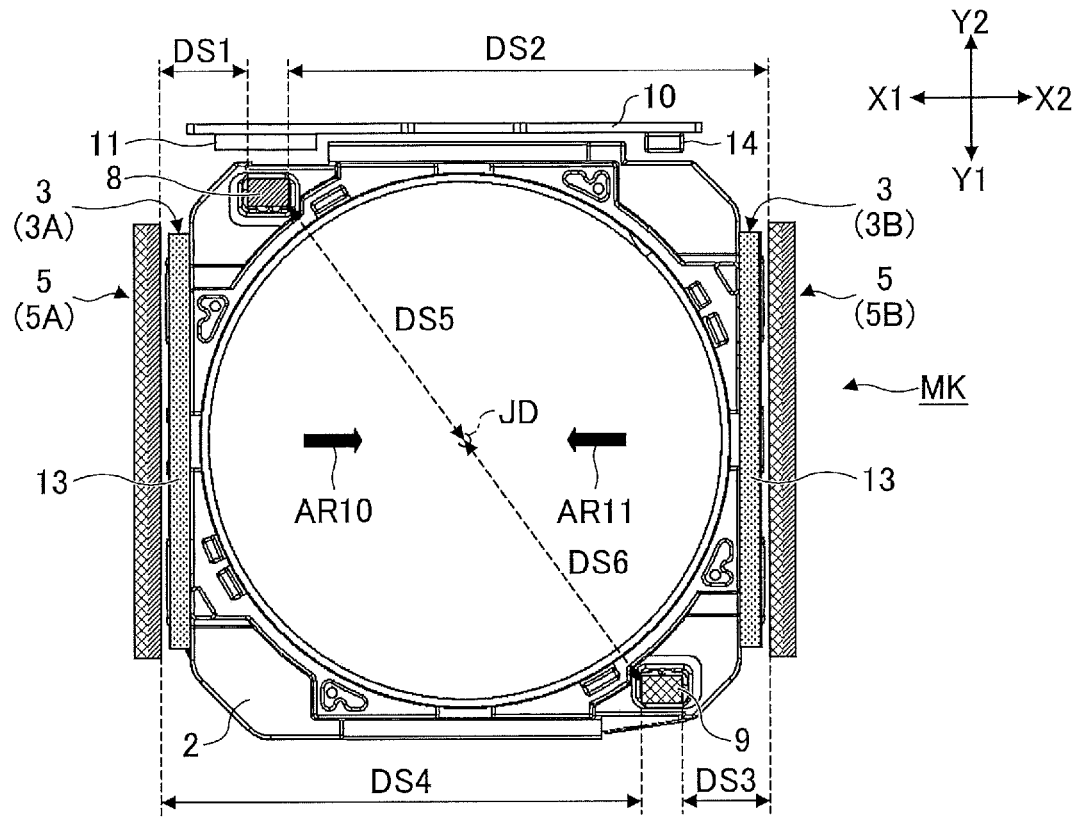
FIG. 16A is a top view of a driving mechanism illustrating one example of an arrangement of the coil, the magnetic field generating member, the detection magnet, the balance magnet, and the magnetic detection member.
Figure 16B:
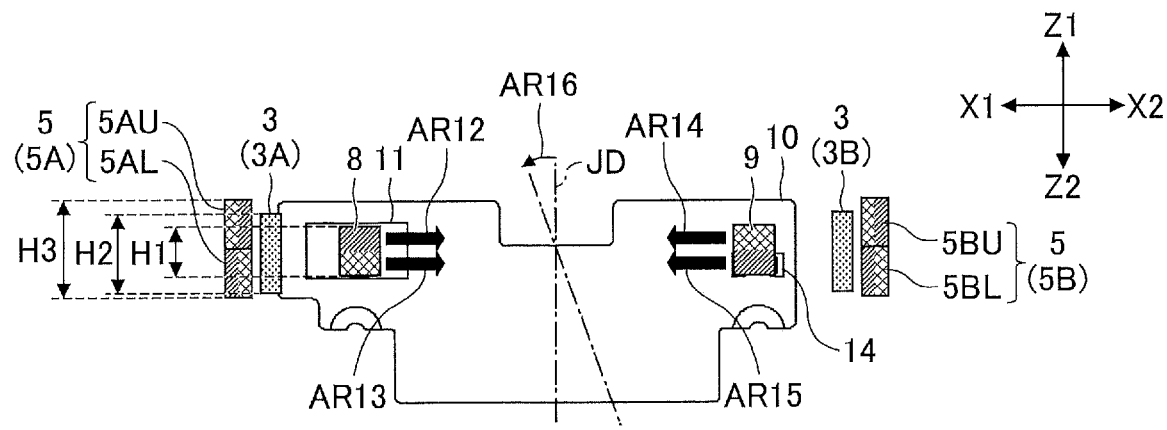
FIG. 16B is a rear view of the driving mechanism illustrated in FIG. 16A.
Figure 16C:
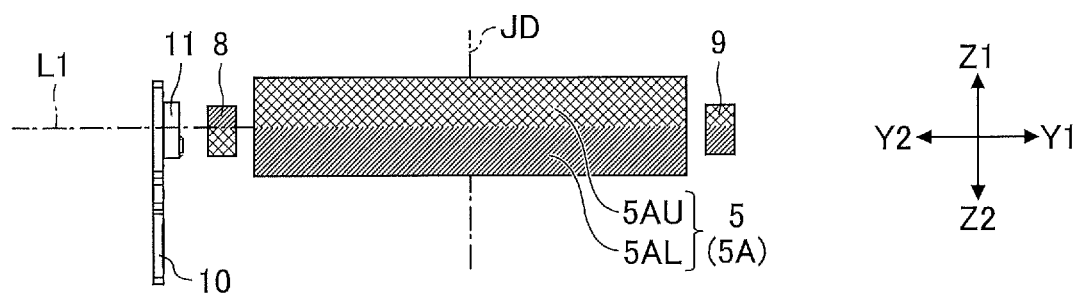
FIG. 16C is a right side view of the driving mechanism illustrated in FIG. 16A.
Figure 16D:
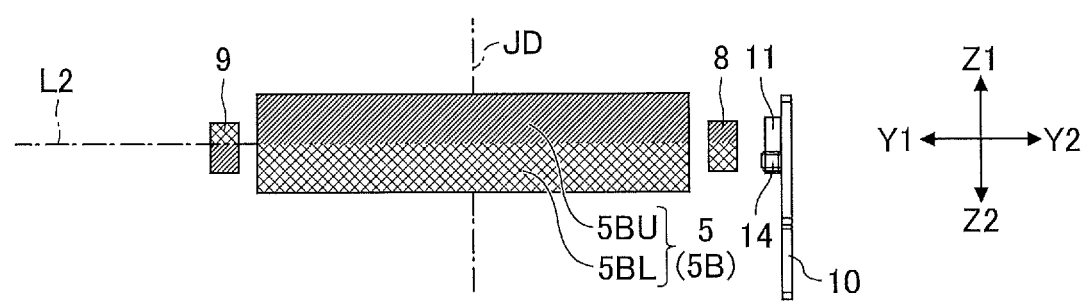
FIG. 16D is a left side view of the driving mechanism illustrated in FIG. 16A.

Next, referring to FIGS. 16A to 16D, 17A to 17D, and 18A to 18D, one example of an arrangement of the coil the, a magnetic field generating member 5, the detection magnet 8, the balance magnet 9, and the magnetic detection member 11 in an initial state in which no current is flowing through the coil 3, will be described. The initial state according to the present embodiment means the initial state when the lens driving apparatus 101 is oriented such that the optical axis JD is orthogonal to the vertical direction. FIGS. 16A to 16D illustrate one example of the arrangement of the coil 3, the magnetic field generating member 5, the detection magnet 8, the balance magnet 9, and the magnetic detection member 11. Specifically, FIG. 16A is a top view of a driving mechanism MK. FIG. 16B is a back view of the driving mechanism MK when the driving mechanism MK is viewed from the Y1 side. FIG. 16C is a right side view of the driving mechanism MK when the driving mechanism MK is viewed from the X1 side. FIG. 16D is a left side view of the driving mechanism MK when the driving mechanism MK is viewed from the X2 side. The driving mechanism MK includes the coil 3, the yoke 4, the magnetic field generating member 5, the detection magnet 8, the balance magnet 9, and the magnetic detection member 11. For clarity, in FIG. 16A, the lens holding member 2 and the flexible printed circuit board 10 are illustrated, and the illustration of the yoke 4 is omitted. In FIGS. 16B to 16D, a flexible printed circuit board 10 is illustrated, and the illustration of the lens holding member 2 and the yoke 4 is omitted. In FIGS. 16A to 16D, the N-pole of the magnet is represented by cross hatching, the S-pole of the magnet is represented by diagonal hatching, and the coil 3 is represented by dot hatching.

As illustrated in FIG. 16A, the first coil 3A is disposed to face the first magnetic field generating member 5A and the second coil 3B is disposed to face the second magnetic field generating member 5B.

The detection magnet 8 is a bipolar magnet that is polarized and magnetized in the Z-axis direction that is the optical axis direction and is disposed to face the magnetic detection member 11 attached to the inside (Y1 side) of the flexible printed circuit board 10 in the Y-axis direction. Specifically, as illustrated in FIGS. 16B to 16D, the magnetic detection member 11 is disposed such that the boundary between the N-pole portion and the S-pole portion of the detection magnet 8 is within the measurement range of the Hall element. Between the detection magnet 8 and the magnetic detection member 11 that are spaced apart and facing each other, there is a wall portion that forms a recess formed in the lens holding member 2 that accommodates the detection magnet 8. The wall portion is made of a synthetic resin, and, therefore, the wall portion does not magnetically affect the detection magnet 8 or the magnetic detection member 11. However, the wall portion between the detection magnet 8 and the magnetic detection member 11 that are spaced apart and facing each other may be omitted. That is, the detection magnet 8 and the magnetic detection member 11 may be directly facing each other or may be facing each other with a member made of a non-magnetic material interposed therebetween.

The balance magnet 9 is a bipolar magnet polarized and magnetized in the Z-axis direction and is preferably disposed so as to be at the same height as the detection magnet 8 in the Z-axis direction, as illustrated in FIGS. 16B to 16D.

Further, the detection magnet 8 is disposed at a position closer to the first magnetic field generating member 5A than to the second magnetic field generating member 5B when comparing the linear distance, and the balance magnet 9 is disposed at a position closer to the second magnetic field generating member 5B than to the first magnetic field generating member 5A when comparing the linear distance. In the present embodiment, a distance DS1 between the detection magnet 8 and the first magnetic field generating member 5A in the X-axis direction is shorter than a distance DS2 between the detection magnet 8 and the second magnetic field generating member 5B. A distance DS3 between the balance magnet 9 and the second magnetic field generating member 5B in the X-axis direction is shorter than a distance DS4 between the balance magnet 9 and the first magnetic field generating member 5A.

The detection magnet 8 and the balance magnet 9 are attached to the lens holding member 2 in such a manner that a distance DS5 between the optical axis JD and the detection magnet 8 is equal to a distance DS6 between the optical axis JD and the balance magnet 9. This is to offset the influence of the weight of the detection magnet 8 applied to the lens holding member 2, by the balance magnet 9.

As illustrated in FIG. 16B, the detection magnet 8 is disposed such that the upper portion (the portion on the Z1 side) becomes the S-pole and the lower portion (the portion on the Z2 side) becomes the N-pole. The balance magnet 9 is disposed such that the upper portion (the portion on the Z1 side) becomes the N-pole and the lower portion (the portion on the 22 side) becomes the S-pole.

The first upper magnet 5AU is disposed such that the inner portion (the portion on the X2 side) facing the upper portion of the first coil 3A becomes an S-pole and the outer portion (the portion on the X1 side) becomes an N-pole. The first lower magnet 5AL is disposed such that an inner portion (a portion on the X2 side) facing the lower portion of the first coil 3A becomes an N-pole and an outer portion (a portion on the X1 side) becomes an S-pole. This is because the direction of current flow at the upper portion of the first coil 3A is opposite to that at the lower portion of the first coil 3A.

The second upper magnet 5BU is disposed such that the inner portion (the portion on the X1 side) facing the upper portion of the second coil 3B becomes the N-pole and the outer portion (the portion on the X2 side) becomes the S-pole. The second lower magnet 5BL is disposed such that the inner portion (the portion on the X1 side) facing the lower portion of the second coil 3B becomes the S-pole, and the outer portion (the portion on the X2 side) becomes the N-pole. This is because the direction of current flow at the upper portion of the second coil 3B is opposite to that at the lower portion of the second coil 3B.

In the present embodiment, the first magnetic field generating member 5A is disposed such that the position of the boundary between the N-pole portion of the first upper magnet 5AU and the S-pole portion of the first lower magnet 5AL (i.e., the position of the boundary between the first upper magnet 5AU and the first lower magnet 5AL) coincides with the position of the boundary between the N-pole portion and the S-pole portion of the detection magnet 8 in the XY plane including a line segment L1 illustrated in FIG. 16C. Similarly, the second magnetic field generating member 5B is disposed such that the position of the boundary between the S-pole portion of the second upper magnet 5BU and the N-pole portion of the second lower magnet 5BL (that is, the position of the boundary between the second upper magnet 5BU and the second lower magnet 5BL) coincides with the position of the boundary between the N-pole portion and the S-pole portion of the balance magnet 9 in the XY plane including a line segment L2 illustrated in FIG. 16D. The line segment L1 and the line segment L2 are located on the same XY plane perpendicular to the optical axis JD.

In the present embodiment, as illustrated in FIG. 16B, the detection magnet 8 is disposed such that a vertical width H1 thereof is within a vertical width H2 of the first coil 3A and is within a vertical width H3 of the first magnetic field generating member 5A. The same applies to the balance magnet 9.

By the above arrangement, in the initial state, a repulsion force is generated between the upper portion (the S-pole portion) of the detection magnet 8 and the inner portion (the S-pole portion) of the first upper magnet 5AU. Therefore, the lens holding member 2 as a movable portion supporting the detection magnet 8 is urged in a direction indicated by an arrow AR12 in FIG. 16B. That is, a force acts on the lens holding member 2 to move the lens holding member 2 away from the first magnetic field generating member 5A.

Further, a repulsion force is generated between the lower portion (the N-pole portion) of the detection magnet 8 and the inner portion (the N-pole portion) of the first lower magnet 5AL. Therefore, the lens holding member 2 is urged in the direction as indicated by an arrow AR13 of FIG. 16B, that is, in the same direction as indicated by the arrow AR12. That is, a force acts on the lens holding member 2 to move the lens holding member 2 away from the first magnetic field generating member 5A.

Meanwhile, a repulsion force is also generated between the upper portion (the N-pole portion) of the balance magnet 9 and the inner portion (the N-pole portion) of the second upper magnet 5BU. Therefore, the lens holding member 2 is urged in the direction indicated by an arrow AR14 of FIG. 16B, that is, in the direction opposite to the direction indicated by the arrow AR12. That is, a force acts on the lens holding member 2 to move the lens holding member 2 away from the second magnetic field generating member 5B.

A repulsion force is also generated between the lower portion (the S-pole portion) of the balance magnet 9 and the inner portion (the S-pole portion) of the second lower magnet 5BL. Therefore, the lens holding member 2 is urged in the direction indicated by an arrow AR15 of FIG. 16B, that is, in the same direction as that indicated by the arrow AR14 but in a direction opposite to that indicated by the arrow AR12. That is, a force acts on the lens holding member 2 to move the lens holding member 2 away from the second magnetic field generating member 5B.

As a result, the lens holding member 2 is simultaneously urged in the direction indicated by an arrow AR10 and in the direction indicated by an arrow AR11, as illustrated in FIG. 16A. That is, the lens holding member 2 receives forces so as to be pressed from both sides, and, therefore, it is possible to prevent the optical axis JD of the lens body from being shifted or being tilted with respect to the Z-axis.

The detection magnet 8 is disposed near an end portion of the first magnetic field generating member 5A. Therefore, technically, the force acting on the detection magnet 8 has a component in the Y-axis direction as well as the component in the X-axis direction indicated by the arrow AR10. That is, the force acting on the detection magnet 8 provides a force acting in the tangential direction of the circle centered on the optical axis JD, to the lens holding member 2. Similarly, the balance magnet 9 is disposed near the other end of the second magnetic field generating member 5B. Therefore, technically, the force acting on the balance magnet 9 also has a component in the Y-axis direction as well as the component in the X-axis direction indicated by the arrow AR11. That is, the force acting on the balance magnet 9 provides a force acting in the tangential direction of the circle centered on the optical axis JD, to the lens holding member 2. However, the two forces acting in the tangential direction have only a tendency to rotate the lens holding member 2 about the optical axis JD, and, therefore, the optical axis JD of the lens body will not be shifted. Further, the rotation of the lens holding member 2 about the optical axis JD is prevented by the stiffness of the leaf spring, and, therefore, in this respect also, the two forces acting in the tangential direction will not shift the optical axis JD of the lens body.

For example, in the arrangement of FIGS. 16A to 16D, if the upper portion of the detection magnet 8 is the N-pole and the lower portion is the S-pole, an attraction force is generated between the detection magnet 8 and the first magnetic field generating member 5A instead of a repulsion force. In this case, the lens holding member 2 is urged in the direction indicated by the arrow AR11 by a repulsion force generated between the balance magnet 9 and the second magnetic field generating member 5B, and is urged in the direction opposite to the direction indicated by the arrow AR10 by an attraction force generated between the detection magnet 8 and the first magnetic field generating member 5A, that is, in the same direction as indicated by the arrow AR11. As a result, the lens holding member 2 tends to shift the optical axis JD in the direction indicated, for example, by the arrow AR11 of FIG. 16A, or to tilt the optical axis JD in the direction indicated, for example, by an arrow AR16 of FIG. 16B. However, the above-described arrangement according to the present embodiment can prevent the optical axis JD from being shifted or tilted.

Next, referring to FIGS. 17A to 17D, another example of an arrangement of the coil 3, the magnetic field generating member 5, the detection magnet 8, the balance magnet 9, and the magnetic detection member 11 in the initial state will be described. FIGS. 17A to 17D illustrate another example of the arrangement of the coil 3, the magnetic field generating member 5, the detection magnet 8, the balance magnet 9, and the magnetic detection member 11, and respectively correspond to FIGS. 16A to 16D.

The driving mechanism MK illustrated in FIGS. 17A to 17D differs from the driving mechanism MK of FIGS. 16A to 16D in that the detection magnet 8 is disposed such that the upper portion becomes the N-pole and the lower portion becomes the S-pole, and the balance magnet 9 is disposed such that the upper portion becomes the S-pole and the lower portion becomes the N-pole, but is common in other respects. For this reason, the following section omits the description of the common parts and describes the differences in detail.

By the arrangement illustrated in FIGS. 17A to 17D, in the initial state, an attraction force is generated between the upper portion (N-pole portion) of the detection magnet 8 and the inner portion (S-pole portion) of the first upper magnet 5AU. Therefore, the lens holding member 2 as a movable portion supporting the detection magnet 8 is urged in a direction indicated by an arrow AR22 of FIG. 17B. That is, the lens holding member 2 is attracted to the first magnetic field generating member 5A.

An attraction force is also generated between the lower portion (the S-pole portion) of the detection magnet 8 and the inner portion (the N-pole portion) of the first lower magnet 5AL. Therefore, the lens holding member 2 is urged in the direction as indicated by an arrow AR23 of FIG. 17B, that is, in the same direction as indicated by the arrow AR22. That is, the lens holding member 2 is attracted to the first magnetic field generating member 5A.

On the other hand, an attraction force is also generated between the upper portion (the S-pole portion) of the balance magnet 9 and the inner portion (the N-pole portion) of the second upper magnet 5BU. Therefore, the lens holding member 2 is urged in the direction indicated by an arrow AR24 of FIG. 17B, that is, in the direction opposite to the direction indicated by the arrow AR22. That is, the lens holding member 2 is attracted to the second magnetic field generating member 5B.

An attraction force is also generated between the lower portion (the N-pole portion) of the balance magnet 9 and the inner portion (the S-pole portion) of the second lower magnet 5BL. Therefore, the lens holding member 2 is urged in the direction indicated by an arrow AR25 of FIG. 17B, that is, in the same direction as that indicated by the arrow AR24 but in a direction opposite to that indicated by the arrow AR22. That is, the lens holding member 2 is attracted to the second magnetic field generating member 5B.

Figure 17A:
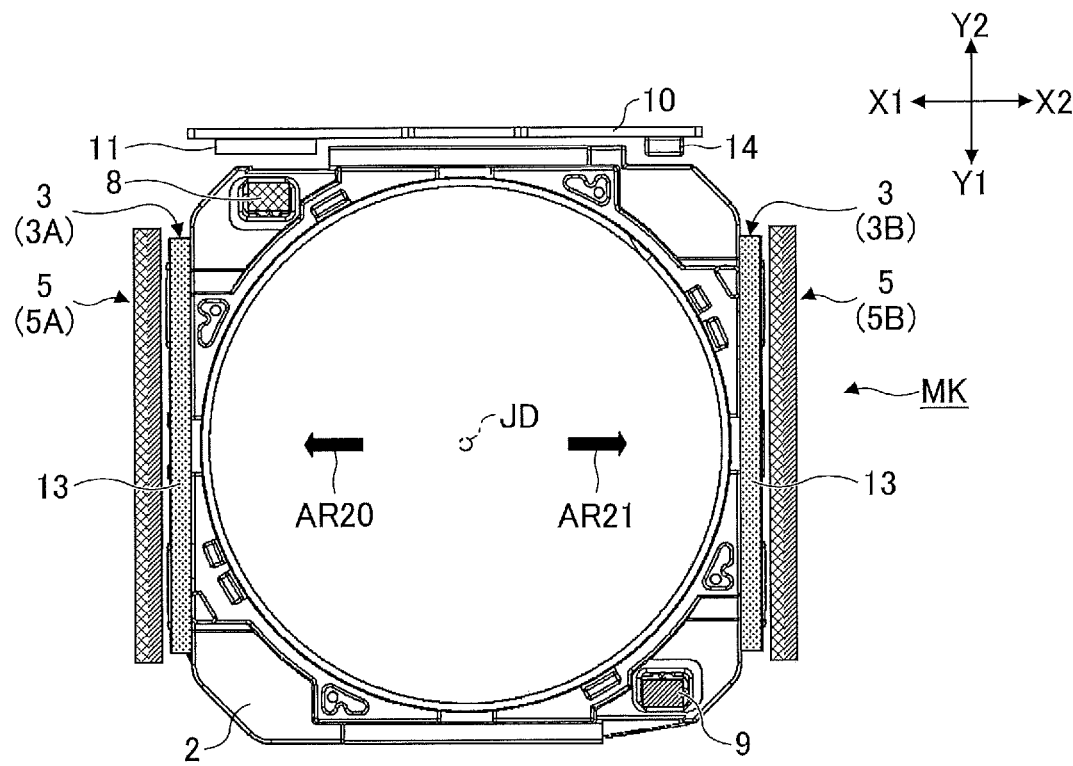
FIG. 17A is a top view of the driving mechanism illustrating another example of an arrangement of the coil, the magnetic field generating member, the detection magnet, the balance magnet, and the magnetic detection member.

As a result, the lens holding member 2 is simultaneously urged in the direction indicated by the arrow AR20 and in the direction indicated by the arrow AR21, as illustrated in FIG. 17A. That is, the lens holding member 2 receives forces so as to be pulled from both sides, and, therefore, it is possible to prevent the optical axis JD of the lens body from being shifted or being tilted with respect to the Z-axis.

Next, referring to FIGS. 18A to 18D, yet another example of an arrangement of the coil 3, the magnetic field generating member 5, the detection magnet 8, the balance magnet 9, and the magnetic detection member 11 in an initial state will be described. FIGS. 18A to 18D illustrate yet another example of the arrangement of the coil 3, the magnetic field generating member 5, the detection magnet 8, the balance magnet 9, and the magnetic detection member 11, and respectively correspond to FIGS. 17A to 17D.

The driving mechanism MK illustrated in FIGS. 18A to 18D differs from the driving mechanism MK illustrated in FIGS. 17A to 17D in that the first lower magnet 5AL of the first magnetic field generating member 5A is omitted, and the second lower magnet 5BL of the second magnetic field generating member 5B is omitted, but is common in other respects. For this reason, the following section omits the description of the common parts and describes the differences in detail.

By the arrangement illustrated in FIGS. 18A to 18D, in the initial state, an attraction force is generated between the upper portion (the N-pole portion) of the detection magnet 8 and the inner portion (the S-pole portion) of the first upper magnet 5AU as the first magnetic field generating member 5A. Therefore, the lens holding member 2, as a movable portion supporting the detection magnet 8, is urged in a direction indicated by an arrow AR32 of FIG. 18B. That is, the lens holding member 2 is attracted to the first magnetic field generating member 5A.

On the other hand, an attraction force is also generated between the upper portion (the S-pole portion) of the balance magnet 9 and the inner portion (the N-pole portion) of the second upper magnet 5BU as the second magnetic field generating member 5B. Therefore, the lens holding member 2 is urged in the direction indicated by an arrow AR33 of FIG. 18B, that is, in the direction opposite to the direction indicated by the arrow AR32. That is, the lens holding member 2 is attracted to the second magnetic field generating member 5B.

Figure 18A:
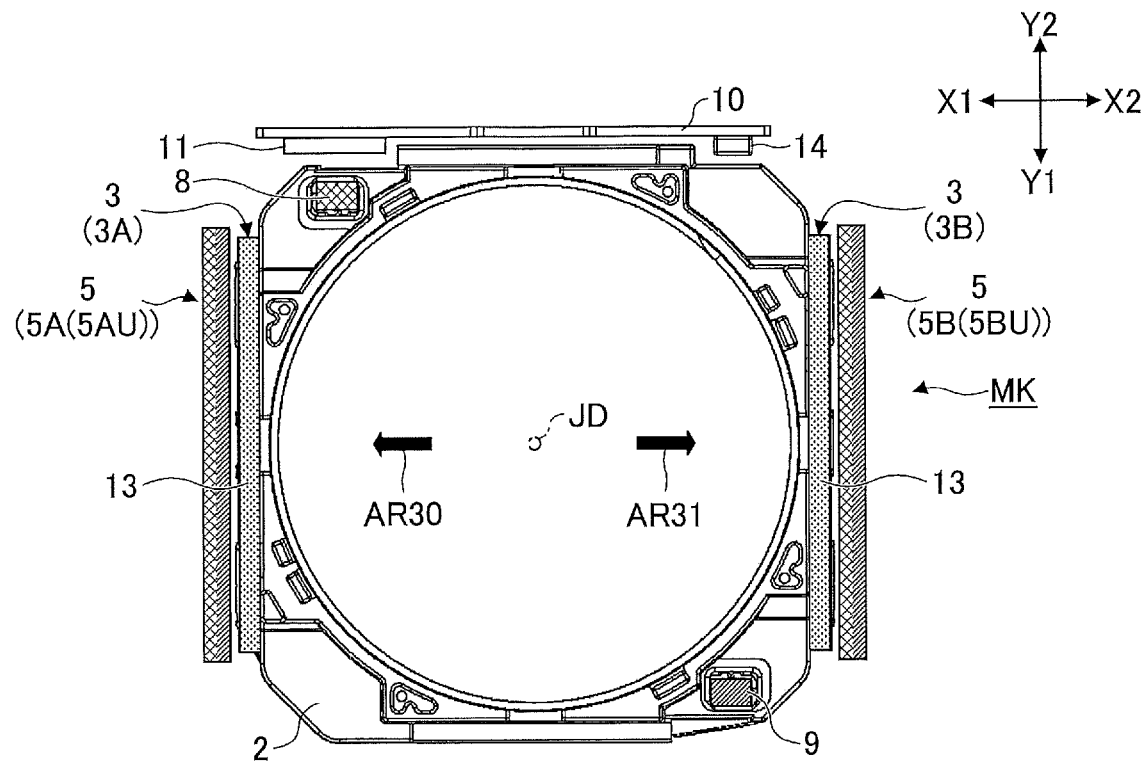
FIG. 18A is a top view of the driving mechanism illustrating yet another example of an arrangement of the coil, the magnetic field generating member, the detection magnet, the balance magnet, and the magnetic detection member.

As a result, the lens holding member 2 is simultaneously urged in the direction indicated by an arrow AR30 and in the direction indicated by an arrow AR31, as illustrated in FIG. 18A. That is, the lens holding member 2 receives forces so as to be pulled from both sides, and, therefore, the optical axis JD of the lens body can be prevented from being shifted or being tilted with respect to the Z-axis.

Figure 19:
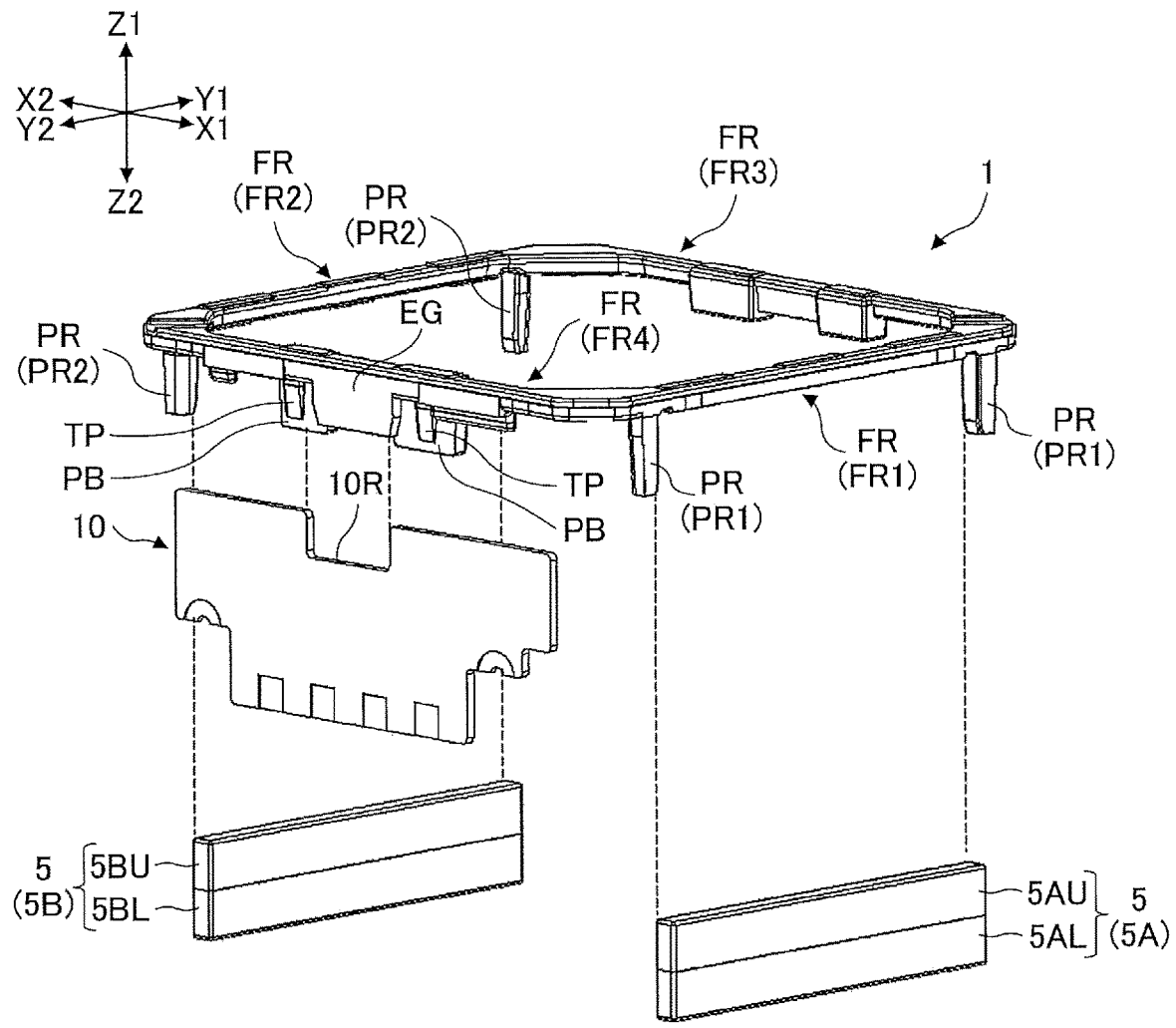
FIG. 19 is a perspective view of the spacer member, the magnetic field generating member, and the flexible printed circuit board.
Figure 19:
Figure 19:
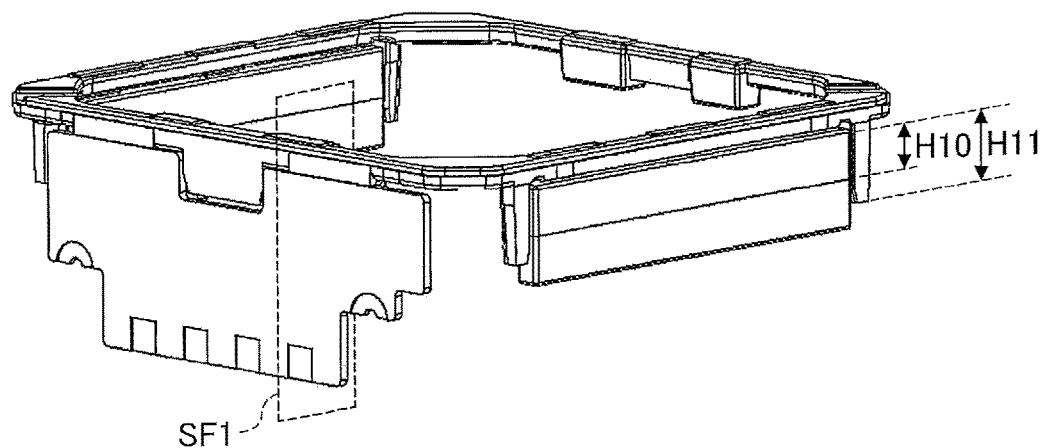

Next, with reference to FIG. 19, an arrangement of the spacer member 1, the magnetic field generating member 5, and the flexible printed circuit board 10 will be described. FIG. 19 is a perspective view of the spacer member 1, the magnetic field generating member 5, and the flexible printed circuit board 10. In FIG. 19, the upper leaf spring 16, which is actually disposed between the spacer member 1 and the magnetic field generating member 5, is not illustrated for clarity.

The spacer member 1 is a member disposed inside the yoke 4 so as to come into contact with the surface (the ceiling surface) of the inner side (the Z2 side) of the upper plate portion 4B of the yoke 4, and has a frame-like portion FR.

The frame-like portion FR is a rectangular annular member including a first side portion FR1, a second side portion FR2, a third side portion FR3, and a fourth side portion FR4. The first side portion FR1 is disposed so as to face the first side plate portion 4A1, the second side portion FR2 is disposed so as to face the second side plate portion 4A2, the third side portion FR3 is disposed so as to face the third side plate portion 4A3, and the fourth side portion FR4 is disposed so as to face the fourth side plate portion 4A4.

Further, the frame-like portion FR includes a protruding portion PR used to position the magnetic field generating member 5. In the present embodiment, the protruding portion PR includes a pair of first protruding portions PR1 used for positioning the first magnetic field generating member 5A and a pair of second protruding portions PR2 used for positioning the second magnetic field generating member 5B.

The pair of the first protruding portions PR1 is formed so as to protrude in the Z2 direction from the end surface of the first side portion FR1 on the Z2 side. The two protruding portions in the pair of the first protruding portions PR1 are disposed with an interval therebetween that is approximately equal to the width of the first magnetic field generating member 5A, so as to have the first magnetic field generating member 5A disposed therebetween.

The pair of the second protruding portion PR2 is formed so as to protrude in the Z2 direction from the end surface of the second side portion FR2 at the Z2 side. The two protruding portions in the pair of the second protruding portions PR2 are disposed with an interval therebetween that is approximately equal to the width of the second magnetic field generating member 5B, so as to have the second magnetic field generating member 5B disposed therebetween.

The pair of the first protruding portions PR1 is configured to have a protruding length H11 that is longer than a height H10 of the first upper magnet 5AU so that the first upper magnet 5AU and the first lower magnet 5AL can be positioned simultaneously. In the present embodiment, the pair of the first protruding portions PR1 is configured so that the protruding length H11 is shorter than the height of the first magnetic field generating member 5A, but may be configured such that the protruding length H11 is longer than the height of the first magnetic field generating member 5A. The same applies to the pair of the second protruding portions PR2.

The frame-like portion FR further includes an engaging portion EG used for positioning the flexible printed circuit board 10, and a pair of protruding portions PB each having a tapered portion TP.

In the present embodiment, the engaging portion EG is an engagement projection portion formed so as to protrude in the Z2 direction from the end surface of the fourth side portion FR4 on the Z2 side. The engaging portion EG is configured to engage with an engagement recess portion as an engaged portion 10R formed in the flexible printed circuit board 10. The engaging portion EG may be an engagement recess portion configured to engage with the engagement projection portion as the engaged portion 10R formed in the flexible printed circuit board 10.

A pair of the protruding portions PB is formed so as to protrude in the Z2 direction from the end surface of the fourth side portion FR4 on the Z2 side. The pair of protruding portions PB is configured so that the tapered portion TP is disposed on both sides of the engaging portion EG.

The tapered portion TP is configured such that the interval between the surface of the tapered portion TP and the surface of the fourth side plate portion 4A4 is increased downward (in the Z2 direction) in a state where the spacer member 1 is disposed in the yoke 4.

By the above-described configuration, the flexible printed circuit board 10 is positioned by the engaging portion EG and fixed to the fourth side plate portion 4A4 by an adhesive or the like in a state of being sandwiched between the fourth side plate portion 4A4 and the tapered portion TP.

Figure 20A:
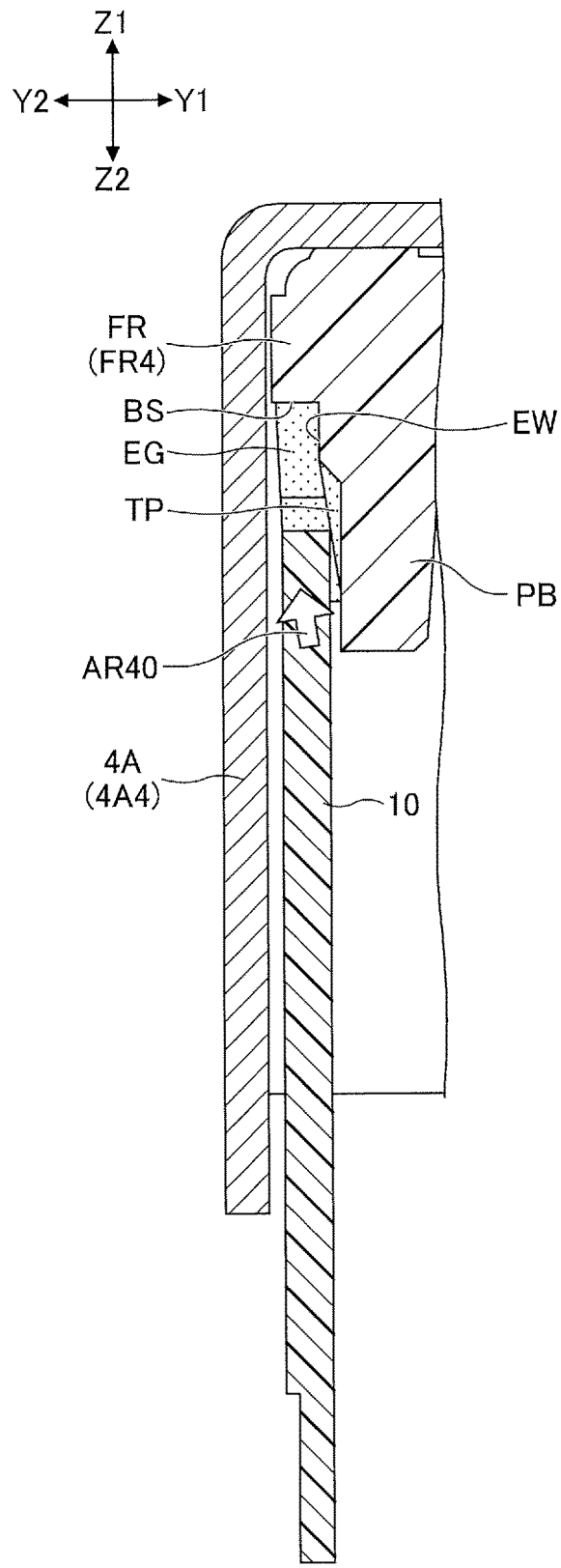
FIG. 20A is a cross-sectional view of the spacer member, the yoke, and the flexible printed circuit board.
Figure 20B:
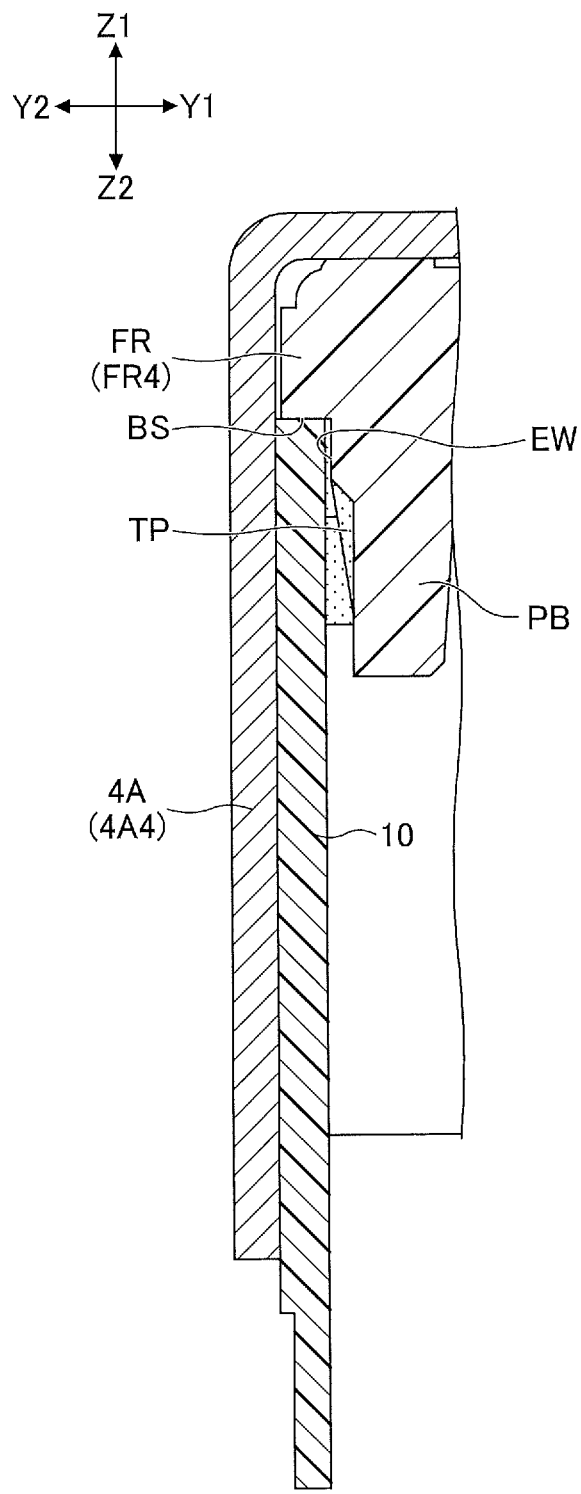
FIG. 20B is a cross-sectional view of the spacer member, the yoke, and the flexible printed circuit board.

Next, the effect of the tapered portion TP will be described with reference to FIGS. 20A and 20B. FIGS. 20A and 20B illustrate a cross-section of the spacer member 1, the yoke 4, and the flexible printed circuit board 10 at a virtual plane SF1 illustrated in FIG. 19. Specifically, FIG. 20A illustrates a state before the flexible printed circuit board 10 comes into contact with the inner wall (the inner surface) of the fourth side plate portion 4A4 of the yoke 4, and FIG. 20B illustrates a state after the flexible printed circuit board 10 comes into contact with the inner wall of the fourth side plate portion 4A4.

When the lens driving apparatus 101 is assembled, the flexible printed circuit board 10 is inserted between the inner wall of the fourth side plate portion 4A4 and an outer wall EW of the protruding portion PB in the spacer member 1, in a state of being spaced apart from the inner wall of the fourth side plate portion 4A4 as indicated by an arrow AR40 in FIG. 20A.

At this time, the inner top edge of the flexible printed circuit board 10 contacts the surface of the tapered portion TP and is guided in the direction indicated by the arrow AR40 by the surface of the tapered portion TP. Then, the flexible printed circuit board 10 moves upward (in the Z1 direction) while pushing and spreading the adhesive (not illustrated) applied to the inner wall of the fourth side plate portion 4A4, with the outer surface thereof.

Thereafter, as illustrated in FIG. 20B, the flexible printed circuit board 10 contacts, by the upper end surface thereof, a lower surface BS of the fourth side portion FR4 configuring the frame-like portion FR of the spacer member 1. In this manner, the flexible printed circuit board 10 can be positioned in the Y-axis direction and the Z-axis direction.

Note that, as illustrated in FIG. 19, the flexible printed circuit board 10 is positioned in the X-axis direction and the Z-axis direction by the engaging portion EG.

In this manner, the tapered portion TP of the spacer member 1 can position the flexible printed circuit board 10 at a predetermined position between the inner wall of the fourth side plate portion 4A4 and the outer wall EW of the protruding portion PB with high accuracy. It is preferable that the incorporation of the flexible printed circuit board 10 into the interior of the yoke 4 to which the spacer member 1 is fixed, is performed in a state where the upper plate portion 4B of the yoke 4 is facing the vertical direction.

As described above, the lens driving apparatus 101 according to the present embodiment includes a housing (the yoke 4 and the base member 18 as a cover member) including the outer peripheral wall portion 4A including the first side plate portion 4A1 and the second side plate portion 4A2 facing each other and the upper plate portion 4B, the lens holding member 2 being positioned within the housing and capable of holding the lens body, the coil 3 being held in the lens holding member 2, the first magnetic field generating member 5A and the second magnetic field generating member 5B facing each other across the coil 3 and the lens holding member 2, the detection magnet 8 being held in the lens holding member 2 to detect the position of the lens holding member 2, the magnetic detection member 11 being held in the flexible printed circuit board 10 as a fixed side member so as to face the detection magnet 8, the balance magnet 9 being held in the lens holding member 2 at a position where the balance magnet 9 faces the detection magnet 8 across the optical axis JD of the lens body, and the lower leaf spring 26A as the first leaf spring and the lower leaf spring 26B as the second leaf spring that movably support the lens holding member 2 in the optical axis direction and that are respectively conducted to one end and to the other end of the wires configuring the coil 3. The detection magnet 8 is disposed closer to the first magnetic field generating member 5A than to the second magnetic field generating member 5B, and the balance magnet 9 is disposed closer to the second magnetic field generating member 5B than to the first magnetic field generating member 5A.

With this configuration, the lens driving apparatus 101 can increase the degree of freedom in design. For example, in the lens driving apparatus 101, the detection magnet 8 can be disposed at one of the corners of the lens holding member 2 having a substantially rectangular external shape in the top view, as illustrated in FIG. 16A, while implementing feedback control on the movement of the lens holding member 2 in the optical axis direction with respect to the autofocus adjusting function. Further, in the lens driving apparatus 101, the balance magnet 9 can be disposed on another corner of the lens holding member 2. Therefore, in the lens driving apparatus 101, the dimension of the lens holding member 2 in the Y-axis direction can be reduced, and consequently, the overall size of the apparatus can be reduced.

Figure 18B:
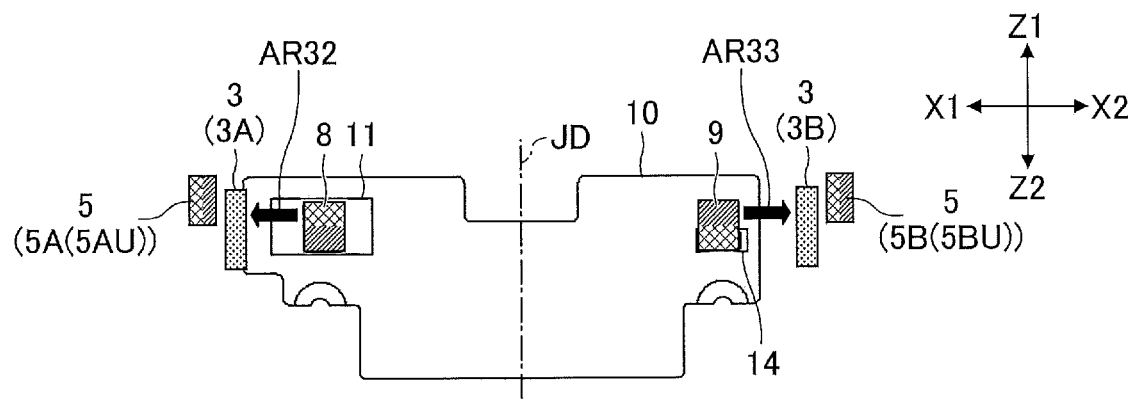
FIG. 18B is a rear view of the driving mechanism illustrated in FIG. 18A.
Figure 18C:
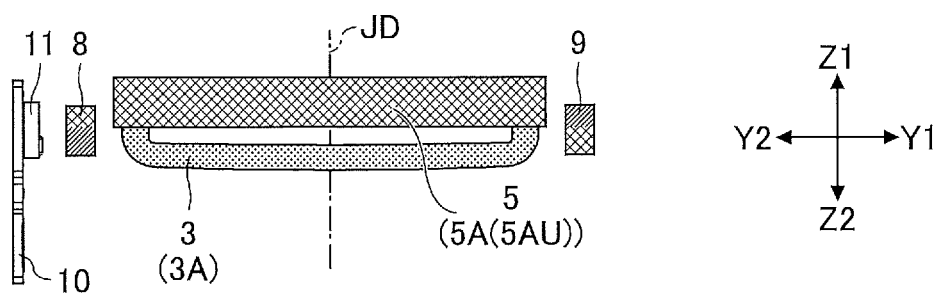
FIG. 18C is a right side view of the driving mechanism illustrated in FIG. 18A.
Figure 18D:
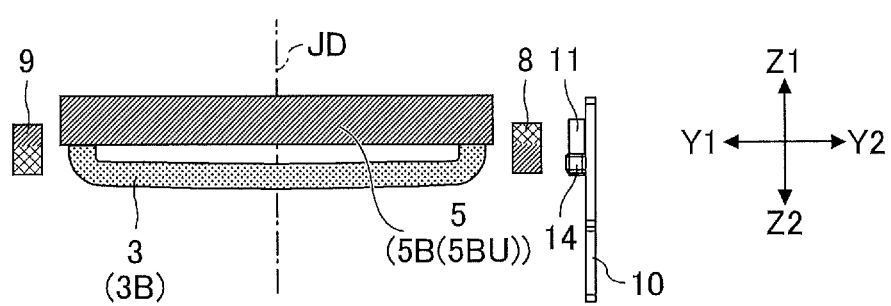
FIG. 18D is a left side view of the driving mechanism illustrated in FIG. 18A.

The first magnetic field generating member 5A preferably has a first inner portion (a portion on the X2 side of the first upper magnet 5AU) on the inner side (the X2 side) facing the lens holding member 2, as illustrated in FIG. 18B. The second magnetic field generating member 5B has a second inner portion (a portion on the X1 side of the second upper magnet 5BU) on the inner side (the X1 side) facing the lens holding member 2.

In this case, the detection magnet 8 is disposed so as to correspond to the first magnetic field generating member 5A in the direction orthogonal to the optical axis direction, and is configured such that a fifth portion (the upper portion) which is one side (the Z1 side) in the optical axis direction and a sixth portion (the lower portion) which is the other side (the Z2 side) in the optical axis direction have different magnetic poles from each other.

The balance magnet 9 is disposed so as to correspond to the second magnetic field generating member 5B in the direction orthogonal to the optical axis direction, and is configured such that the seventh portion (the upper portion) which is one side (the Z1 side) in the optical axis direction and an eighth portion (the lower portion) which is the other side (the Z2 side) in the optical axis direction have different magnetic poles from each other.

The lens driving apparatus 101 is configured such that an attraction force is applied between the first inner portion and the fifth portion and between the second inner portion and the seventh portion. Alternatively, the lens driving apparatus 101 may be configured such that a repulsion force is applied between the first inner portion and the fifth portion and between the second inner portion and the seventh portion.

For example, as illustrated in FIG. 18B, the lens driving apparatus 101 is configured such that an attraction force is applied between the portion on the X2 side of the first upper magnet 5AU (the S-pole portion) and the upper portion of the detection magnet 8 (the N-pole portion), and between the portion on the X1 side of the second upper magnet 5BU (the N-pole portion) and the upper portion of the balance magnet 9 (the S-pole portion).

With this configuration, the lens driving apparatus 101 can generate an attraction force between the first upper magnet 5AU and the detection magnet 8, and can also generate an attraction force between the second upper magnet 5BU and the balance magnet 9. Therefore, the lens driving apparatus 101 can stabilize the posture of the lens holding member 2.

As illustrated in FIG. 16B, on the inner side (on the X2 side) of the first magnetic field generating member 5A facing the lens holding member 2, the first magnetic field generating member 5A may be configured to have a first inner portion (a portion on the X2 side of the first upper magnet 5AU) that is one side (the Z1 side) in the optical axis direction and a third inner portion (a portion on the X2 side of the first lower magnet 5AL) that is the other side (the 22 side) in the optical axis direction. On the inner side (the X1 side) of the second magnetic field generating member 5B facing the lens holding member 2, the second magnetic field generating member 5B may be configured to have a second inner portion (a portion on the X1 side of the second upper magnet 5BU) that is one side in the optical axis direction and a fourth inner portion (a portion on the X1 side of the second lower magnet 5BL) that is the other side in the optical axis direction.

As illustrated in FIG. 16B, the lens driving apparatus 101 may be configured such that a first inner portion (the portion on the X2 side of the first upper magnet 5AU) and a third inner portion (the portion on the X2 side of the first lower magnet 5AL) have different magnetic poles from each other, and a second inner portion (the portion on the X1 side of the second upper magnet 5BU) and a fourth inner portion (the portion on the X1 side of the second lower magnet 5BL) have different magnetic poles from each other.

In this case, the lens driving apparatus 101 is preferably configured such that an attraction force is applied between the first inner portion and the fifth portion, between the third inner portion and the sixth portion, between the second inner portion and the seventh portion, and between the fourth inner portion and the eighth portion. Alternatively, the lens driving apparatus 101 is preferably configured such that a repulsion force is applied between the first inner portion and the fifth portion, between the third inner portion and the sixth portion, between the second inner portion and the seventh portion, and between the fourth inner portion and the eighth portion.

For example, as illustrated in FIG. 16B, the lens driving apparatus 101 may be configured such that a repulsion force is applied between a portion of the first upper magnet 5AU on the X2 side (the S-pole portion) and a portion of the upper side (the S-pole portion) of the detection magnet 8, between a portion of the first lower magnet 5AL on the X2 side (the N-pole portion) and a portion of the lower side (the N-pole portion) of the detection magnet 8, between a portion of the second upper magnet 5BU on the X1 side (the N-pole portion) and the upper side (the N-pole portion) of the balance magnet 9, and between a portion of the second lower magnet 5BL on the X1 side (the S-pole portion) and a portion of the lower side (the S-pole portion) of the balance magnet 9.

With this configuration, the lens driving apparatus 101 generates a repulsion force between each of the first upper magnet 5AU and the first lower magnet 5AL with respect to the detection magnet 8, and also generates a repulsion force between each of the second upper magnet 5BU and the second lower magnet 5BL with respect to the balance magnet 9. Therefore, in the lens driving apparatus 101, the lens holding member 2 can be pressed from both sides, and, therefore, it is possible to stabilize the posture of the lens holding member 2 in comparison with the case where the lens holding member 2 is pulled at one side and pressed on the other side. That is, the lens driving apparatus 101 can reduce or prevent shifting or tilting of the central axis of the lens holding member 2 (the optical axis JD of the lens body) with respect to the Z axis.

Figure 17B:
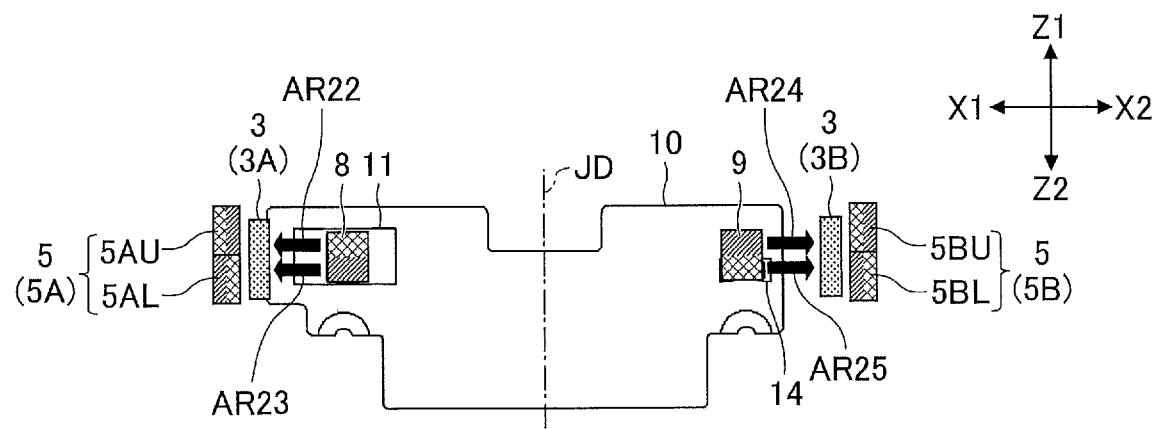
FIG. 17B is a rear view of the driving mechanism illustrated in FIG. 17A.
Figure 17C:
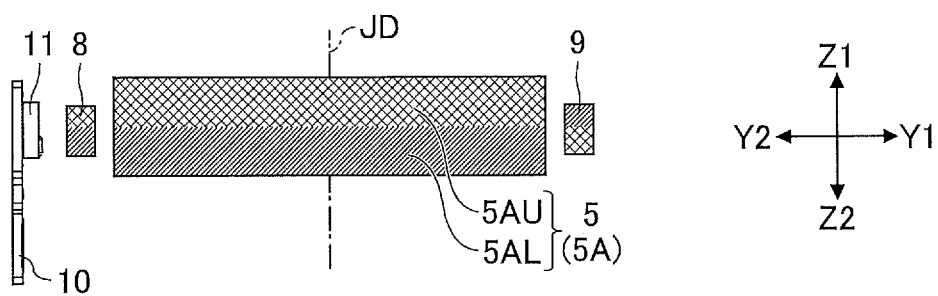
FIG. 17C is a right side view of the driving mechanism illustrated in FIG. 17A.
Figure 17D:
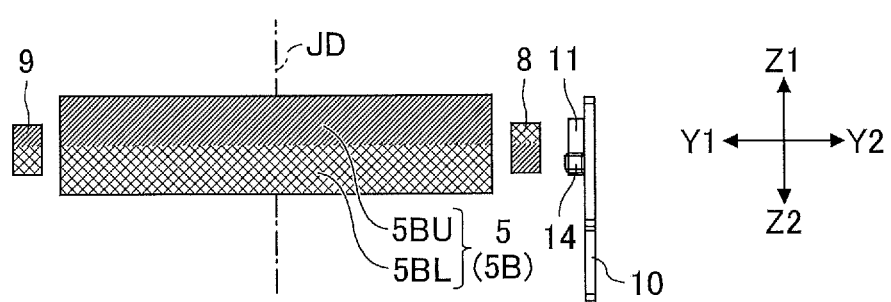
FIG. 17D is a left side view of the driving mechanism illustrated in FIG. 17A.

Alternatively, as illustrated in FIG. 17B, the lens driving apparatus 101 may be configured such that an attraction force is applied between the portion of the first upper magnet 5AU on the X2 side (the S-pole portion) and the upper portion (the N-pole portion) of the detection magnet 8, between the portion of the first lower magnet 5AL on the X2 side (the N-pole portion) and the lower portion (the S-pole portion) of the detection magnet 8, between the portion of the second upper magnet 5BU on the X1 side (the N-pole portion) and the upper portion (the S-pole portion) of the balance magnet 9, and between the portion of the second lower magnet 5BL on the X1 side (the S-pole portion) and the lower portion (the N-pole portion) of the balance magnet 9.

With this configuration, the lens driving apparatus 101 can generate an attraction force between each of the first upper magnet 5AU and the first lower magnet 5AL with respect to the detection magnet 8, and can generate an attraction force between each of the second upper magnet 5BU and the second lower magnet 5BL with respect to the balance magnet 9. Therefore, in the lens driving apparatus 101, the lens holding member 2 can be pulled from both sides, and, therefore, the posture of the lens holding member 2 can be stabilized compared to the case where the lens holding member 2 is pulled at one side and pushed on the other side. That is, the lens driving apparatus 101 can reduce or prevent shifting or tilting of the central axis of the lens holding member 2 (the optical axis JD of the lens body) with respect to the Z axis.

The lens driving apparatus 101 is preferably configured such that an attraction force is applied between the detection magnet 8 and the first magnetic field generating member 5A, and an attraction force is applied between the balance magnet 9 and the second magnetic field generating member 5B.

With this configuration, the lens driving apparatus 101 can further stabilize the posture of the lens holding member 2 in comparison with the case where the repulsion force is applied. When a repulsion force acts on both sides of the lens holding member 2, the two repulsion forces tend to cause the lens holding member 2 to move in a lateral direction (a direction perpendicular to the optical axis JD) compared to the case where an attraction force acts on both sides of the lens holding member 2. That is, in the case where an attraction force acts on both sides of the lens holding member 2, lateral movement of the lens holding member 2 is easily prevented by the lateral stiffness of the lower leaf spring 26, compared to the case where a repulsion force acts on both sides of the lens holding member 2.

For example, the lens driving apparatus 101 may be configured such that the magnetic pole of the first inner portion (the portion on the X2 side of the first upper magnet 5AU) and the magnetic pole of the second inner portion (the portion on the X1 side of the second upper magnet 5BU) are different from each other, and the magnetic pole of the fifth portion (the upper portion of the detection magnet 8) and the magnetic pole of the seventh portion (the upper portion of the balance magnet 9) are different from each other.

Specifically, for example, as illustrated in FIG. 16B, the lens driving apparatus 101 may be configured such that the magnetic pole (S-pole) of the portion on the X2 side of the first upper magnet 5AU and the magnetic pole (N-pole) of the portion on the X1 side of the second upper magnet 5BU are different from each other, and the magnetic pole (S-pole) of the upper portion of the detection magnet 8 and the magnetic pole (N-pole) of the upper portion of the balance magnet 9 are different from each other.

As illustrated in FIG. 5B, the coil 3 preferably has two of the winding portions 13 disposed on two opposite outer surfaces of the lens holding member 2 and wound around the periphery of the winding projection 12*p* protruding in a direction orthogonal to the optical axis. As illustrated in FIG. 16A, one of the two winding portions 13 faces the first magnetic field generating member 5A and the other faces the second magnetic field generating member 5B.

In this case, the first magnetic field generating member 5A has a first outer portion (portion on the X1 side of the first upper magnet 5AU) disposed outside the first inner portion (portion on the X2 side of the first upper magnet 5AU) in a direction orthogonal to the optical axis direction, and a third outer portion (portion on the X1 side of the first lower magnet 5AL) disposed outside the third inner portion (portion on the X2 side of the first lower magnet 5AL) in a direction orthogonal to the optical axis direction. The second magnetic field generating member 5B has a second outer portion (portion on the X2 side of the second upper magnet 5BU) disposed outside the second inner portion (portion on the X1 side of the second upper magnet 5BU) in the direction orthogonal to the optical axis direction, and a fourth outer portion (portion on the X2 side of the second lower magnet 5BL) disposed outside the fourth inner portion (portion on the X1 side of the second lower magnet 5BL) in the direction orthogonal to the optical axis direction.

The first inner portion and the first outer portion are configured by a first magnet (the first upper magnet 5AU) and have different magnetic poles from each other, the second inner portion and the second outer portion are configured by a second magnet (the second upper magnet 5BU) and have different magnetic poles from each other, the third inner portion and the third outer portion are configured by a third magnet (the first lower magnet 5AL) and have different magnetic poles from each other, and the fourth inner portion and the fourth outer portion are configured by a fourth magnet (the second lower magnet 5BL) and have different magnetic poles from each other.

The first magnet (the first upper magnet 5AU) and the third magnet (the first lower magnet 5AL) are vertically stacked in the optical axis direction, and the second magnet (the second upper magnet 5BU) and the fourth magnet (the second lower magnet 5BL) are also vertically stacked in the optical axis direction.

With this configuration, the first magnetic field generating member 5A can increase the magnetic force as compared to a case where the first magnetic field generating member 5A is configured by one four-pole magnet. The same applies to the second magnetic field generating member 5B.

The detection magnet 8 is preferably disposed between one end and the other end of the first magnetic field generating member 5A in an optical axis direction. The balance magnet 9 is disposed between one end and the other end of the second magnetic field generating member 5B in the optical axis direction. For example, as illustrated in FIG. 16B, the detection magnet 8 is configured such that the vertical width H1 is within the vertical width H3 of the first magnetic field generating member 5A. The same applies to the balance magnet 9.

With this configuration, in the lens driving apparatus 101, magnetic forces act on both sides of the lens holding member 2 in a direction perpendicular to the optical axis direction, can be easily balanced. Further, in the lens driving apparatus 101, the vertical width of the entire apparatus in the optical axis direction can be reduced.

The coil 3 preferably has the first extending portion 33A configuring one end portion of the coil 3 and the second extending portion 33B configuring the other end portion of the coil 3. In this case, the lens holding member 2 includes the first holding portion 72A holding the first extending portion 33A and the second holding portion 72B holding the second extending portion 33B.

For example, as illustrated in FIG. 10A, the first extending portion 33A is connected to the lower leaf spring 26A using a first bonding material AD1 (conductive adhesive or solder) and the second extending portion 33B is connected to the lower leaf spring 26B using the second bonding material AD2 (conductive adhesive or solder).

The first magnetic field generating member 5A is fixed to the first side plate portion 4A1, and the second magnetic field generating member 53 is fixed to the second side plate portion 4A2.

In this case, as illustrated in FIG. 10A, the detection magnet 8 is disposed on the opposite side to the side where the second holding portion 72B and the second bonding material AD2 are disposed, across a first virtual line VL1; and the detection magnet 8 is disposed on the opposite side to the side where the first holding portion 72A and the first bonding material AD1 are disposed, across a second virtual line VL2. The balance magnet 9 is disposed on the opposite side to the side where the first holding portion 72A and the first bonding material AD1 are disposed, across the first virtual line VL1; and the balance magnet 9 is disposed on the opposite side to the side where the second holding portion 72B and the second bonding material AD2 are disposed, across the second virtual line VL2. The first virtual line VL1 is a virtual line substantially parallel to the first side plate portion 4A1 and the second side plate portion 4A2 and substantially perpendicular to the optical axis JD passing through the optical axis JD. The second virtual line VL2 is a virtual line orthogonal to the first virtual line VL1 and substantially perpendicular to the optical axis JD passing through the optical axis JD. FIG. 10A illustrates the positions of the detection magnet 8 and the balance magnet 9, which are actually not visible because they are on the upper side (Z1 side) of the lens holding member, by broken lines and dot hatching.

With this configuration, in the lens driving apparatus 101, a state in which the detection magnet 8, the balance magnet 9, the first bonding material AD1, and the second bonding material AD2 are disposed in a balanced manner with respect to the optical axis JD, can be achieved.

The housing of the lens driving apparatus 101 preferably includes the yoke 4 as a cover member having the outer peripheral wall portion 4A and the upper plate portion 4B formed therein, and the base member 18 facing the upper plate portion 4B, as illustrated in FIGS. 1 and 2A. In the base member 18, as illustrated in FIGS. 15A to 15D, the first metal member 7A electrically connected to one end of the coil 3 via the lower leaf spring 26A and the second metal member 7B electrically connected to the other end of the coil 3 via the lower leaf spring 26B, are embedded therein.

As illustrated in FIG. 2B, the connection portion 7AC of the first metal member 7A exposed from the outer peripheral side surface of the base member 18 is connected to the first conductive portion 10C1 by the conductive bonding material AD in a state facing the first conductive portion 10C1 that is one of two conductive portions 10C formed in the flexible printed circuit board 10 on which the magnetic detection member 11 is mounted. Similarly, the connection portion 7BC of the second metal member 7B exposed from the outer peripheral surface of the base member 18 is connected to the second conductive portion 10C2 by the conductive bonding material AD in a state facing the second conductive portion 10C2 that is the other one of the two conductive portions 10C.

By this configuration, the lens driving apparatus 101 can contact the surface that expands in the optical axis direction at the connection portion 7AC and the surface that expands in the optical axis direction at the first conductive portion 10C1, so that the contact area between the connection portion 7AC and the first conductive portion 10C1 can be increased. In the lens driving apparatus 101, the plated surface of the connection portion 7AC can easily contact the surface that spreads in the optical axis direction at the first conductive portion 10C1.

With respect to the lens driving apparatus 101, the productivity (assembling properties) can be improved, for example, compared to a configuration in which an electrical connection between the flexible printed circuit board 10 and the lower leaf spring 26 is implemented by inserting a portion of the lower leaf spring 26 into a hole formed in the flexible printed circuit board 10. For example, a method for assembling the lens driving apparatus 101 as illustrated in FIGS. 20A and 20B, i.e., an assembling method that includes inserting the flexible printed circuit board 10 between the inner wall of the fourth side plate portion 4A4 and the outer wall EW of the protruding portion PB in the spacer member 1, is also applicable.

In the present embodiment, the outer peripheral wall portion 4A of the yoke 4 includes the third side plate portion 4A3 and the fourth side plate portion 4A4 facing each other, which are substantially perpendicular to the first side plate portion 4A1 and the second side plate portion 4A2 facing each other. Also, inside the upper plate portion 4B of the yoke 4, the spacer member 1 having the frame-like portion FR is disposed, as illustrated in FIG. 19. In the frame-like portion FR, at the fourth side portion FR4, which is a portion facing the fourth side plate portion 4A4, there is formed the engaging portion EG which can engage with the flexible printed circuit board 10 and the tapered portion TP whose the interval (gap, distance) with respect to the fourth side plate portion 4A4 increases as the distance from the upper plate portion 4B increases. In this configuration, the flexible printed circuit board 10 is positioned by the engaging portion EG and is fixed to the fourth side plate portion 4A4 in a state of being sandwiched between the fourth side plate portion 4A4 and the tapered portion TP.

With this configuration, in the lens driving apparatus 101, the flexible printed circuit board 10 can be securely disposed between the fourth side plate portion 4A4 and the tapered portion TP by the tapered portion TP of the spacer member 1, and the flexible printed circuit board 10 can be positioned by the engaging portion EG. Therefore, variations in the positions of the detection magnet 8 and the magnetic detection member 11, and variations in the distance between the detection magnet 8 and the magnetic detection member 11 can be prevented, thereby increasing the detection accuracy of the magnetic detection member 11 (the Hall element).

In the present embodiment, as illustrated in FIG. 19, in the first side portion FR1, which is a portion facing the first side plate portion 4A1 in the frame-like portion FR, the protruding portions included in the pair of first protruding portions PR1, which are spaced apart from each other, are formed so as to protrude in a direction away from the upper plate portion 4B. Further, in the second side portion FR2, which is a portion facing the second side plate portion 4A2 in the frame-like portion FR, the protruding portions included in the pair of second protruding portions PR2, which are spaced apart from each other, are formed so as to protrude in a direction away from the upper plate portion 4B. The first magnetic field generating member 5A is disposed between the protruding portions included in the pair of the first protruding portions PR1, and the second magnetic field generating member 5B is disposed between the protruding portions included in the pair of the second protruding portions PR2.

By this configuration, in the lens driving apparatus 101, even when the first magnetic field generating member 5A is configured by a plurality of magnets, the first magnetic field generating member 5A can be appropriately positioned by the pair of the first protruding portions PR1.

The preferred embodiment of the present invention has been described in detail above. However, the present invention is not limited to the embodiments described above. Various modifications and substitutions may be applied to the embodiments described above without departing from the scope of the present invention. Each of the features described with reference to the embodiments described above may also be suitably combined, unless there is a technical inconsistency.

For example, in the embodiment described above implementing the auto-focus adjustment function, the lower leaf spring 26A and the first extending portion 33A are electrically connected and the lower leaf spring 26B and the second extending portion 33B are electrically connected, but the present invention is not limited to this configuration. For example, in a lens driving apparatus with a hand shake correction function, the present invention may include a configuration in which the upper leaf spring 16 is divided into two parts, one part being electrically connected to the first extending portion 33A and the other part being electrically connected to the second extending portion 33B. In this configuration, the upper leaf spring 16 is disposed to be linked to a magnet holder as a support member and the lens holding member 2, and is configured to movably support the lens holding member 2 in the optical axis direction. The magnet holder is a member holding the magnetic field generating member 5 facing the coil 3 held in the lens holding member 2 and is typically connected to the base member 18 via a suspension wire, and is movably supported in a direction perpendicular to the optical axis by the suspension wire. Specifically, the magnet holder is configured to be moved in a direction perpendicular to the optical axis by a driving mechanism including the magnetic field generating member 5 and a coil other than the coil 3 disposed on the base member 18 so as to face the magnetic field generating member 5. In this case, a holding portion 72 as a protruding portion may be provided at the upper end of the lens holding member 2 that is the side to which the upper leaf spring 16 is disposed. Preferably, the magnetic detection member 11 is held in a magnet holder.

In the above-described embodiment, the coil 3 is configured by two oval coils having a coil axis perpendicular to the optical axis direction, the two coils being held in two respective side surfaces of the four side surfaces of the lens holding member 2. However, the present invention is not limited to this configuration. The coil 3 may be an annular coil wound around the lens holding member 2 to have a coil axis extending in the direction of the optical axis.

In the above-described embodiment, the first magnetic field generating member 5A is configured by a combination of the first upper magnet 5AU and the first lower magnet 5AL magnet that is magnetized in a direction perpendicular to the optical axis JD, but may be configured by one bipolar magnet that is magnetized along the optical axis direction. In this case, the upper portion of the bipolar magnet corresponds to the inner portion of the first upper magnet 5AU, and the lower portion of the bipolar magnet corresponds to the inner portion of the first lower magnet 5AL. The same applies to the second magnetic field generating member 5B.

In the above-described embodiment, the detection magnet 8 and the balance magnet 9 are mounted such that the arrangement of the magnetic poles (the magnetizing direction) are opposite to each other in a vertical direction; however, the detection magnet 8 and the balance magnet 9 may be mounted such that the arrangement of the magnetic poles (the magnetizing direction) are the same in a vertical direction. In this case, for example, the winding direction of the winding portion 13 of the second coil 3B is set to be opposite to the winding direction in the above-described embodiment, and the arrangement of the magnetic poles (the magnetizing direction) of the second magnetic field generating member 5B is set to be opposite to the arrangement of the magnetic poles (the magnetizing direction) in the above-described embodiment.

In the above-described embodiment, the magnetic detection member 11 is configured by an electronic component incorporating a Hall element and a driver IC, but may be configured by a magnetic detecting element, such as a Hall element or a magnetoresistance effect element, without including a driver IC. In this case, the magnetic detecting element outputs a detection signal to a control unit external to the lens driving apparatus 101. Then, the control unit controls the current supplied from the control unit to the coil 3 based on the detection signal.

According to an aspect of the present invention, a lens driving apparatus with an increased degree of freedom in design is provided.

Although the embodiments have been described in detail, the present invention is not limited to the specific embodiments described in the detailed description, and variations and modifications may be made without departing from the spirit and scope of the present invention.

What is claimed is:

1. A lens driving apparatus comprising:
   a housing including an outer peripheral wall portion and an upper plate portion, the outer peripheral wall portion including a first side plate portion and a second side plate portion facing each other;
a lens holding member positioned in the housing and configured to hold a lens body;
a coil including a wire and held in the lens holding member;
a first magnetic field generating member and a second magnetic field generating member facing each other across the coil and the lens holding member;
a detection magnet held in the lens holding member and configured to detect a position of the lens holding member;
a magnetic detection member disposed so as to face the detection magnet;
a balance magnet held in the lens holding member at a position so as to face the detection magnet across an optical axis of the lens body; and
a first leaf spring and a second leaf spring respectively connected to one end portion and another end portion of the wire, and configured to movably support the lens holding member so as to be movable in a direction of the optical axis, wherein
the detection magnet is disposed at a position closer to the first magnetic field generating member than to the second magnetic field generating member,
the balance magnet is disposed at a position closer to the second magnetic field generating member than to the first magnetic field generating member,
the first magnetic field generating member includes a first inner portion on an inner side facing the lens holding member,
the second magnetic field generating member includes a second inner portion on an inner side facing the lens holding member,
the detection magnet is disposed so as to correspond to the first magnetic field generating member in a direction orthogonal to the direction of the optical axis, and includes a first-detection-magnet portion at one side in the direction of the optical axis and a second-detection-magnet portion at another side in the direction of the optical axis having different magnetic poles from each other,
the balance magnet is disposed so as to correspond to the second magnetic field generating member in the direction orthogonal to the direction of the optical axis, and includes a first-balance-magnet portion at one side in the direction of the optical axis and a second-balance-magnet portion at another side in the direction of the optical axis having different magnetic poles from each other, and
an attraction force is applied between the first inner portion and the first-detection-magnet portion and between the second inner portion and the first-balance-magnet portion, or
a repulsion force is applied between the first inner portion and the first-detection-magnet portion and between the second inner portion and the first-balance-magnet portion.

2. The lens driving apparatus according to claim 1, wherein
the first magnetic field generating member includes the first inner portion at one side in the direction of the optical axis and a third inner portion at another side in the direction of the optical axis, on an inner side facing the lens holding member,
the second magnetic field generating member includes the second inner portion at one side in the direction of the optical axis and a fourth inner portion at another side in the direction of the optical axis, on an inner side facing the lens holding member,
the first inner portion and the third inner portion have different magnetic poles from each other,
the second inner portion and the fourth inner portion have different magnetic poles from each other, and
an attraction force is applied between the first inner portion and the first-detection-magnet portion, between the third inner portion and the second-detection-magnet portion, between the second inner portion and the first-balance-magnet portion, and between the fourth inner portion and the second-balance-magnet portion, or
a repulsion force is applied between the first inner portion and the first-detection-magnet portion, between the third inner portion and the second-detection-magnet portion, between the second inner portion and the first-balance-magnet portion, and between the fourth inner portion and the second-balance-magnet portion.

3. The lens driving apparatus according to claim 2, wherein
the coil includes two winding portions that are disposed on two respective opposite outer surfaces of the lens holding member and wound around winding projections protruding in the direction orthogonal to the direction of the optical axis,
one winding portion of the two winding portions faces the first magnetic field generating member and another winding portion of the two winding portions faces the second magnetic field generating member,
the first magnetic field generating member includes a first outer portion disposed on an outer side of the first inner portion in the direction orthogonal to the direction of the optical axis, and a third outer portion disposed on an outer side of the third inner portion in the direction orthogonal to the direction of the optical axis,
the second magnetic field generating member includes a second outer portion disposed on an outer side of the second inner portion in the direction orthogonal to the direction of the optical axis, and a fourth outer portion disposed on an outer side of the fourth inner portion in the direction orthogonal to the direction of the optical axis,
the first inner portion and the first outer portion are configured by a first magnet and have different magnetic poles from each other,
the second inner portion and the second outer portion are configured by a second magnet and have different magnetic poles from each other,
the third inner portion and the third outer portion are configured by a third magnet and have different magnetic poles from each other, and
the fourth inner portion and the fourth outer portion are configured by a fourth magnet and have different magnetic poles from each other.

4. The lens driving apparatus according to claim 1, wherein
an attraction force is applied between the detection magnet and the first magnetic field generating member, and
an attraction force is applied between the balance magnet and the second magnetic field generating member.

5. The lens driving apparatus according to claim 4, wherein
the first inner portion and the second inner portion have different magnetic poles from each other, and the first-detection-magnet portion and the first-balance-magnet portion have different magnetic poles from each other.

6. The lens driving apparatus according to claim 1, wherein in the direction of the optical axis, the detection magnet is disposed between one end and another end of the first magnetic field generating member, and the balance magnet is disposed between one end and another end of the second magnetic field generating member.

7. A lens driving apparatus
- a housing including an outer peripheral wall portion and an upper plate portion, the outer peripheral wall portion including a first side plate portion and a second side plate portion facing each other;
- a lens holding member positioned in the housing and configured to hold a lens body;
- a coil including a wire and held in the lens holding member;
- a first magnetic field generating member and a second magnetic field generating member facing each other across the coil and the lens holding member;
- a detection magnet held in the lens holding member and configured to detect a position of the lens holding member;
- a magnetic detection member disposed so as to face the detection magnet;
- a balance magnet held in the lens holding member at a position so as to face the detection magnet across an optical axis of the lens body; and
- a first leaf spring and a second leaf spring respectively connected to one end portion and another end portion of the wire, and configured to movably support the lens holding member so as to be movable in a direction of the optical axis, wherein
- the detection magnet is disposed at a position closer to the first magnetic field generating member than to the second magnetic field generating member,
- the balance magnet is disposed at a position closer to the second magnetic field generating member than to the first magnetic field generating member,
- the coil includes a first extending portion at one end portion of the coil and a second extending portion at another end portion of the coil,
- the lens holding member includes a first holding portion configured to hold the first extending portion and a second holding portion configured to hold the second extending portion,
- the first extending portion is connected to the first leaf spring by a first bonding material and the second extending portion is connected to the second leaf spring by a second bonding material,
- the first magnetic field generating member is fixed to the first side plate portion,
- the second magnetic field generating member is fixed to the second side plate portion,
- the detection magnet is disposed on an opposite side to a side where the second holding portion and the second bonding material are positioned, across a first virtual line substantially parallel to the first side plate portion and the second side plate portion and substantially perpendicular to the optical axis and passing through the optical axis, and the detection magnet is disposed on an opposite side to a side where the first holding portion and the first bonding material are positioned, across a second virtual line orthogonal to the first virtual line and substantially perpendicular to the optical axis and passing through the optical axis, and the balance magnet is disposed on an opposite side to a side where the first holding portion and the first bonding material are positioned, across the first virtual line, and the balance magnet is disposed on an opposite side to a side where the second holding portion and the second bonding material are positioned, across the second virtual line.

8. A lens driving apparatus,
- a housing including an outer peripheral wall portion and an upper plate portion, the outer peripheral wall portion including a first side plate portion and a second side plate portion facing each other;
- a lens holding member positioned in the housing and configured to hold a lens body;
- a coil including a wire and held in the lens holding member;
- a first magnetic field generating member and a second magnetic field generating member facing each other across the coil and the lens holding member;
- a detection magnet held in the lens holding member and configured to detect a position of the lens holding member;
- a magnetic detection member disposed so as to face the detection magnet;
- a balance magnet held in the lens holding member at a position so as to face the detection magnet across an optical axis of the lens body; and
- a first leaf spring and a second leaf spring respectively connected to one end portion and another end portion of the wire, and configured to movably support the lens holding member so as to be movable in a direction of the optical axis, wherein
- the detection magnet is disposed at a position closer to the first magnetic field generating member than to the second magnetic field generating member,
- the balance magnet is disposed at a position closer to the second magnetic field generating member than to the first magnetic field generating member,
- the housing includes a cover member in which the outer peripheral wall portion and the upper plate portion are formed, and a base member facing the upper plate portion,
- the base member includes a first metal member electrically connected to one end of the coil via the first leaf spring and a second metal member electrically connected to another end of the coil via the second leaf spring, embedded in the base member,
- a connection portion of the first metal member exposed from an outer peripheral surface of the base member is connected to a first conductive portion by a conductive bonding material in a state of facing the first conductive portion that is one of two conductive portions formed on a board on which the magnetic detection member is mounted, and
- a connection portion of the second metal member exposed from the outer peripheral surface of the base member is connected to a second conductive portion by the conductive bonding material in a state of facing the second conductive portion that is another one of the two conductive portions.

9. The lens driving apparatus according to claim 8, wherein
the outer peripheral wall portion of the cover member includes a third side plate portion and a fourth side plate portion facing each other and substantially perpendicular to the first side plate portion and the second side plate portion, in the upper plate portion of the cover member, a spacer member including a frame-like portion is disposed, at a portion of the frame-like portion facing the fourth side plate portion, an engaging portion configured to engage with the board and a tapered portion whose interval with respect to the fourth side plate portion increases as a distance from the upper plate portion increases, are formed, and the board is positioned by the engaging portion and is fixed to the fourth side plate portion in a state of being sandwiched between the fourth side plate portion and the tapered portion.

10. The lens driving apparatus according to claim 9, wherein at a portion of the frame-like portion facing the first side plate portion, two first protruding portions, forming a pair, are spaced apart from each other and formed so as to protrude in a direction away from the upper plate portion, at a portion of the frame-like portion facing the second side plate portion, two second protruding portions, forming a pair, are spaced apart from each other and formed so as to protrude in a direction away from the upper plate portion, between the two first protruding portions, the first magnetic field generating member is disposed, and between the two second protruding portions, the second magnetic field generating member is disposed.

11. A camera module comprising:

the lens driving apparatus according to claim 1;

the lens body; and an imaging element facing the lens body.

* * * * *